Oct. 23, 1934.  L. D. SOUBIER  1,977,742
GLASSWARE FORMING MACHINE
Filed March 31, 1933  36 Sheets-Sheet 15
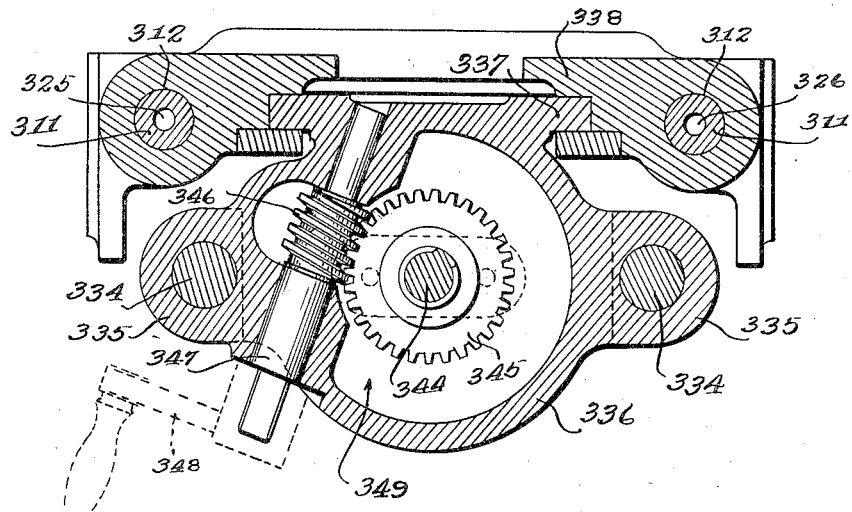
Fig. 36.
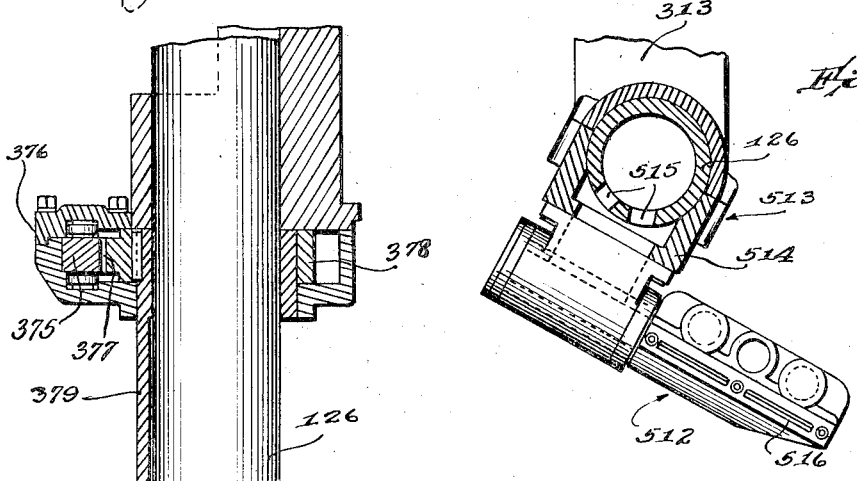
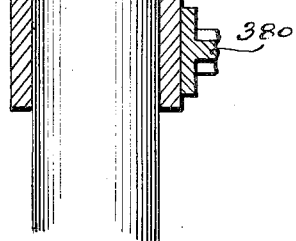
Fig. 37.
Fig. 38.
Inventor
Leonard D. Soubier
By J. F. Rule
Attorney

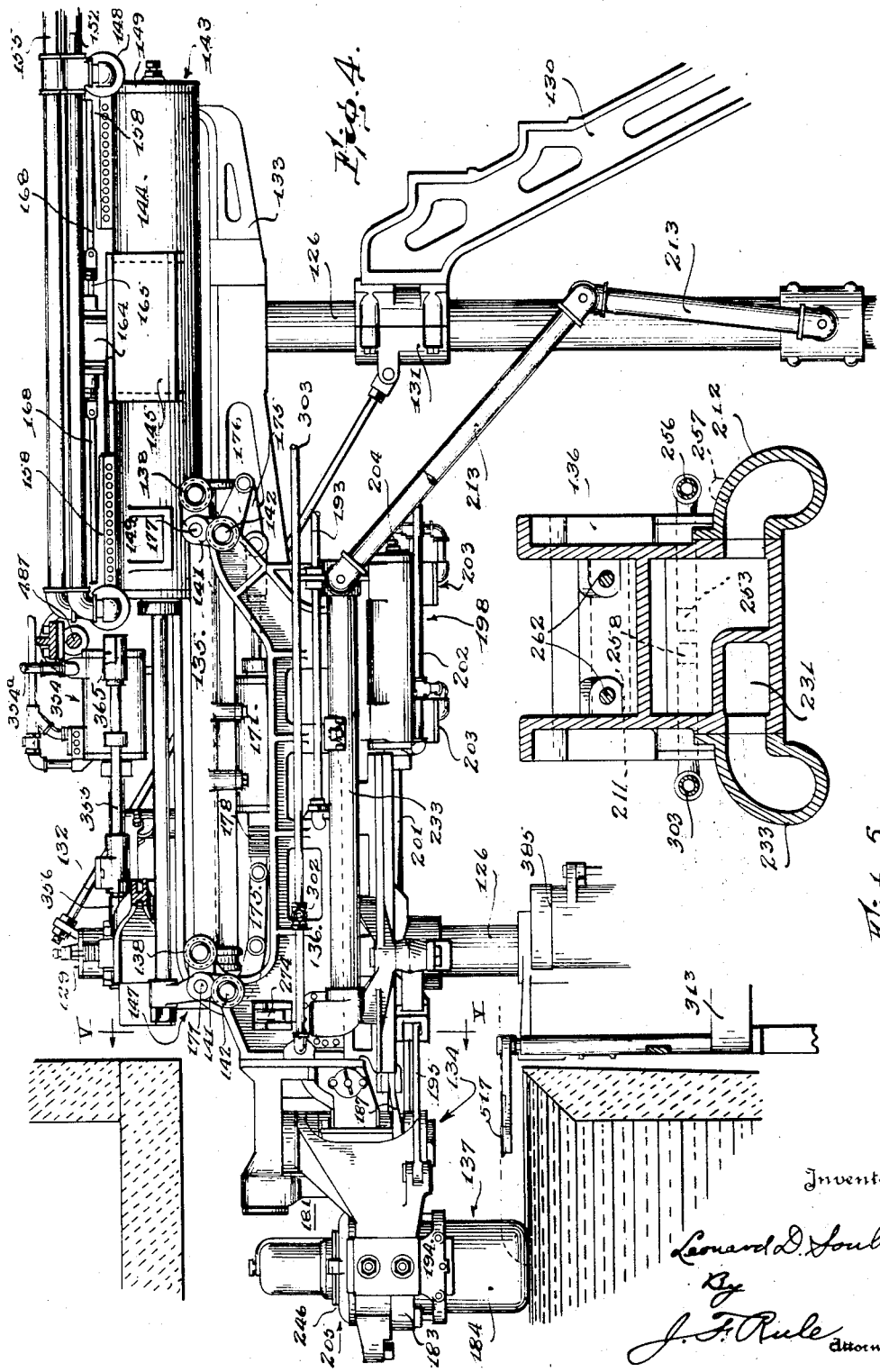

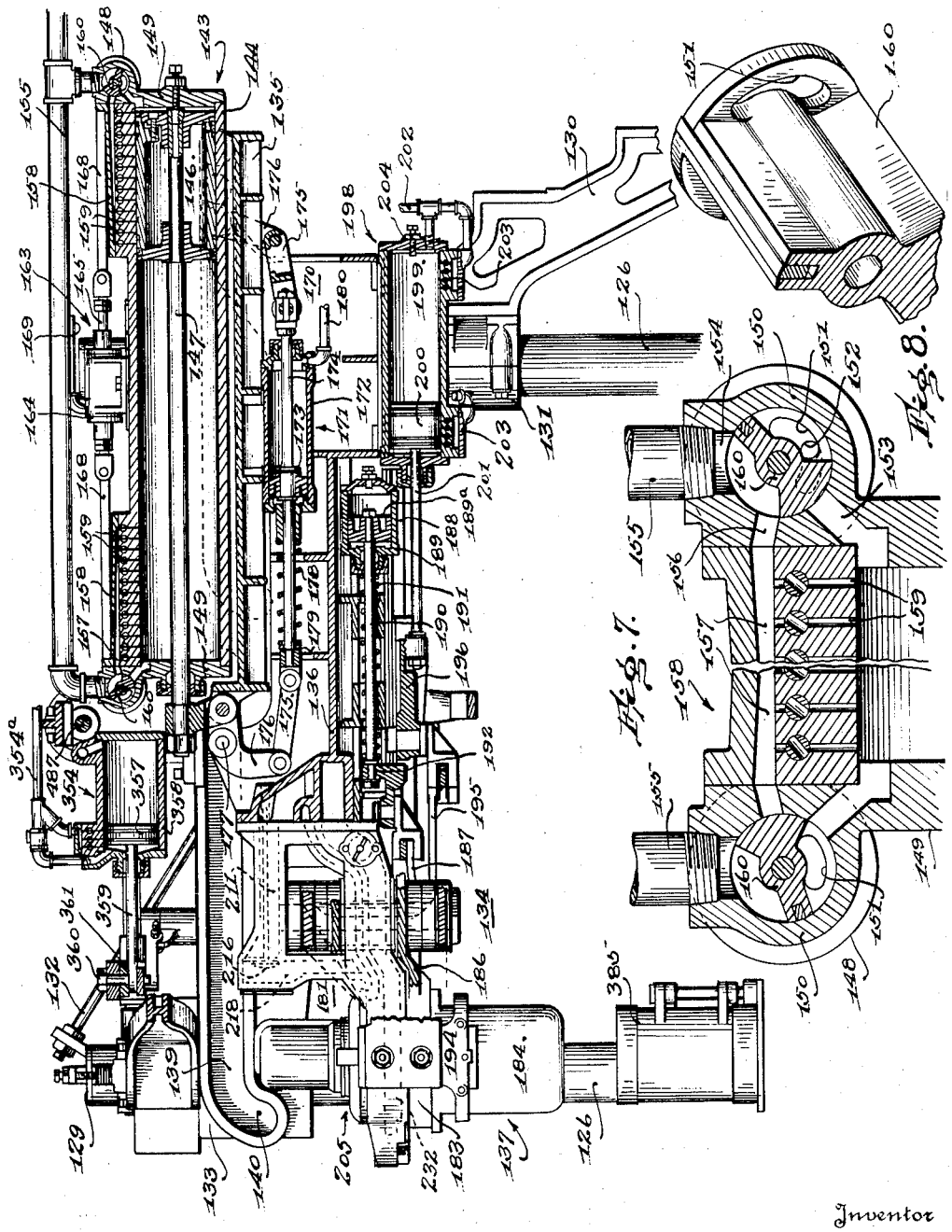

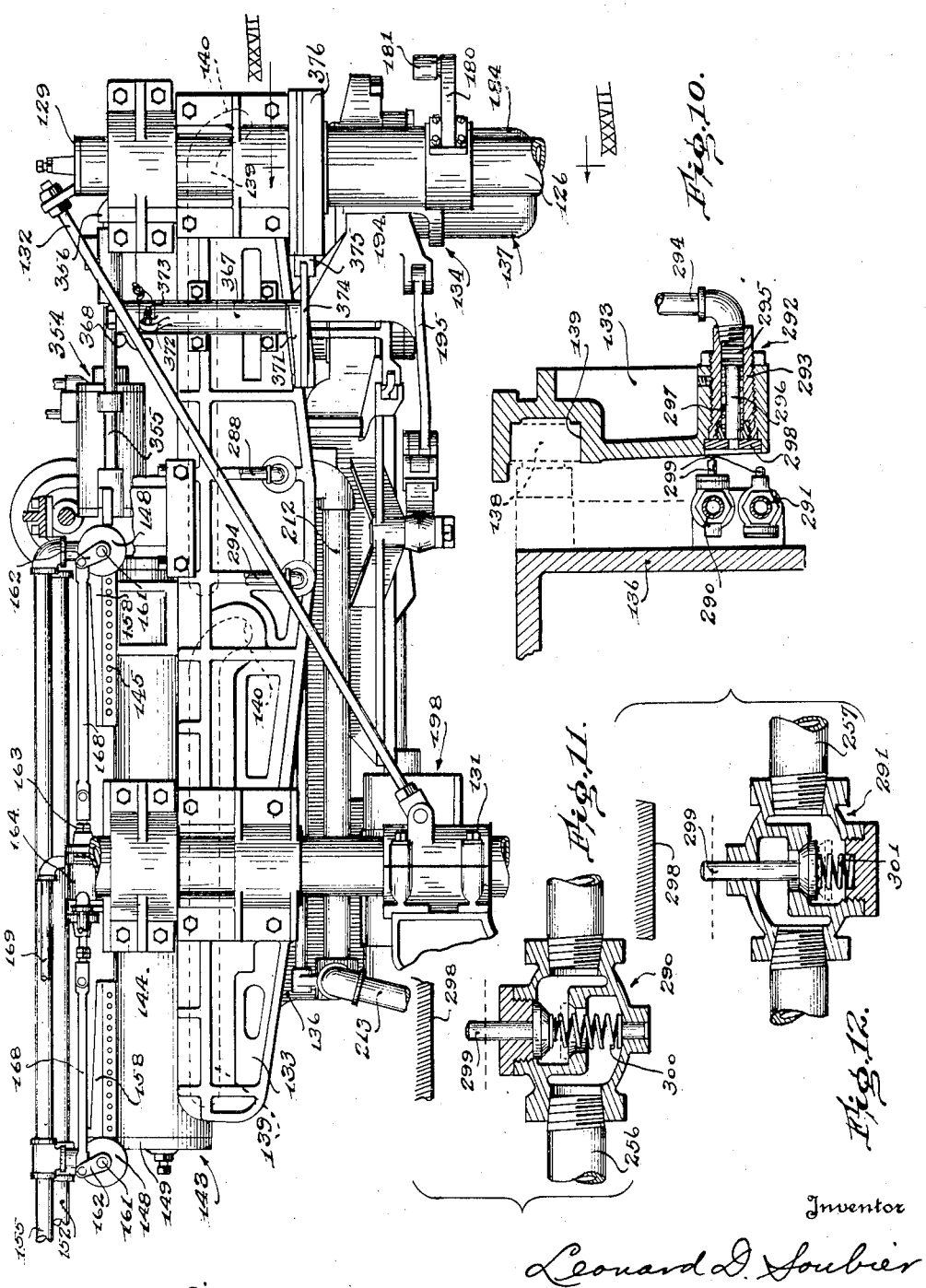

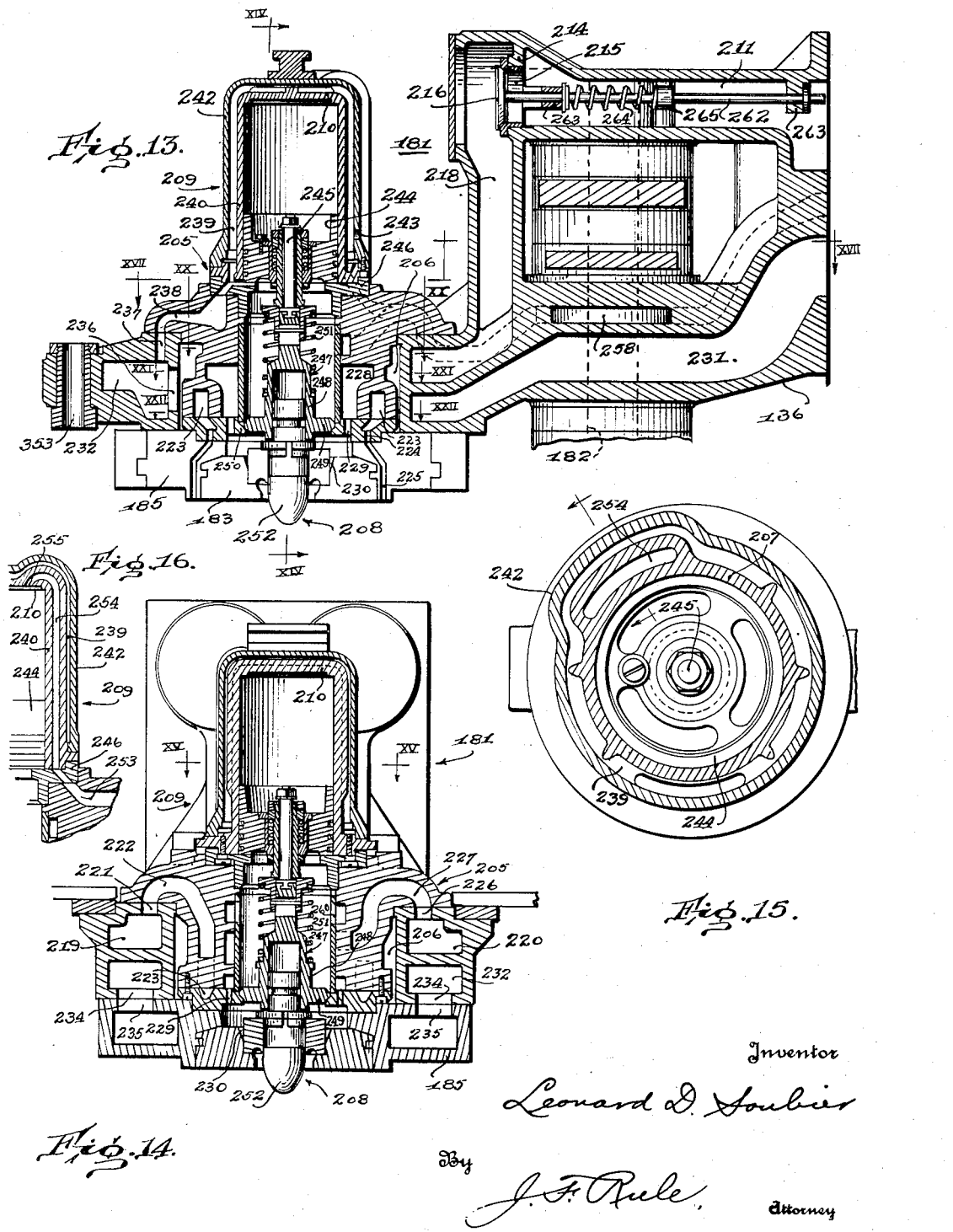

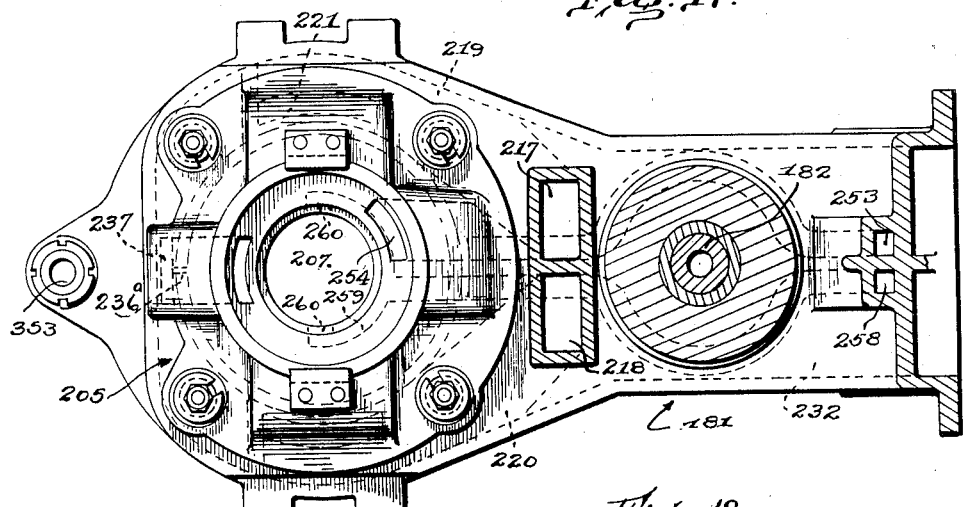
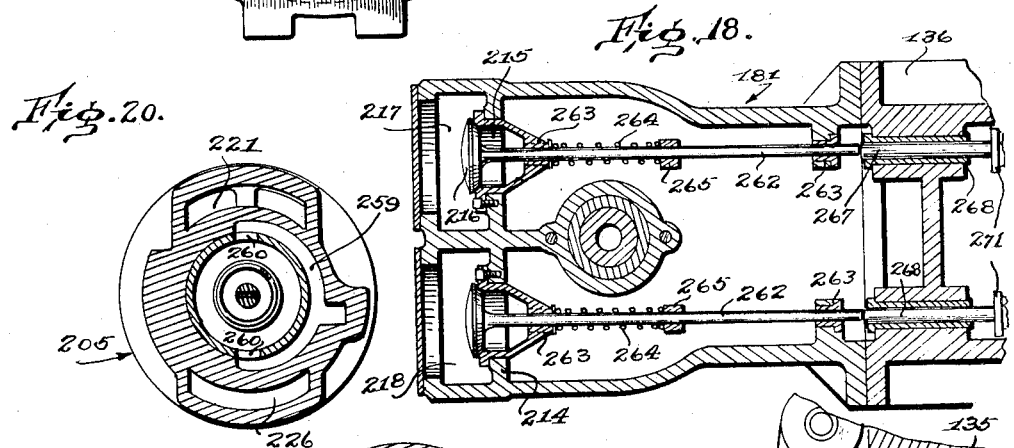
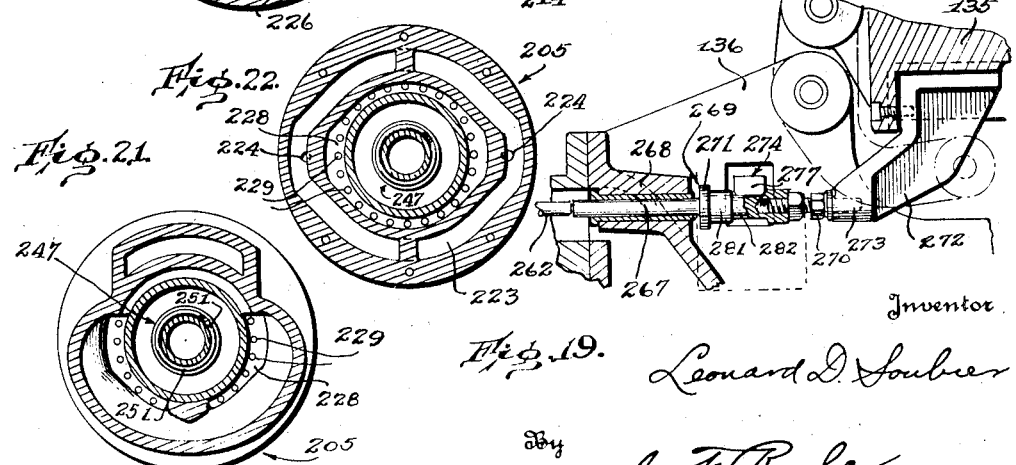

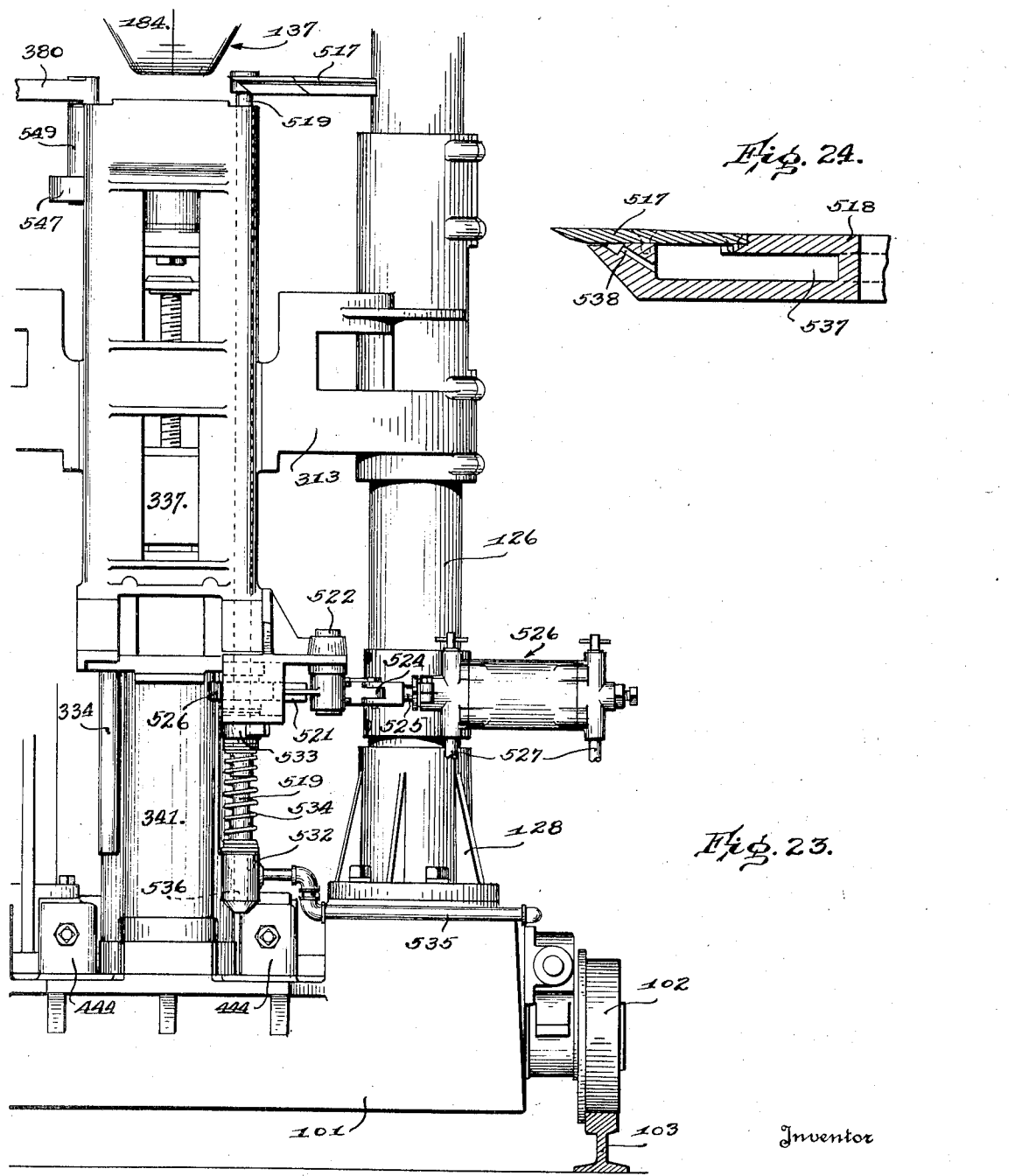

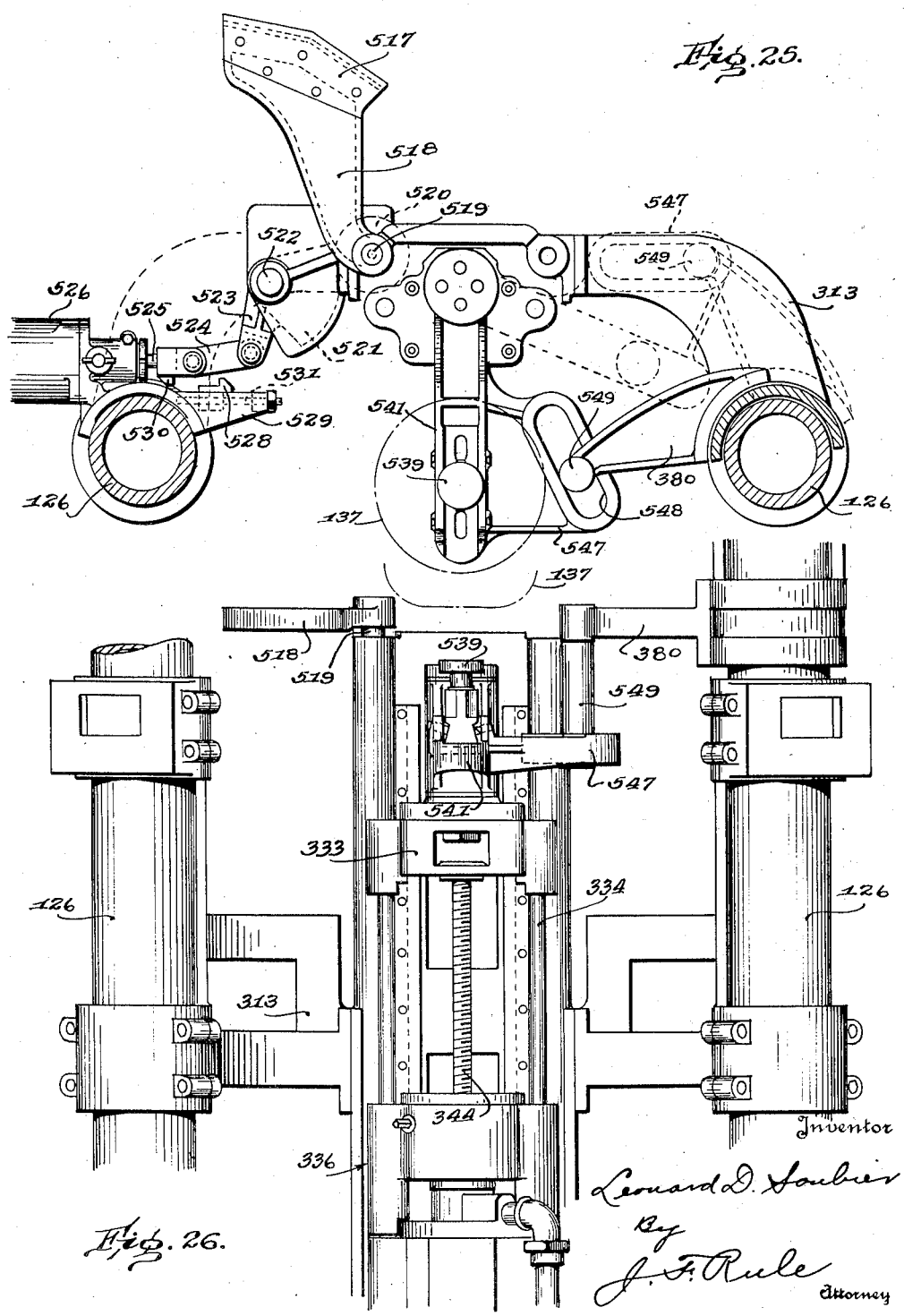

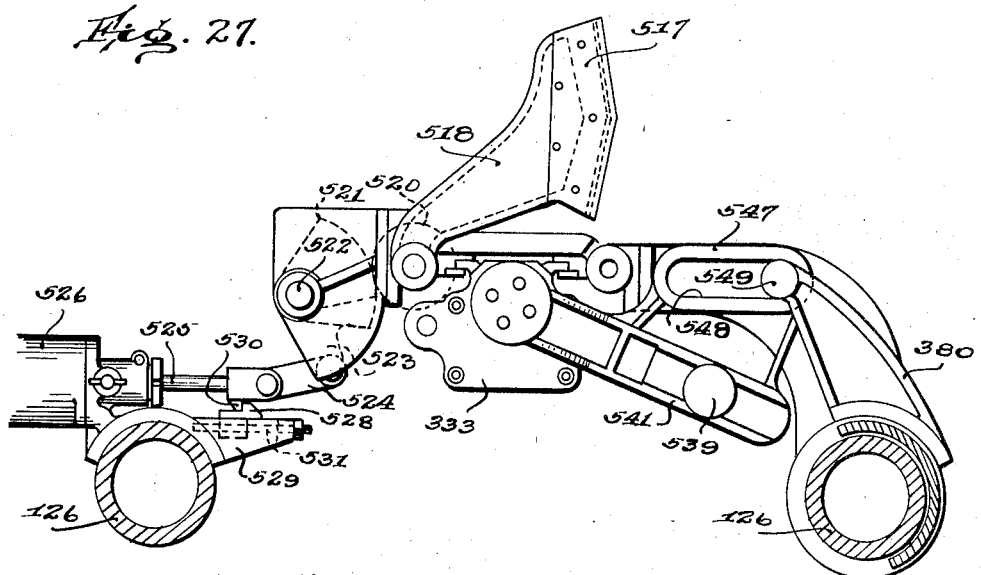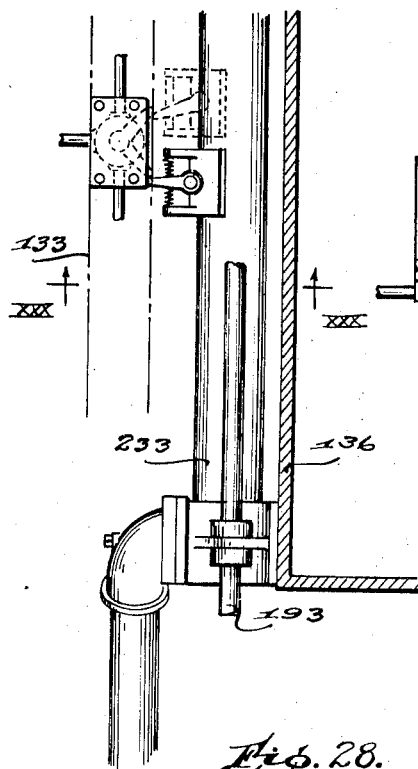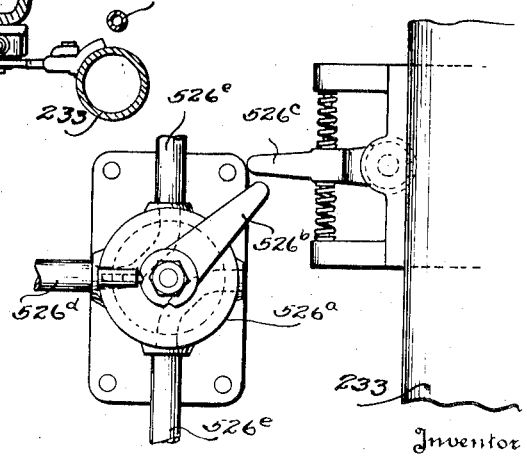

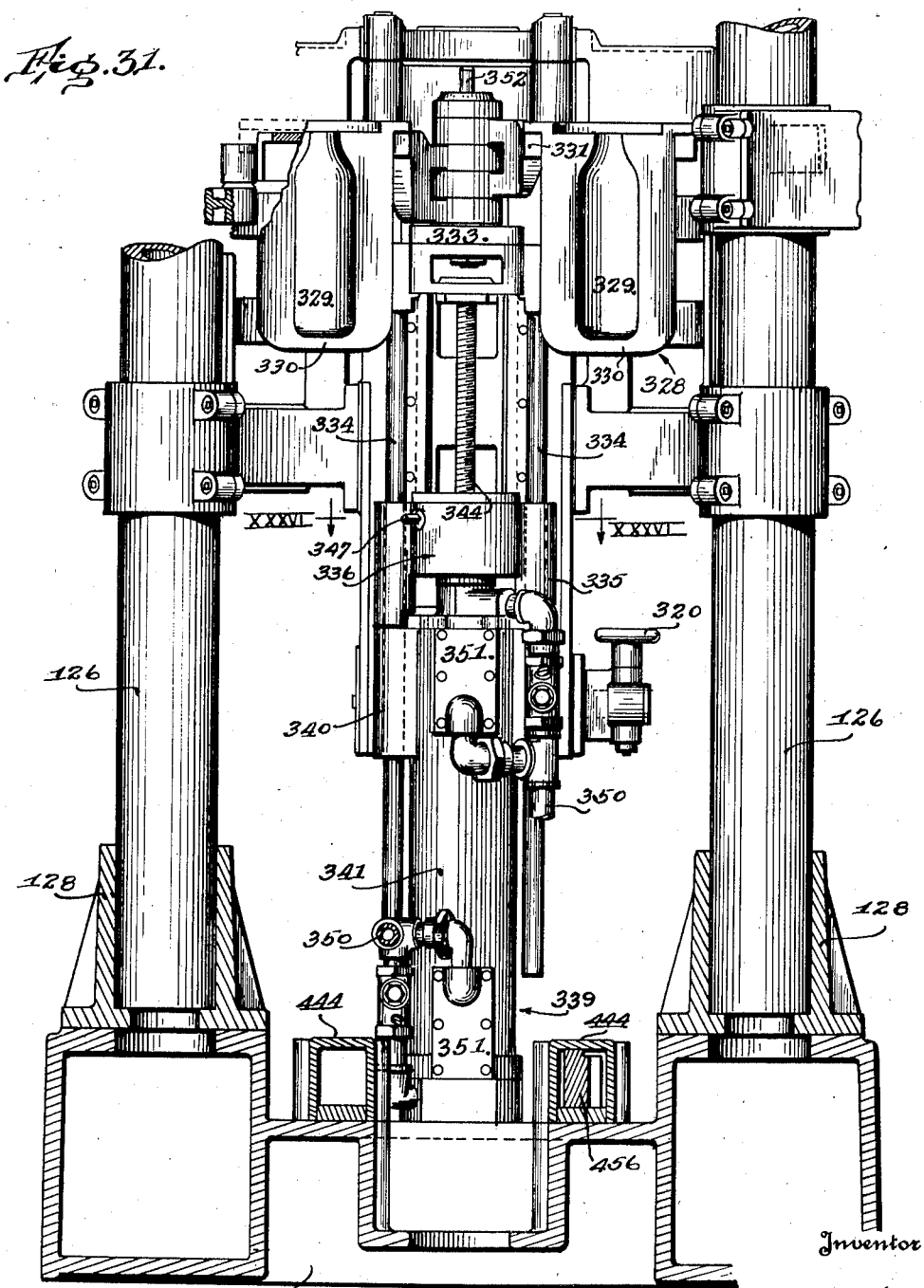

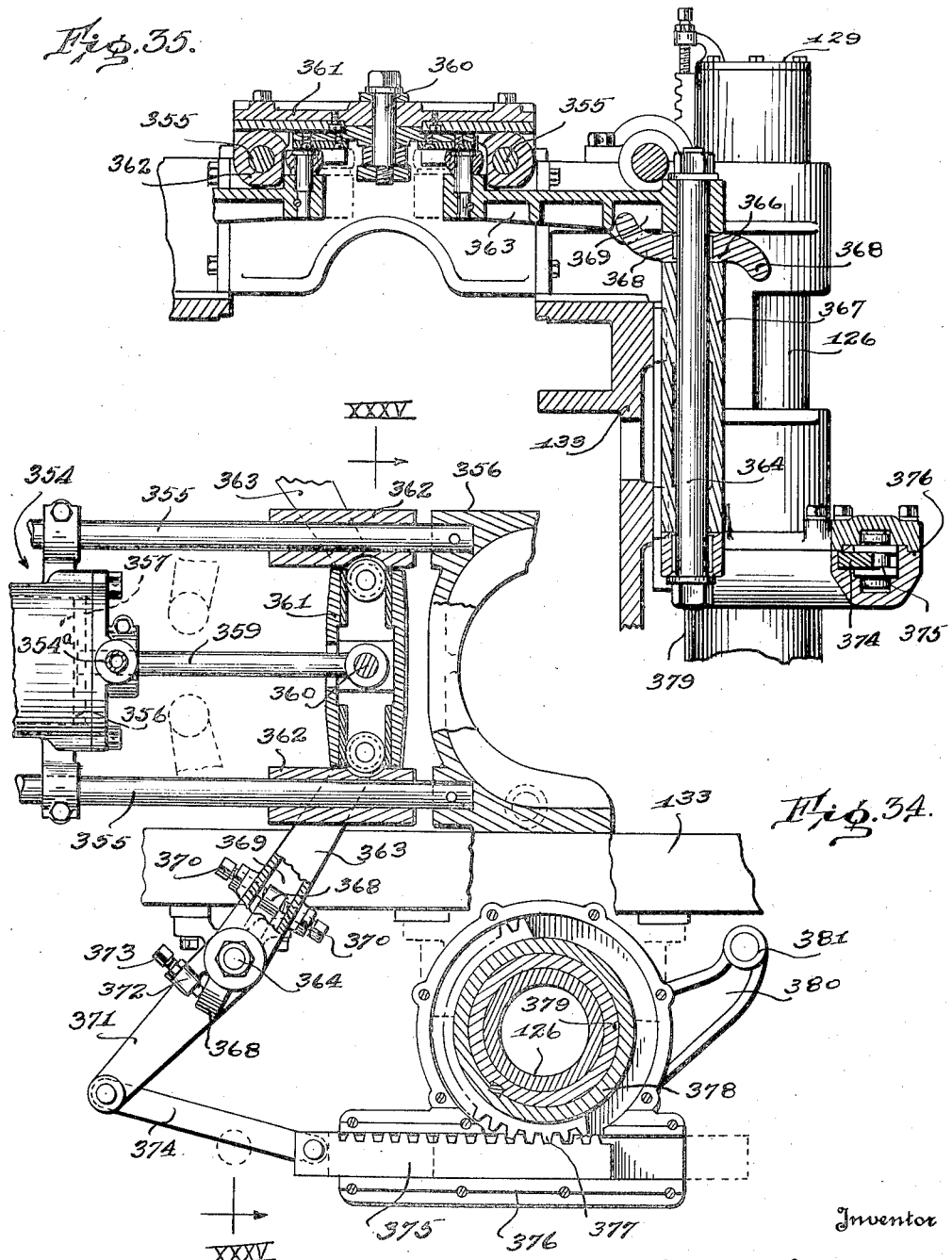

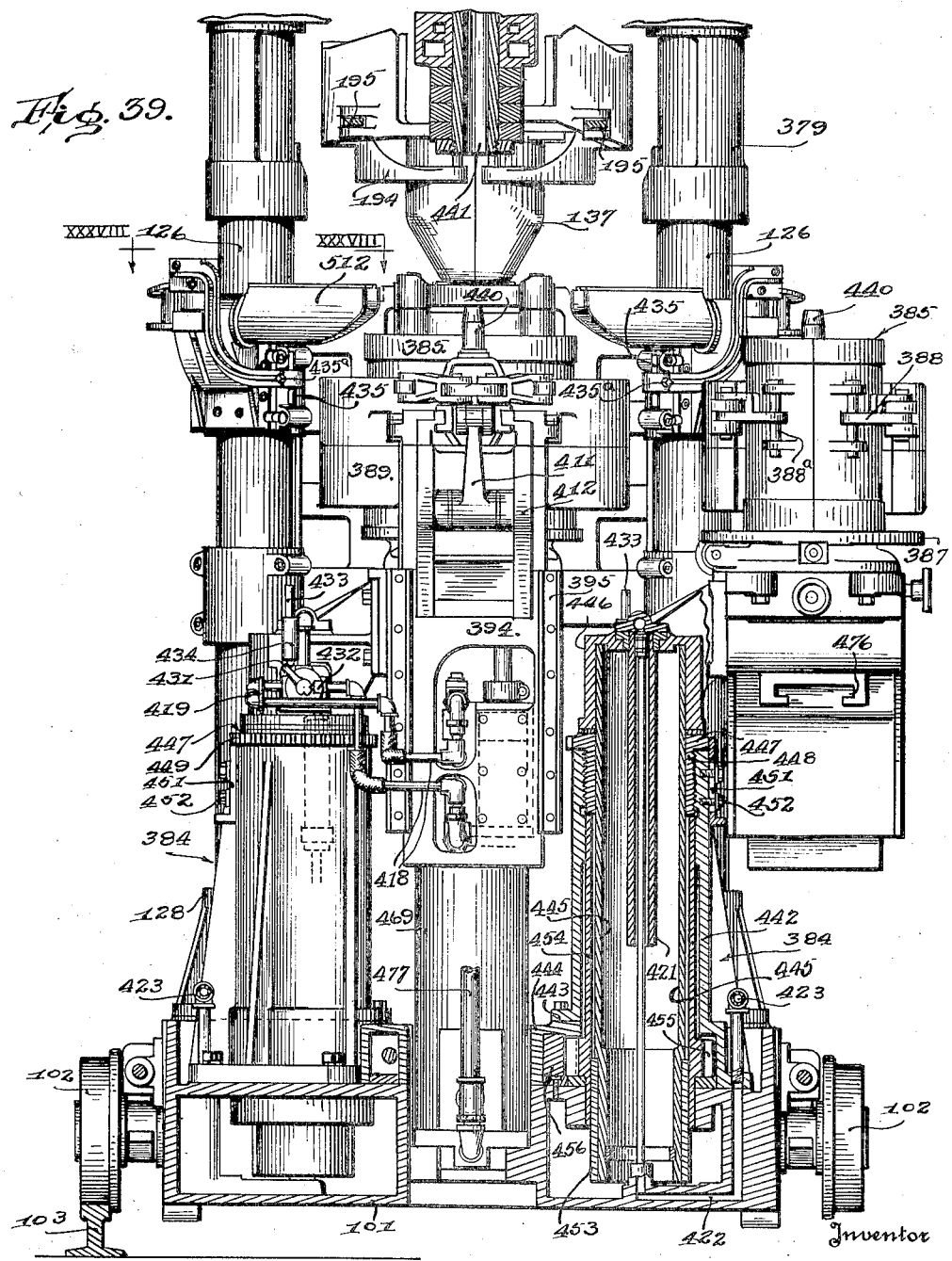

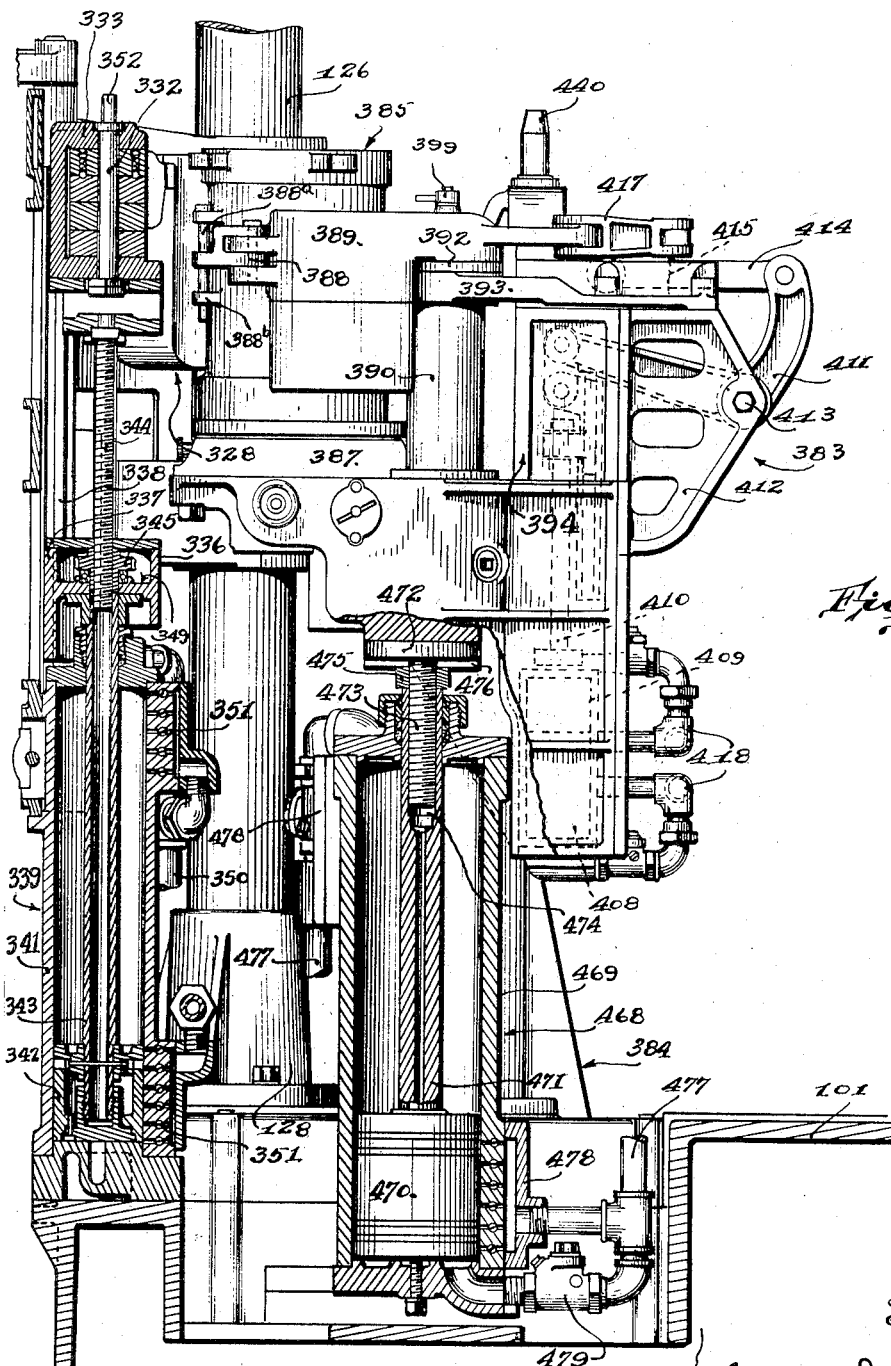

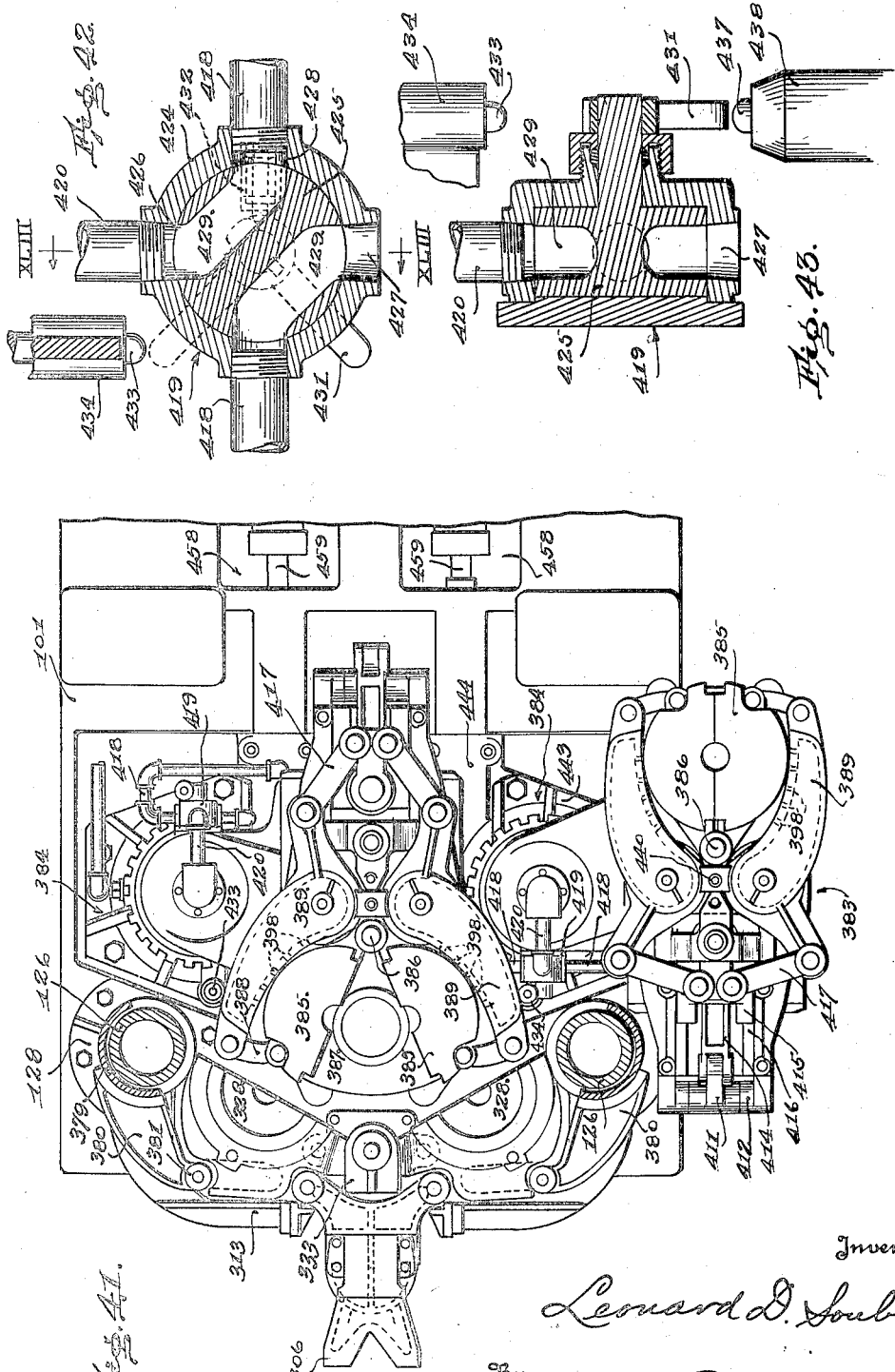

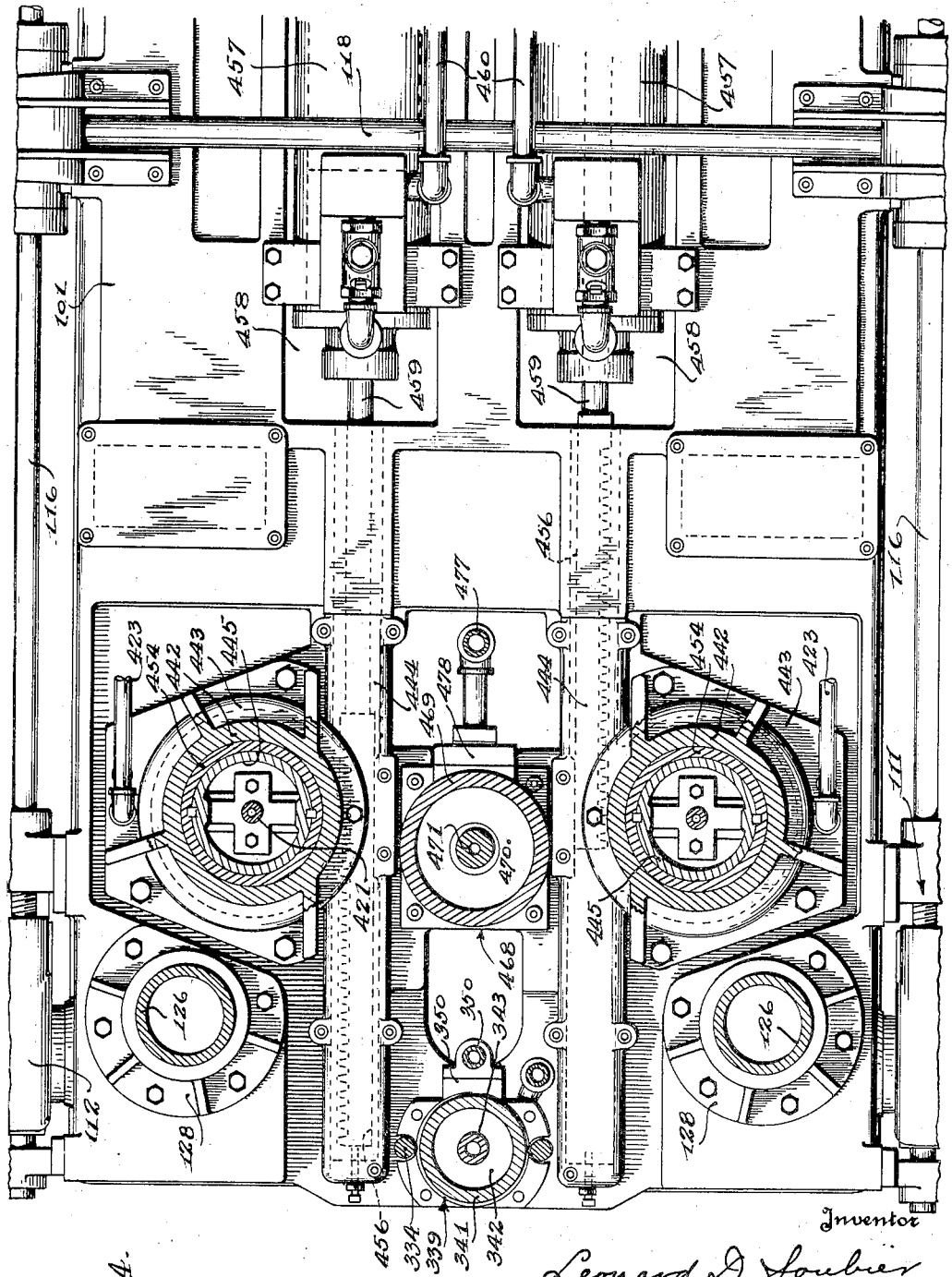

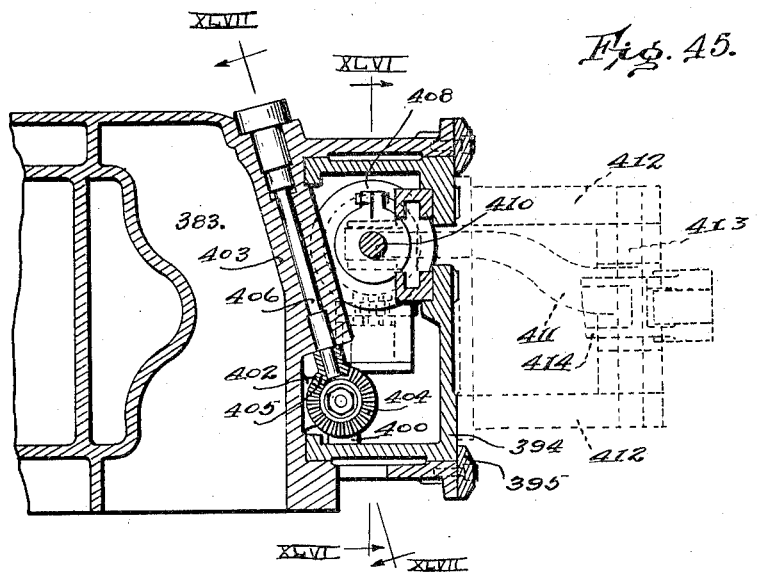
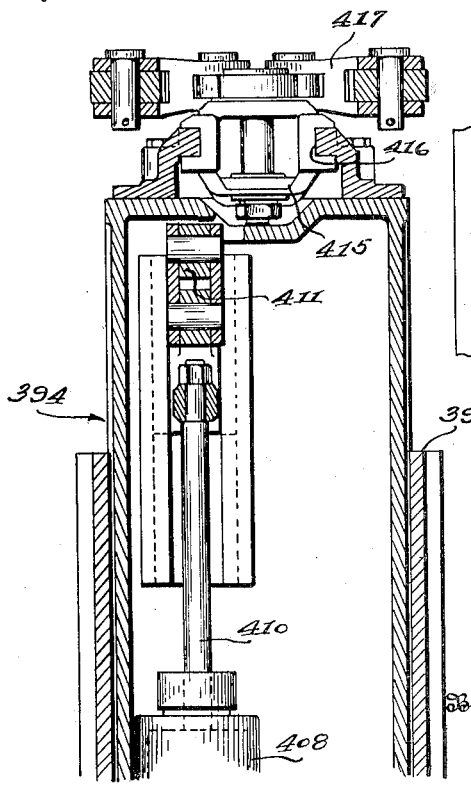
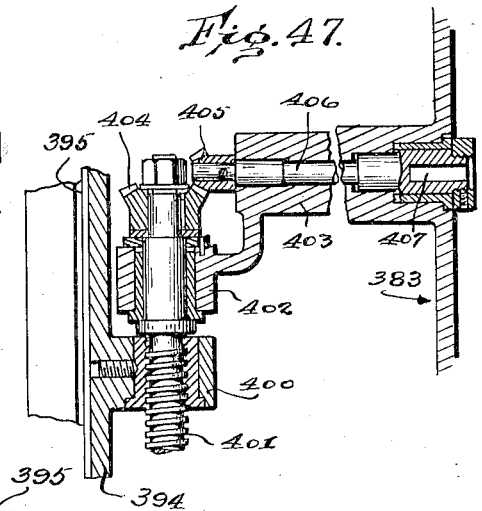

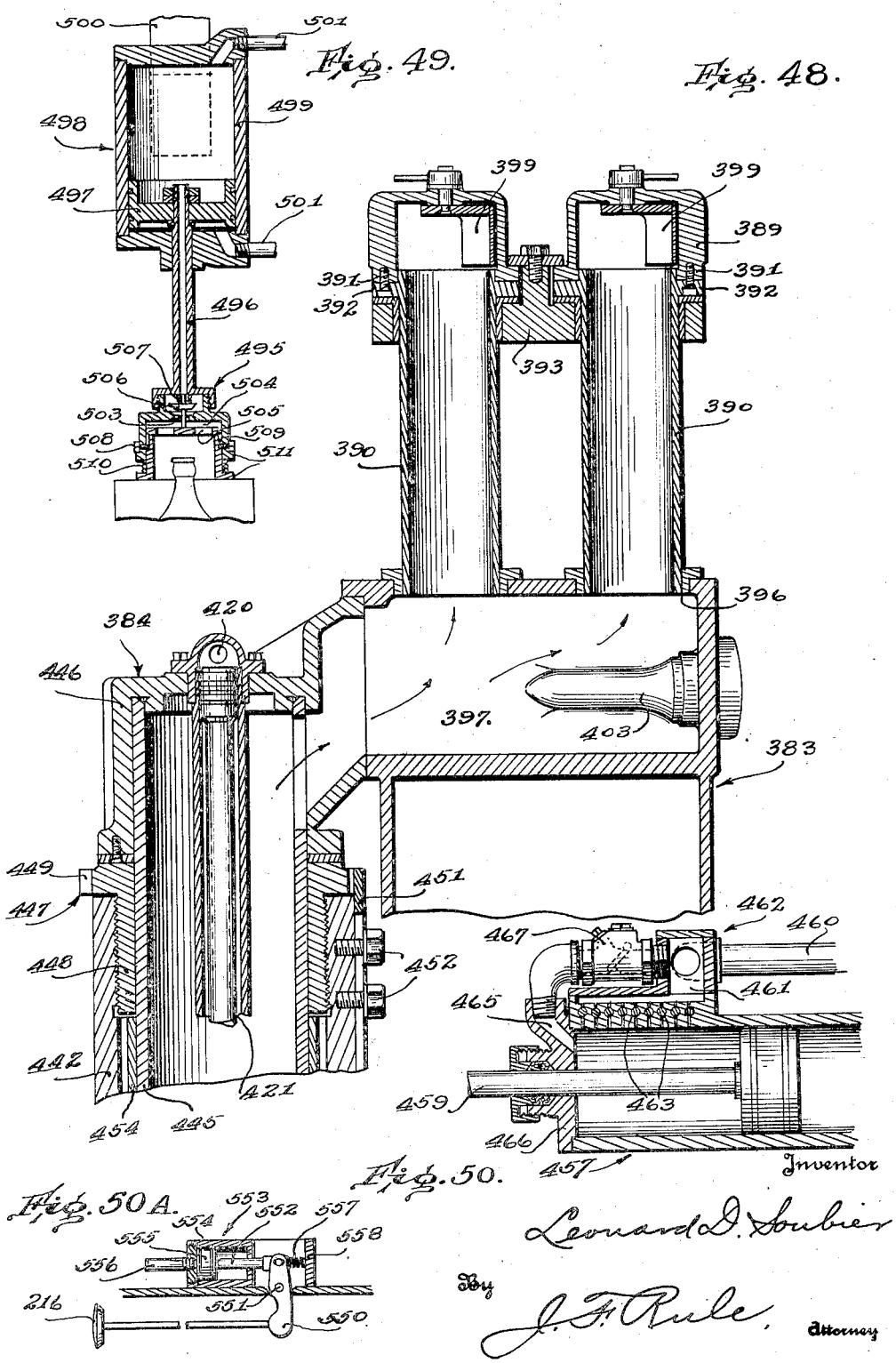

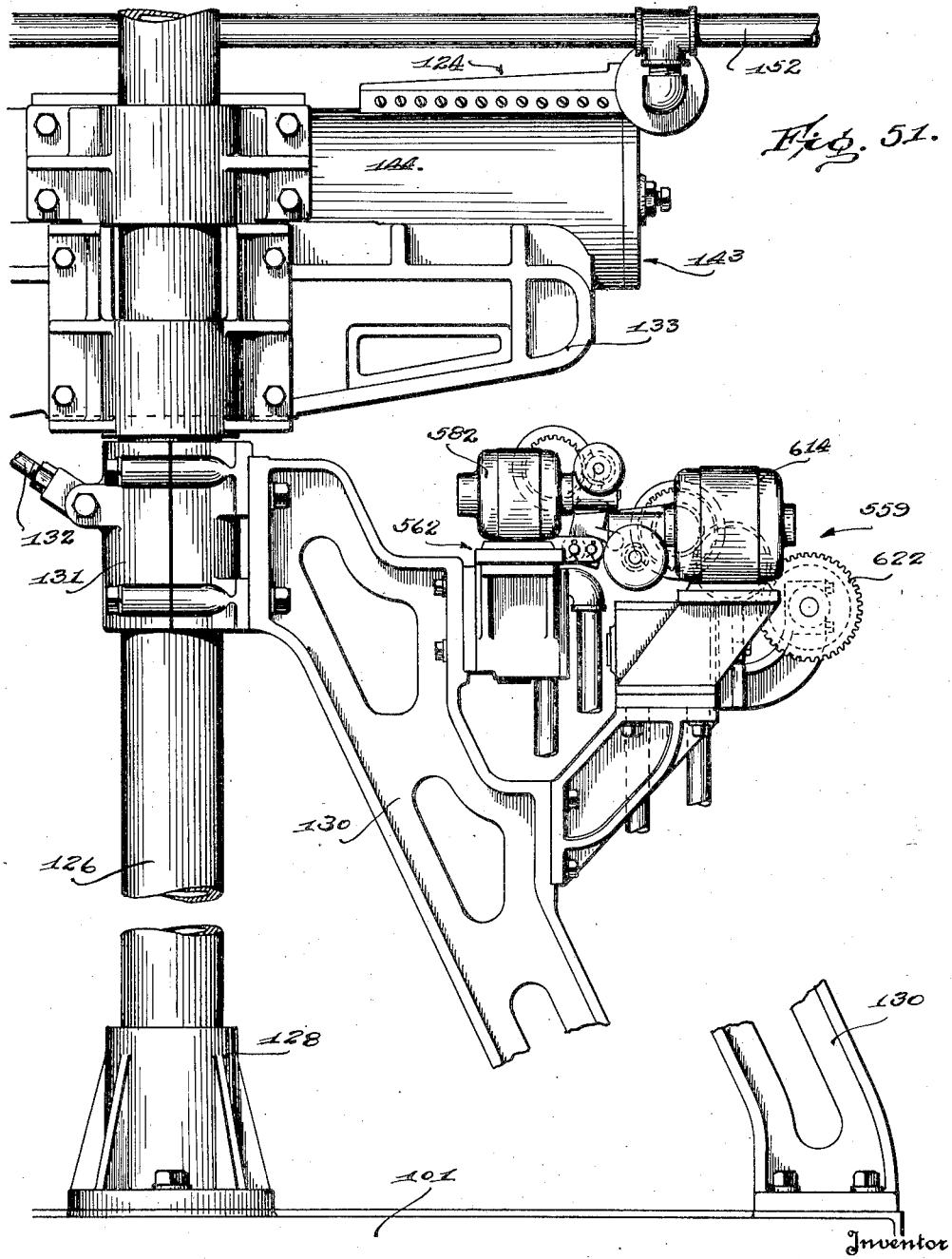

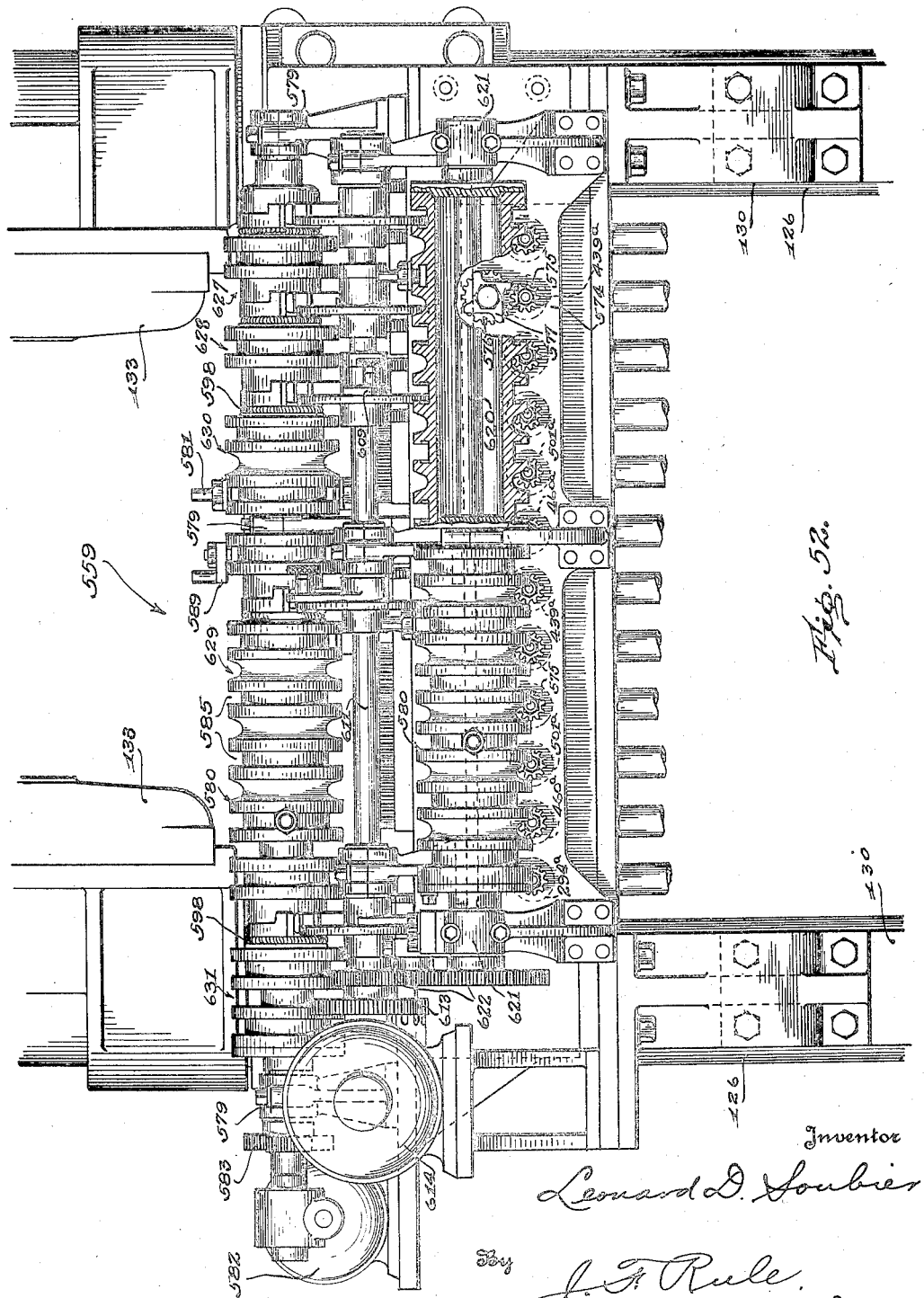

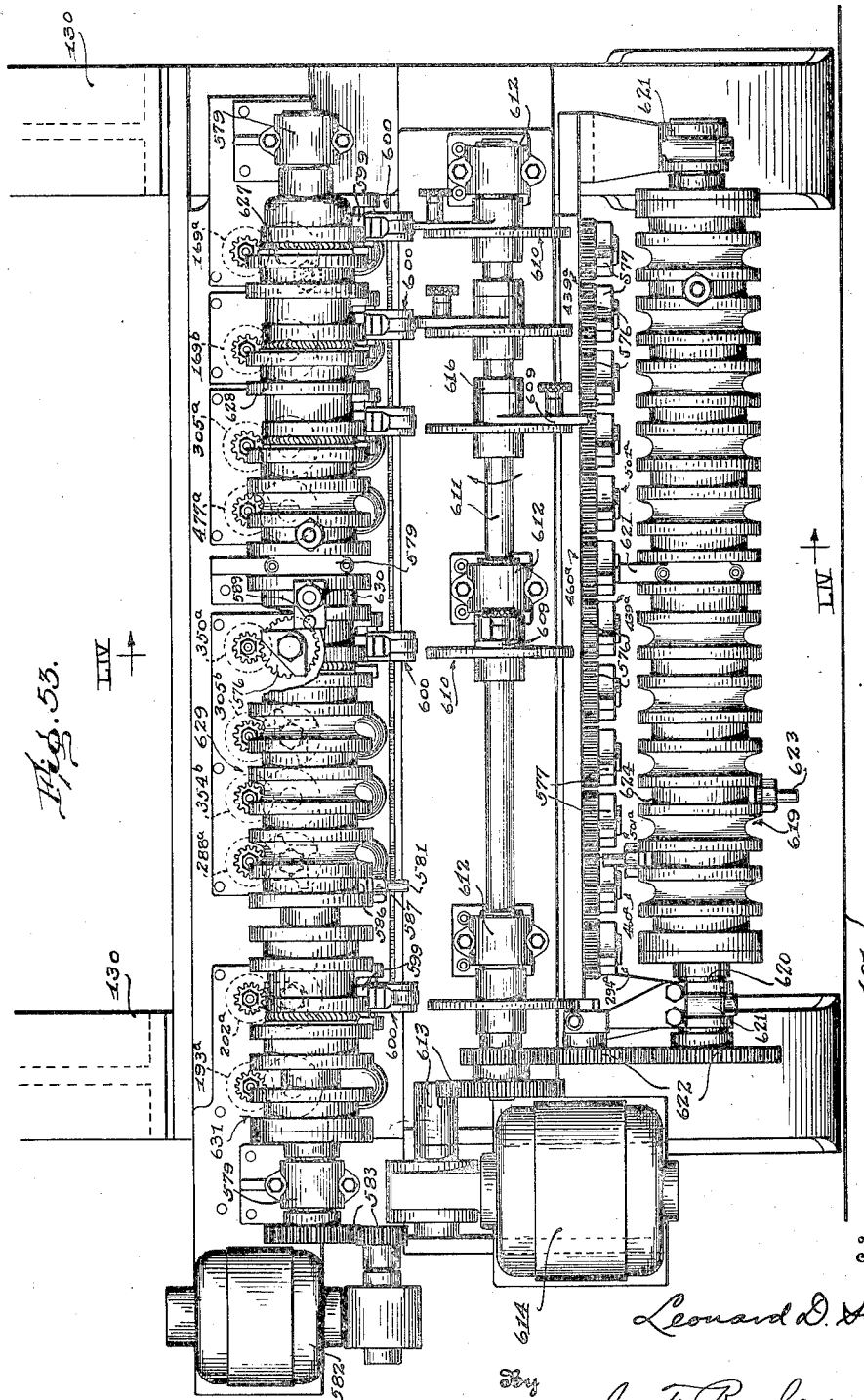

Oct. 23, 1934.　　　L. D. SOUBIER　　　1,977,742
GLASSWARE FORMING MACHINE
Filed March 31, 1933　　　36 Sheets-Sheet 25

Inventor
Leonard D. Soubier
By J. F. Rule,
Attorney

Oct. 23, 1934.                L. D. SOUBIER                1,977,742
                      GLASSWARE FORMING MACHINE
                    Filed March 31, 1933     36 Sheets-Sheet 26
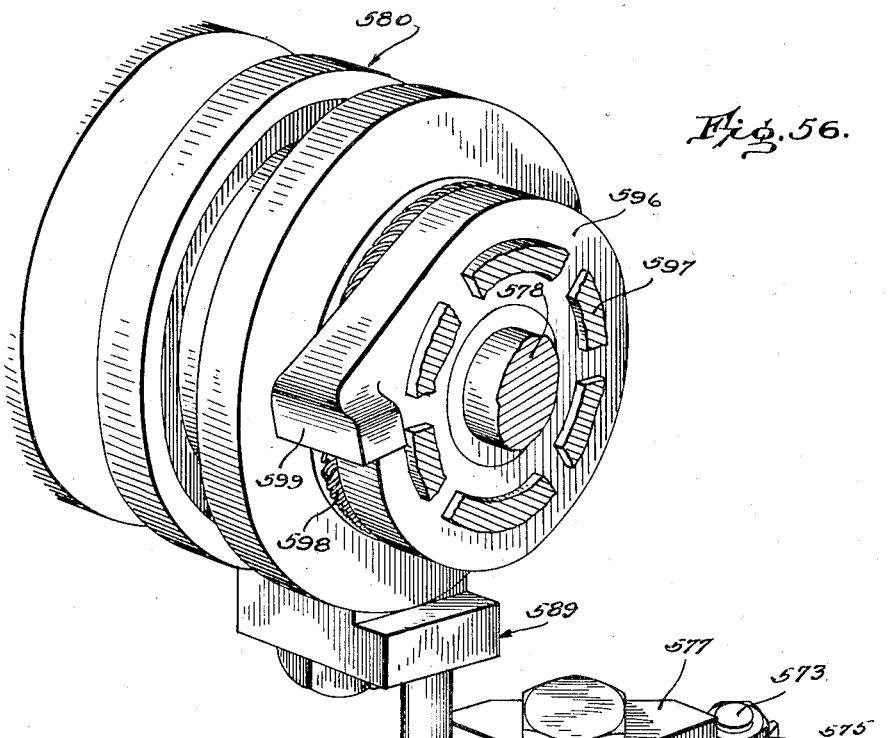
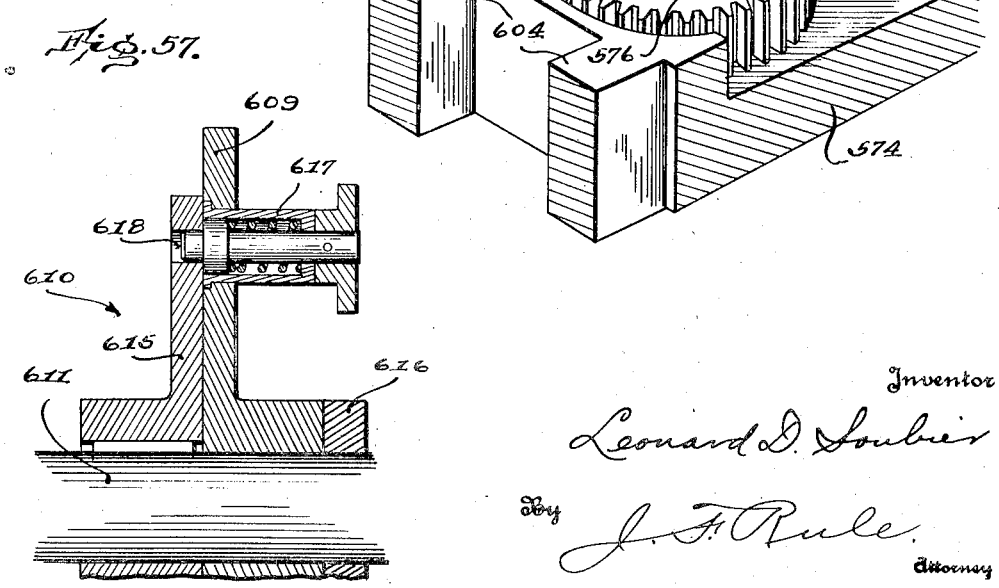
Inventor
Leonard D. Soubier
By J. F. Rule
Attorney Oct. 23, 1934.  L. D. SOUBIER  1,977,742
GLASSWARE FORMING MACHINE
Filed March 31, 1933  36 Sheets-Sheet 27
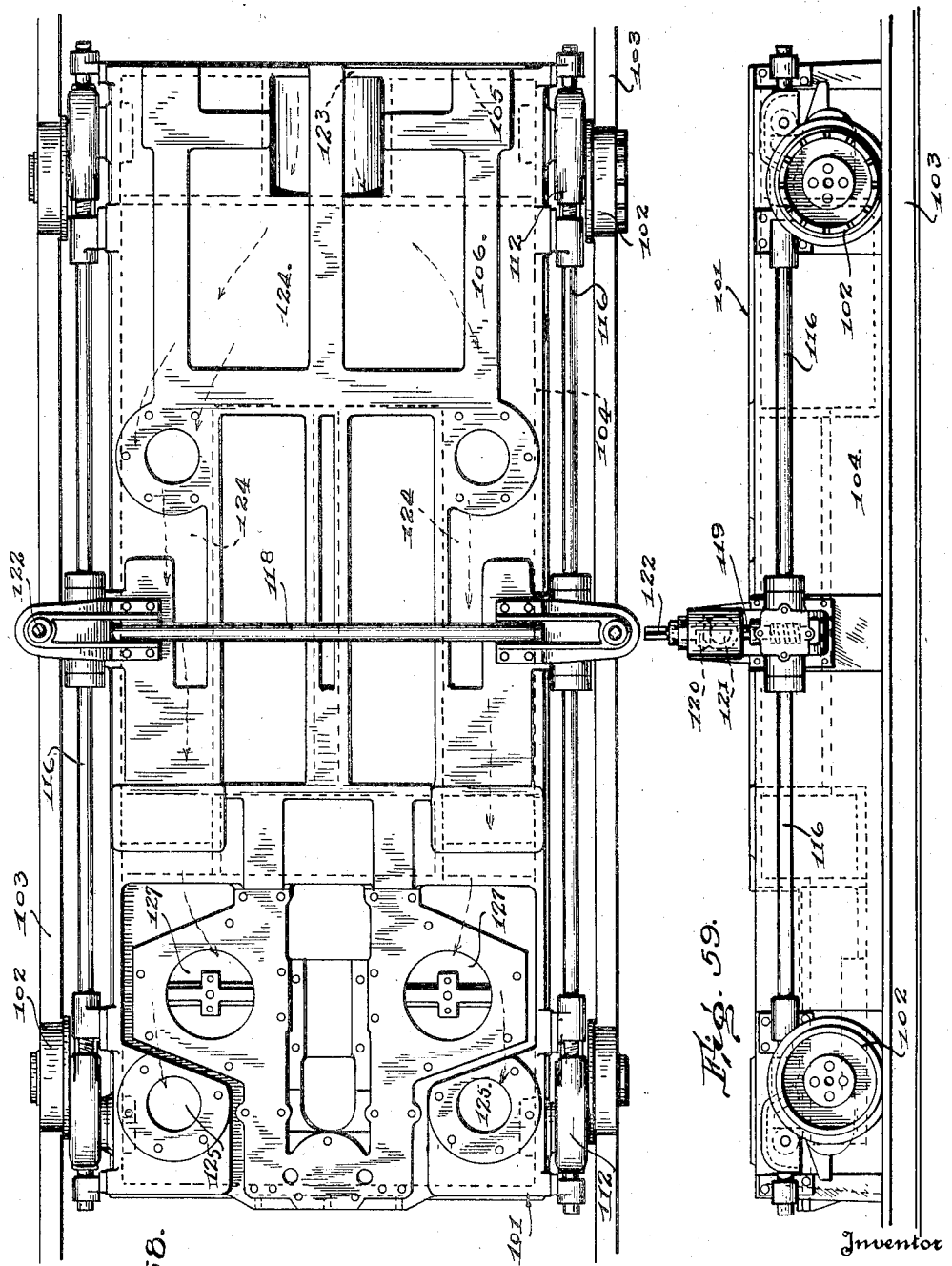

Fig. 6.1.

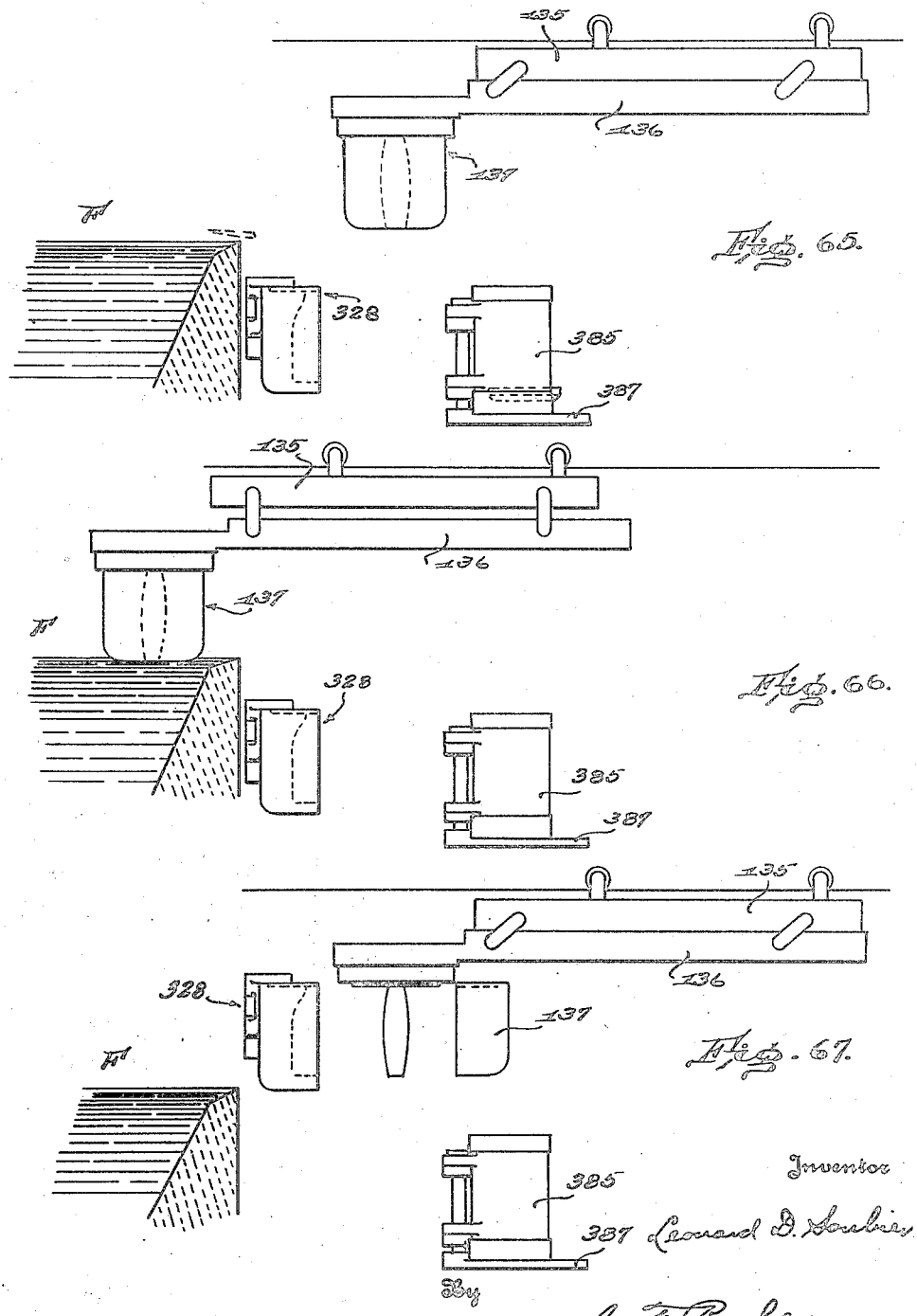

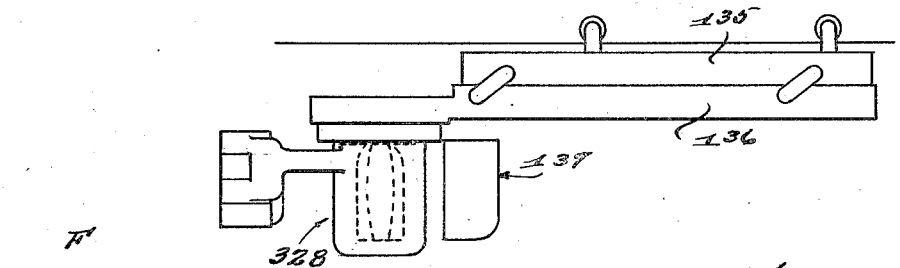
Fig. 68.
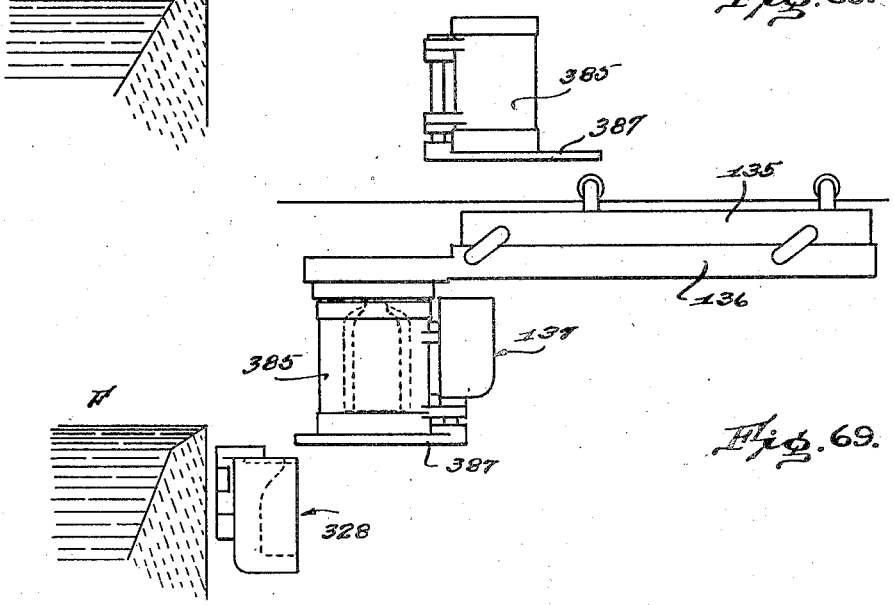
Fig. 69.
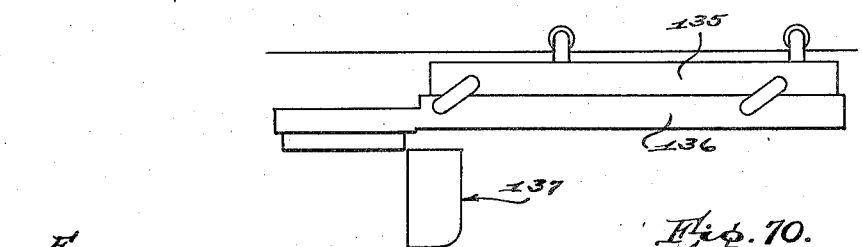
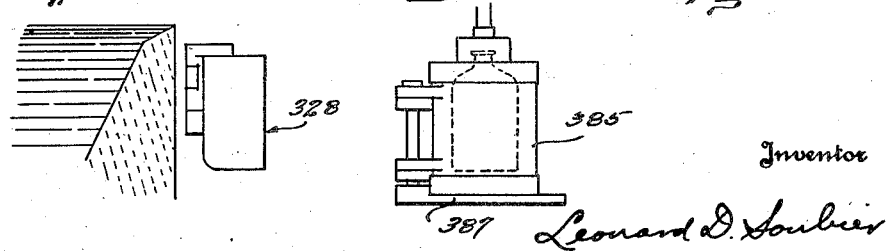
Fig. 70.
Inventor
Leonard D. Soubier
By J. F. Rule,
Attorney

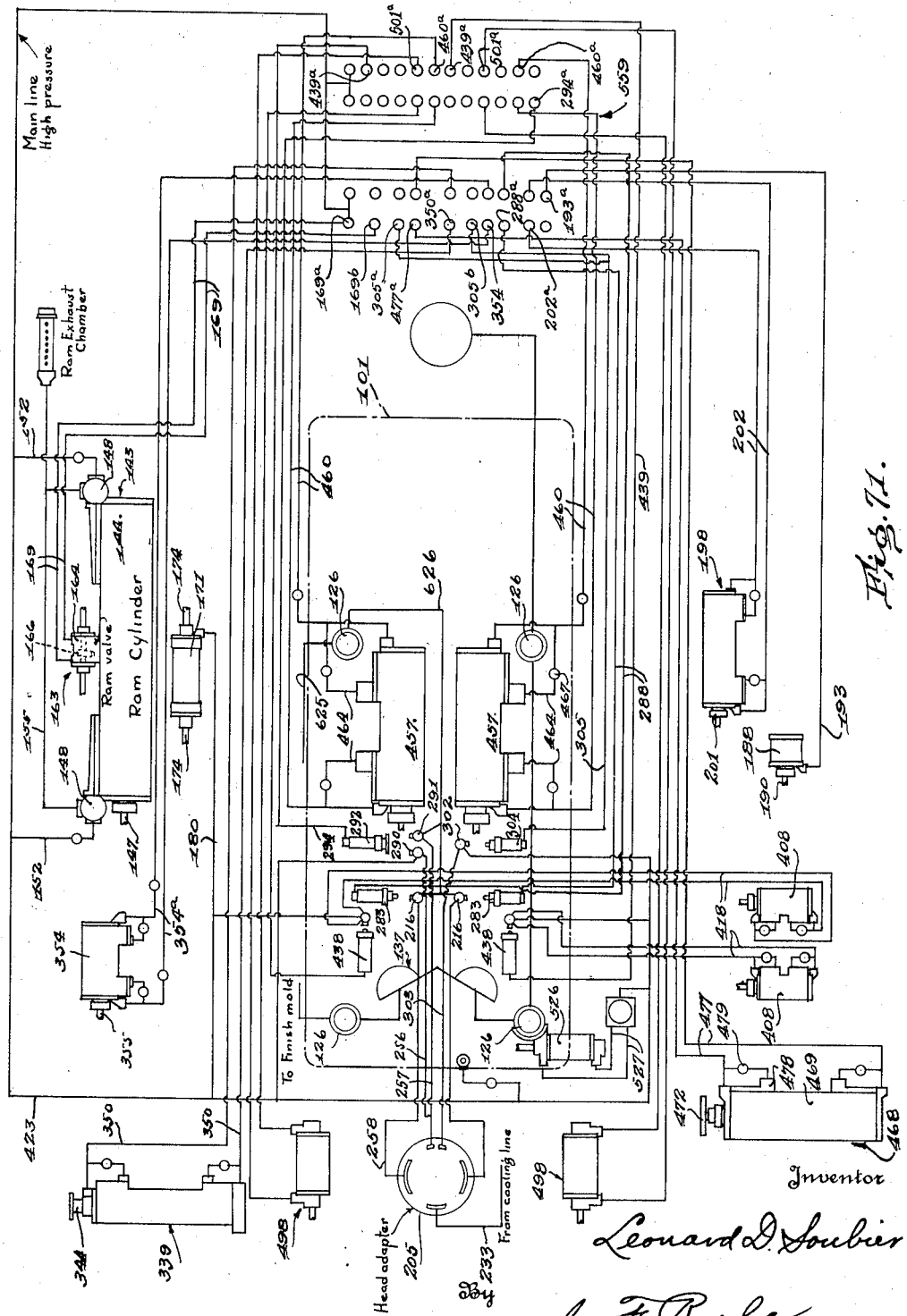

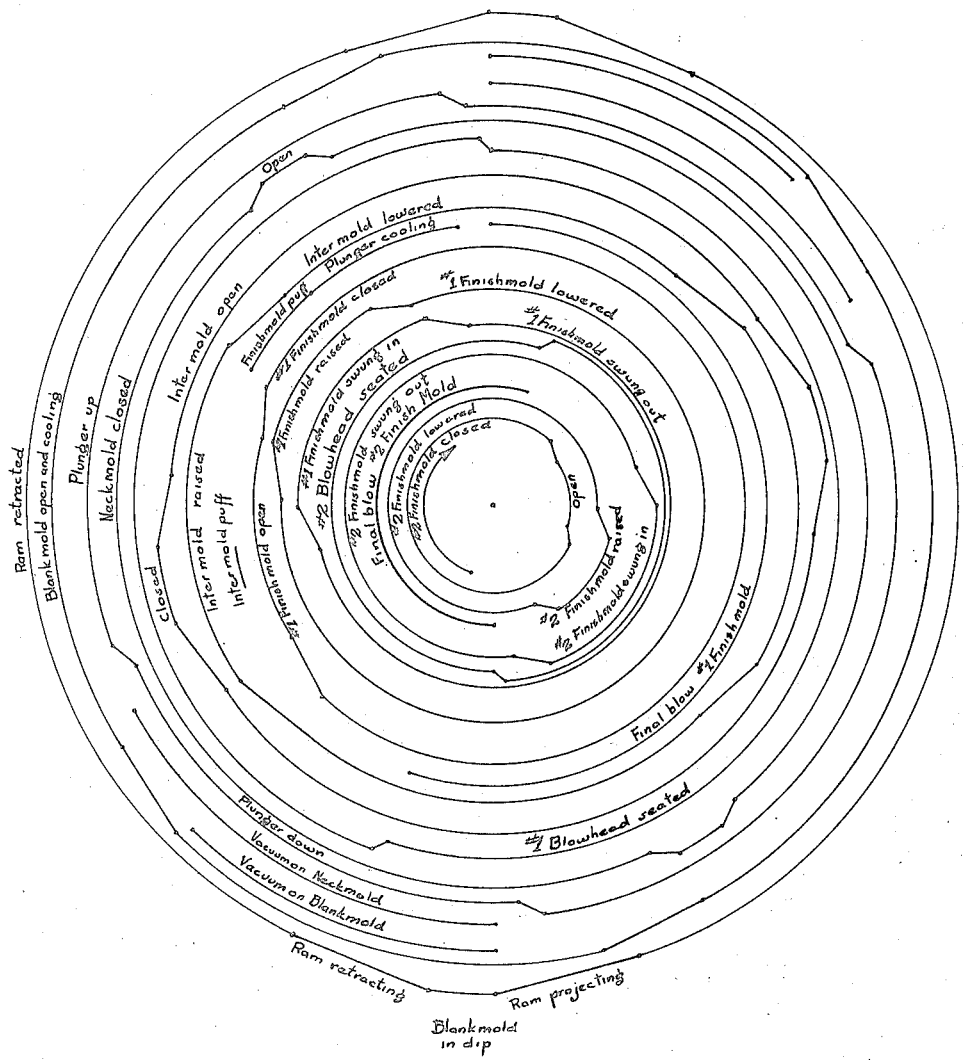

Oct. 23, 1934.                L. D. SOUBIER                 1,977,742
                         GLASSWARE FORMING MACHINE
                   Filed March 31, 1933          36 Sheets-Sheet 35
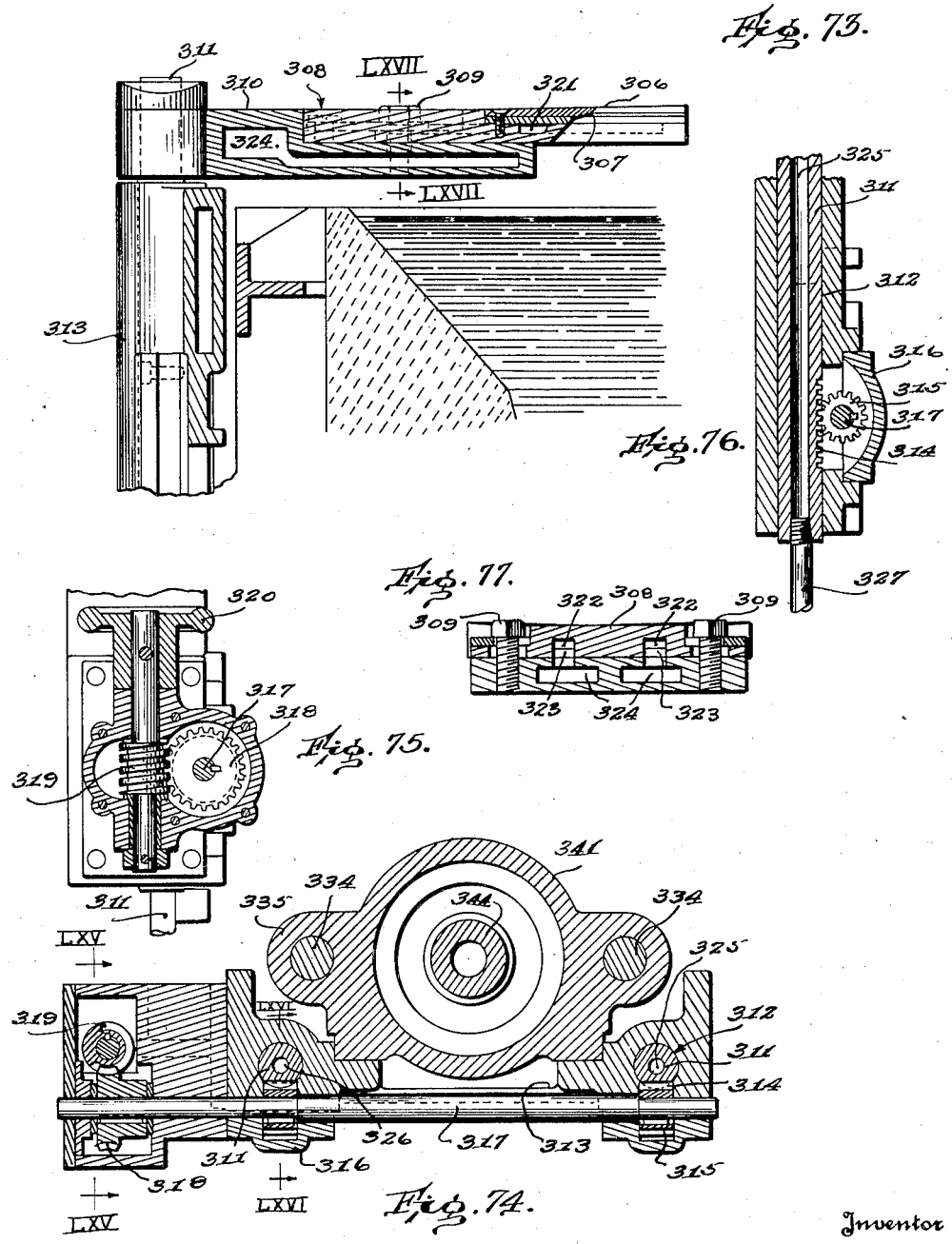

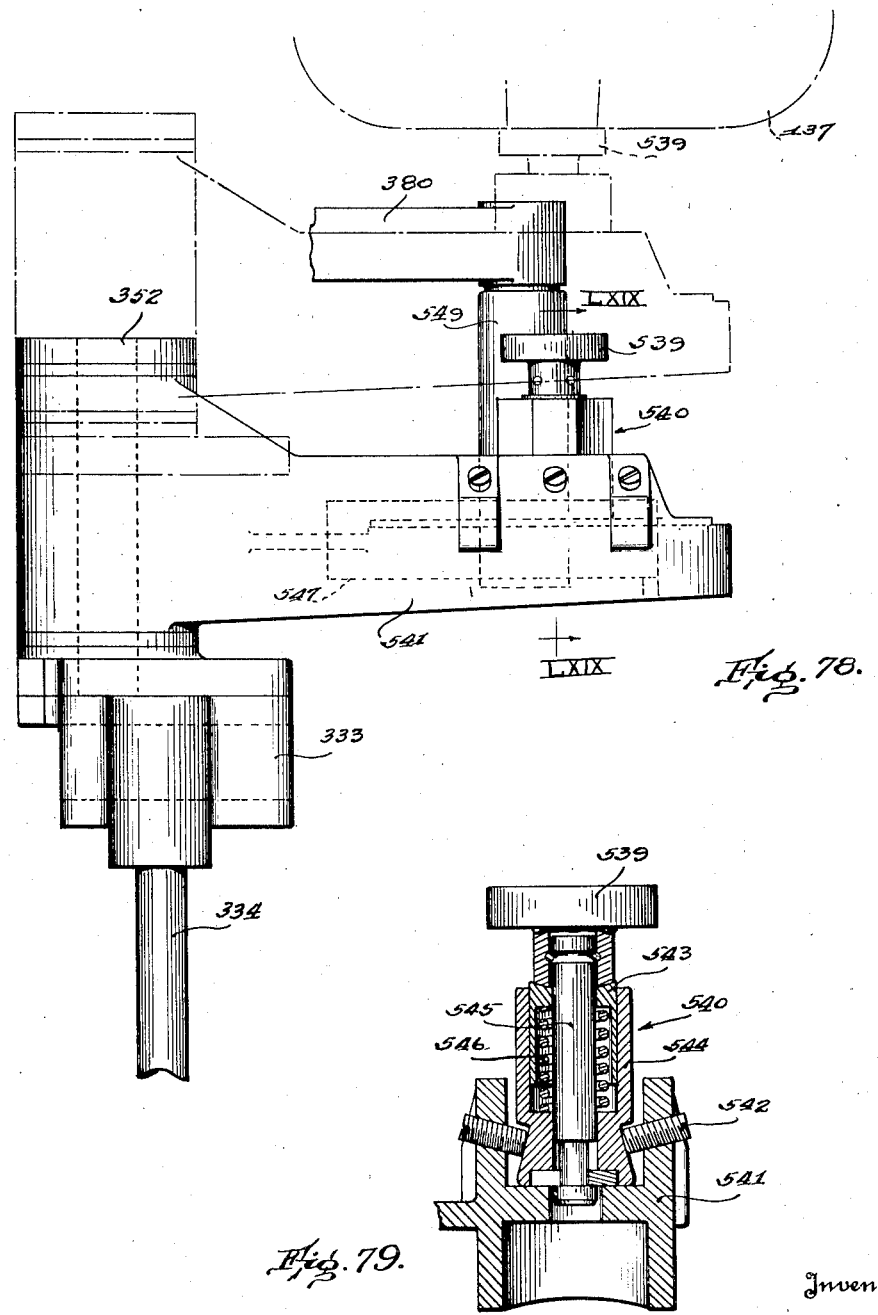

Patented Oct. 23, 1934

1,977,742

UNITED STATES PATENT OFFICE 1,977,742

GLASSWARE FORMING MACHINE

Leonard D. Soubier, Toledo, Ohio, assignor to Owens-Illinois Glass Company, a corporation of Ohio Application March 31, 1933, Serial No. 663,721

53 Claims. (Cl. 49—5)

The present invention relates to improvements in glassware forming machines and more particularly to automatic machines for producing bottles, jars, and the like containers. While the invention is concerned primarily with machines of the type in which measured quantities of molten glass are gathered periodically by suction from a supply body, the principles involved may well form the basis of construction of a machine which obtains its mold charges in a fashion other than lifting the glass into the molds by suction.

In general, glassware forming machines, such as have become more or less standard throughout the glass industry, include mold groups mounted upon either a single rotary carriage or two tables arranged side by side, each mold group comprising a neck mold, body blank mold, and finishing mold. These molds rotate either intermittently or continuously about vertical axes and in each cycle of operations, the body blank and neck molds (and in a single carriage machine, the finishing molds also,) move in succession past mold charging and blank transferring positions. At the first position, measured quantities of molten glass are delivered to the cooperating body blank and neck molds. This glass is transformed into blanks or parisons which are enclosed in the finishing molds at the blank transferring position preparatory to final expansion of said blanks. From this transfer position to the charging position, the body blank molds are idle. This idle period amounts to approximately 75% of the time required for each cycle of operations.

An outstanding feature of the present invention resides in the provision of a construction wherein a single blank mold in a given period of time will approximately double the maximum production of a blank mold of a conventional form of machine in a like period.

Another object is the provision of a novel form of bottle machine in which the time intervals between the various operations may be varied with ease to thereby compensate for temperature differentials in the glass itself, as well as variations in the size and proportions of mold charges being gathered and transformed into finished articles. To this end, provision is made whereby the time of occurrence and duration of the gathering and transferring operations, application of vacuum and air under pressure, plunger retraction, and various other operations, may be regulably controlled.

A further object is the provision of a novel form of finishing mold unit in which adjustment of the carrier to compensate for variations in the height of the molds and other adjustments for changing the point of application of the closing pressure on the mold sections, may be obtained.

It is likewise an object to provide a generally improved and simplified form of machine capable of adjustment with ease to meet varying operating conditions and the specific requirements of different sizes and types of glassware.

Other objects will be in part apparent and in part pointed out hereinafter.

In the drawings:

Fig. 4 is a fragmentary side elevational view showing the blank mold carrier or ram in mold charging position and a swinging cut-off knife in lieu of the stationary knife in Fig. 1.

Fig. 5 is a sectional view taken along the line V—V of Fig. 4.

Fig. 6 is a sectional elevational view showing in detail the ram projecting and mold opening and closing mechanisms.

Fig. 7 is a detail sectional view of the valves and cushioning devices at the ends of the ram motor.

Fig. 8 is a fragmentary perspective view of one of the valves.

Fig. 9 is a fragmentary elevational view taken from the opposite side of that shown in Fig. 4.

Fig. 10 is a detail sectional view of the mechanism for operating the plunger, air, and vacuum valves.

Fig. 11 is a detail sectional view of the air control valve.

Fig. 12 is a detail sectional view of the vacuum control valve.

Fig. 13 is a detail vertical sectional view showing the neck mold and plunger mechanisms and a portion of the front end of the ram or mold carrier.

Fig. 14 is a sectional view taken substantially along the line XIV—XIV of Fig. 13.

Fig. 15 is a horizontal sectional view taken substantially along the line XV—XV of Fig. 14.

Fig. 16 is a fragmentary sectional view showing the supply conduit for air and vacuum to the plunger reciprocating motor.

Fig. 17 is a sectional plan view taken along the line XVII—XVII of Fig. 13, showing the blank mold holder with the plunger mechanism removed therefrom.

Fig. 18 is a horizontal sectional view showing the separate valves for controlling the application of vacuum to the body blank and neck molds.

Fig. 19 is a fragmentary sectional elevational view of the mechanism for opening the valves shown in Fig. 18.

Figs. 20, 21, and 22 are horizontal sectional views taken substantially along the lines XX—XX, XXI—XXI, and XXII—XXII of Fig. 13.

Fig. 23 is a fragmentary front elevational view of the machine showing the charge severing mechanism.

Fig. 24 is a vertical sectional view showing the air cooled cutter.

Fig. 25 is a fragmentary plan view with parts in section showing a swinging cut-off knife and baffle plate.

Fig. 26 is a fragmentary rear elevational view of the mechanisms shown in Fig. 25.

Fig. 27 is a view similar to Fig. 25 showing the knife in severing position.

Fig. 28 is a sectional plan view of the control mechanism for the knife.

Fig. 29 is a detail plan view of the control valves.

Fig. 30 is a sectional elevational view taken substantially along the line XXX—XXX of Fig. 28.

Fig. 31 is a fragmentary rear elevational view showing the secondary or intermediate mold mechanism.

Figure 32:
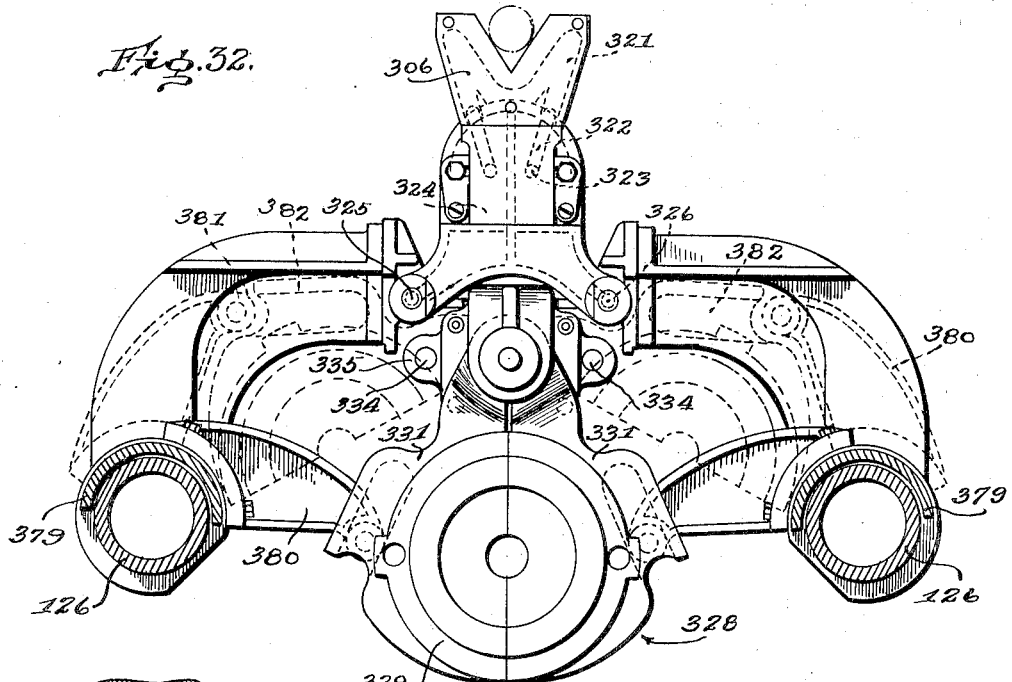

Fig. 32 is a plan view thereof.

Figure 33:
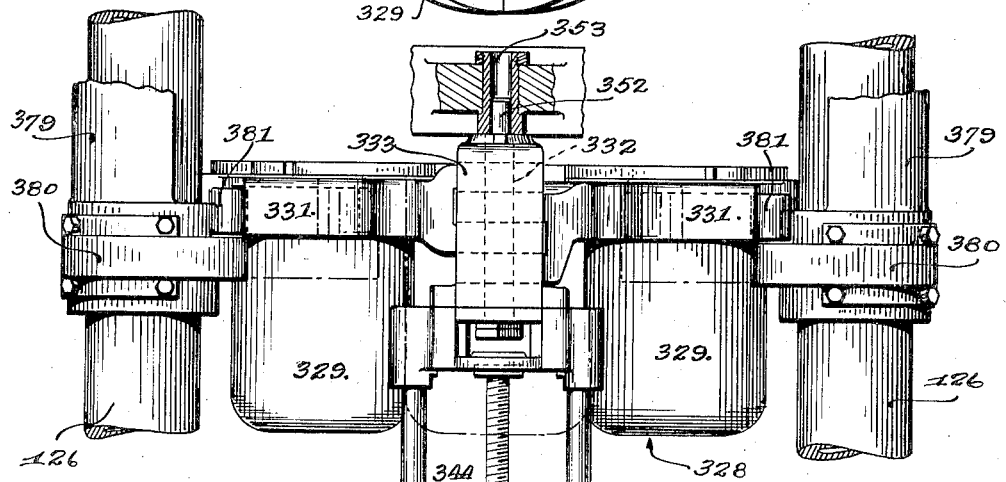

Fig. 33 is a front elevational view thereof.

Fig. 34 is a sectional plan view of the operating mechanism for the secondary mold.

Fig. 35 is a sectional view taken along the line XXXV—XXXV of Fig. 34.

Fig. 36 is a sectional view taken along the line XXXVI—XXXVI of Fig. 31.

Fig. 37 is a sectional elevational view taken substantially along the line XXXVII—XXXVII of Fig. 9.

Fig. 38 is a sectional plan view taken along the line XXXVIII—XXXVIII of Fig. 39.

Fig. 39 is an elevational view with parts in section showing the finishing molds and operating mechanism therefor.

Fig. 40 is a fragmentary side elevational view showing one of the finishing molds and the raising mechanism.

Fig. 41 is a plan view showing the two extreme positions of the finishing molds.

Fig. 42 is a detail view of the valve for controlling opening and closing of the finishing mold.

Fig. 43 is a sectional view taken along the line XLIII—XLIII of Fig. 42.

Fig. 44 is a sectional plan view showing the mechanism for moving the finishing molds between the blank transferring and article discharging positions.

Fig. 45 is a sectional elevational view showing the opening and closing mechanism for one of the finishing molds.

Fig. 46 is a vertical sectional view taken along the line XLVI—XLVI of Fig. 45, showing a part of the opening and closing mechanism for one of the finishing molds.

Fig. 47 is a sectional elevational view taken along the line XLVII—XLVII of Fig. 45, showing the device for adjusting the finishing mold vertically.

Fig. 48 is a fragmentary sectional view showing means for supplying cooling air to one of the finishing molds and bottom plates.

Fig. 49 is a sectional view of one of the blowing heads and its operating motor.

Fig. 50 is a sectional elevational view of one end of a motor for swinging a finishing mold carrier.

Fig. 50—A is a detail view of another form of device for actuating the vacuum control valves.

Fig. 51 is a fragmentary side elevational view showing the timer mechanism.

Fig. 52 is a fragmentary rear elevational view showing the timer mechanism which regulably controls operation of the machine.

Fig. 53 is a plan view thereof.

Figure 54:
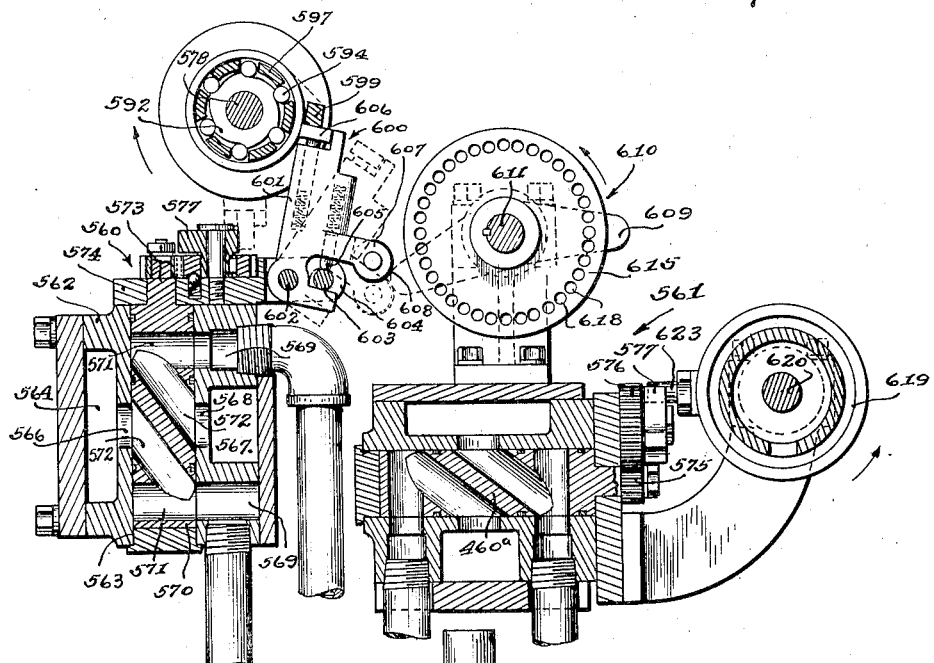

Fig. 54 is a sectional view taken substantially along the line LIV—LIV of Fig. 53.

Figure 55:
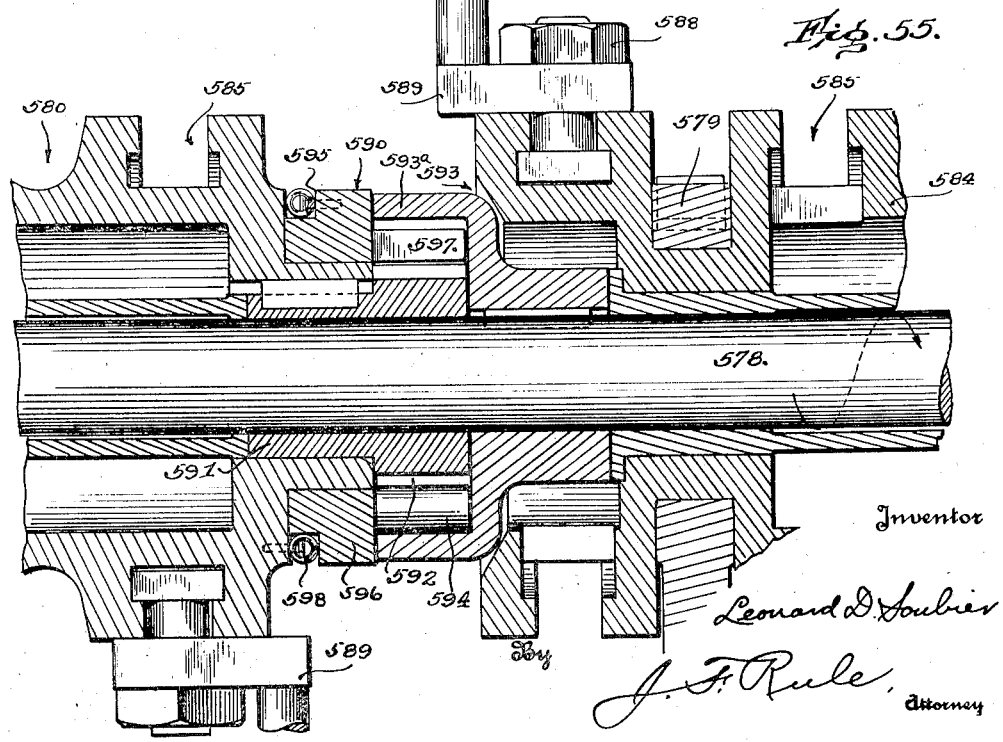

Fig. 55 is a detail sectional view illustrating the clutch construction used in the timer mechanism.

Fig. 56 is a detail perspective view with parts in section illustrating one unit of the timer mechanism.

Fig. 57 is a detail sectional view illustrating a part of the clutch operating mechanism.

Fig. 58 is a plan view of the base.

Fig. 59 is a side elevational view thereof.

Figure 3:
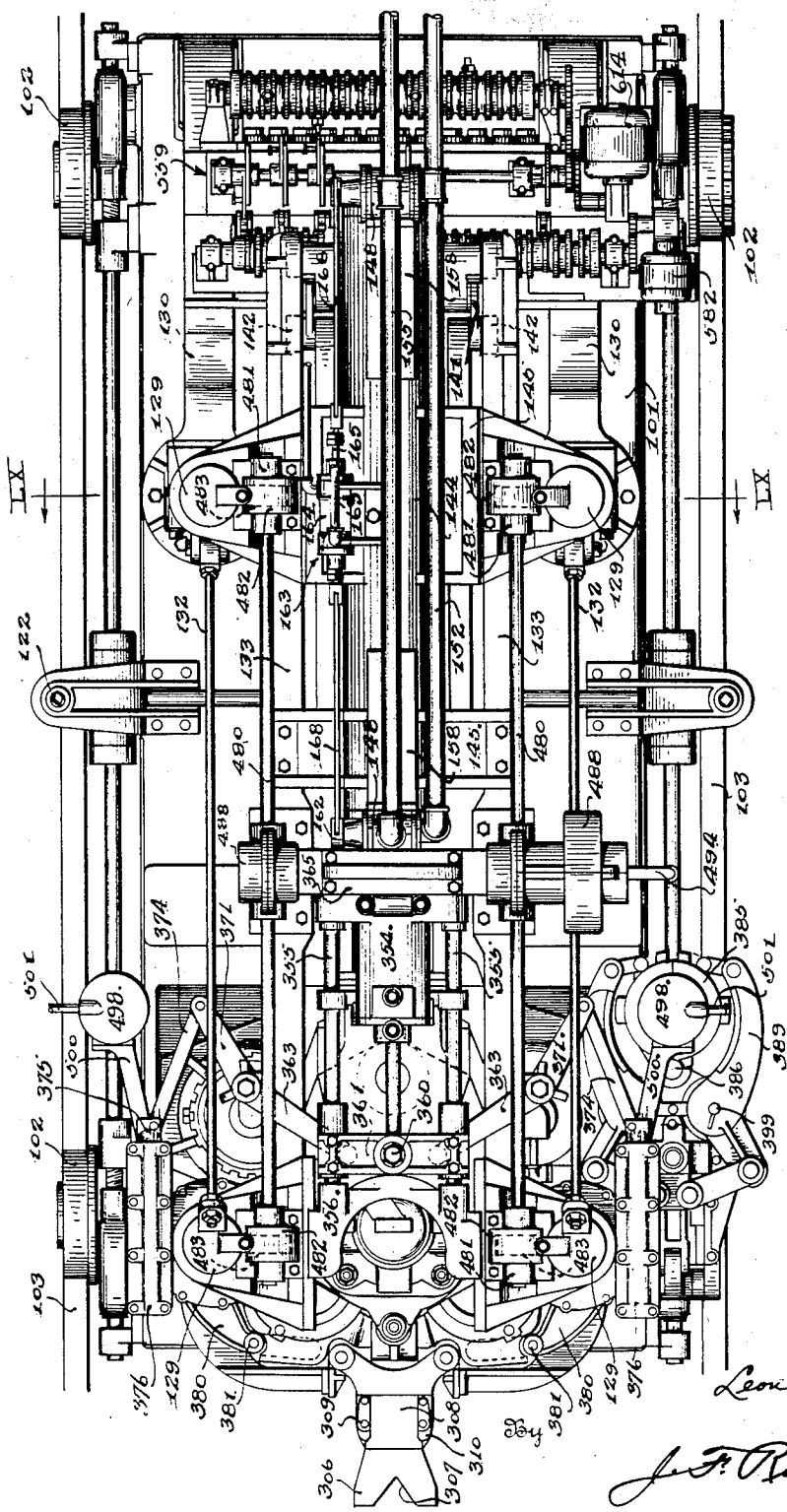
Fig. 3 is a top plan view thereof.
Figure 60:
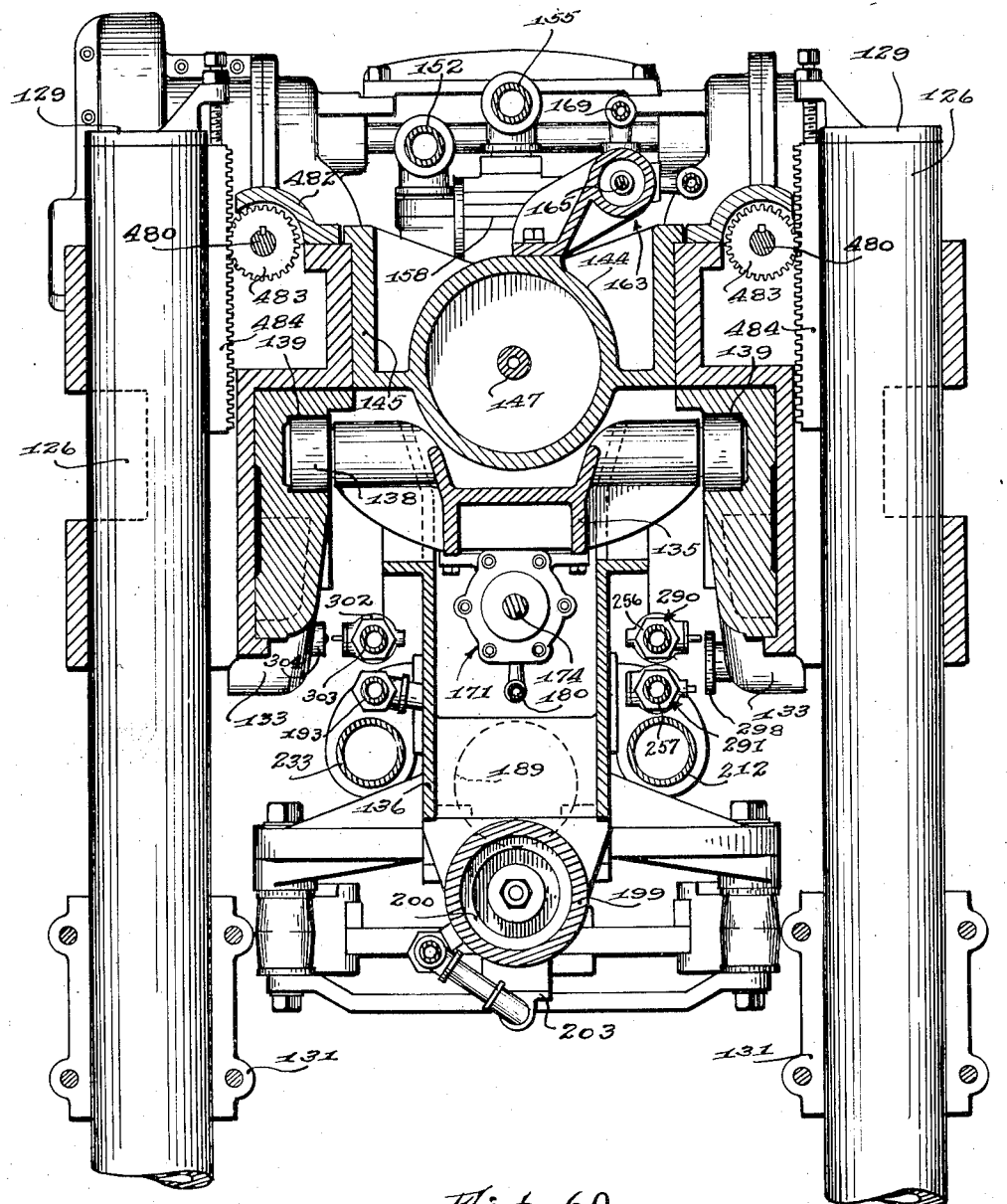

Fig. 60 is a sectional elevational view taken along the line LX—LX of Fig. 3.

Figure 61:
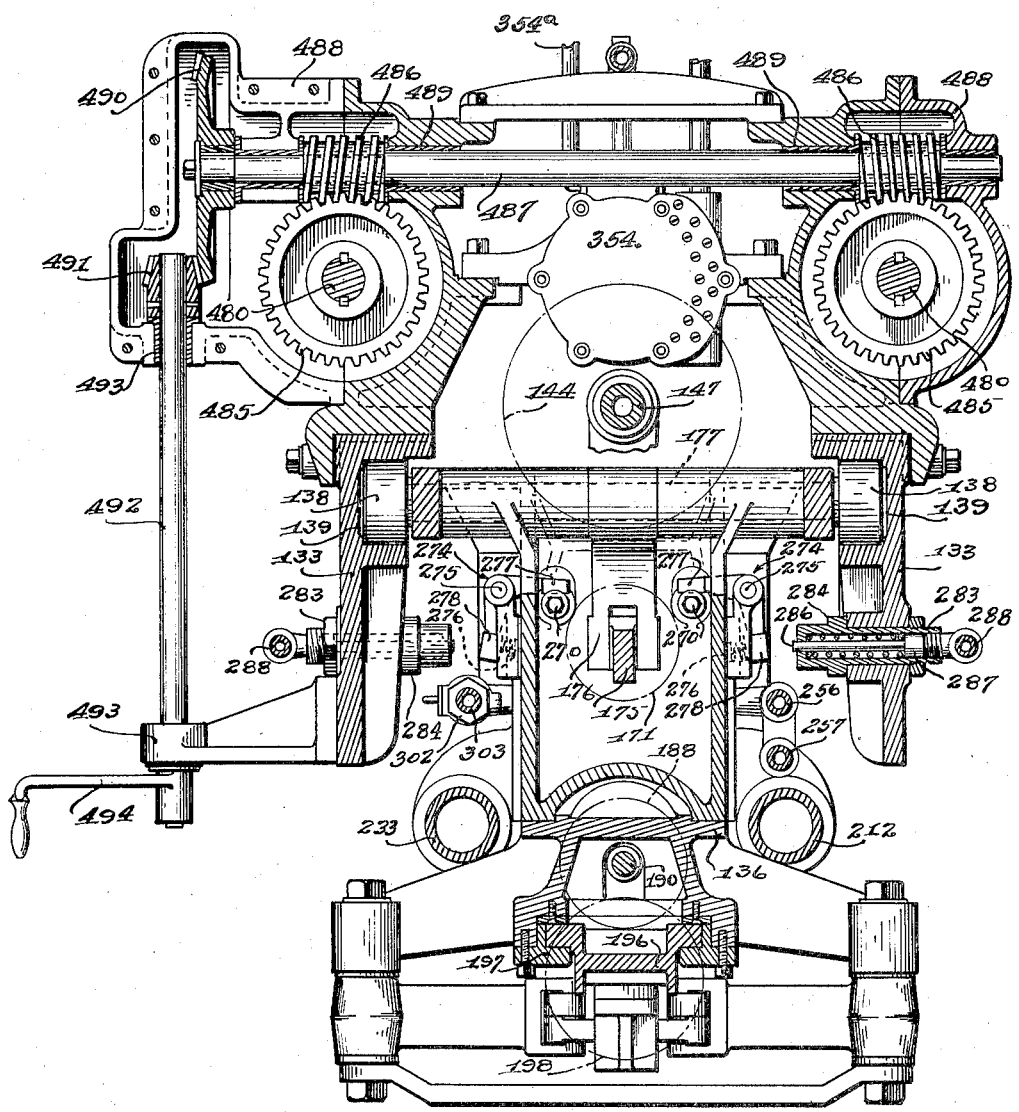

Fig. 61 is a vertical transverse sectional view through the upper part of the machine illustrating the mechanism for vertically adjusting the position of the ram.

Figure 62:
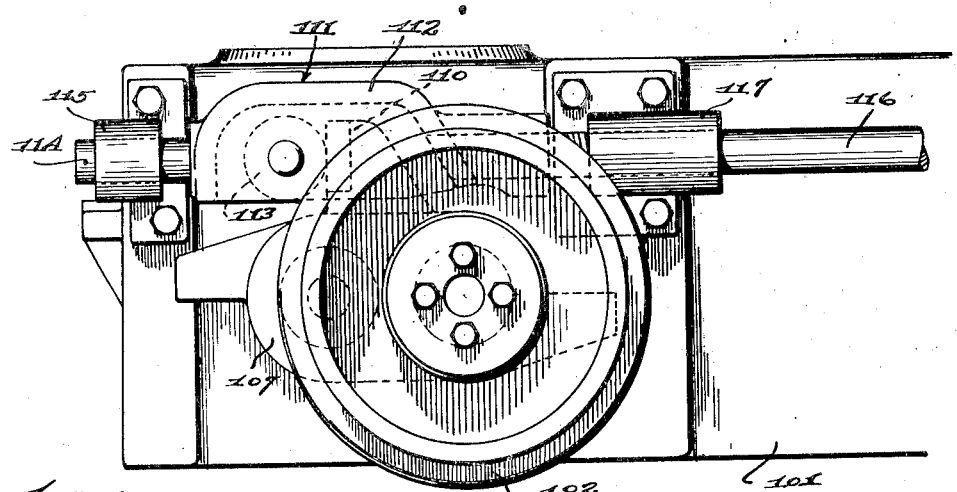
Figure 63:
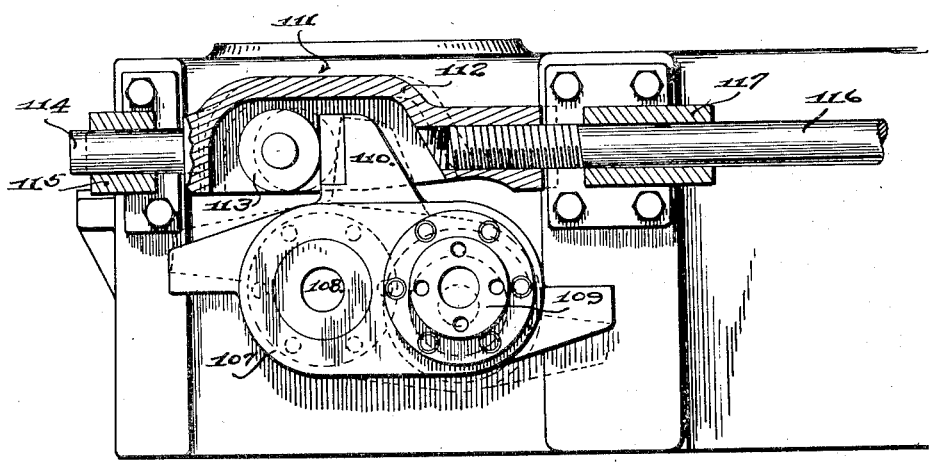
Figure 64:
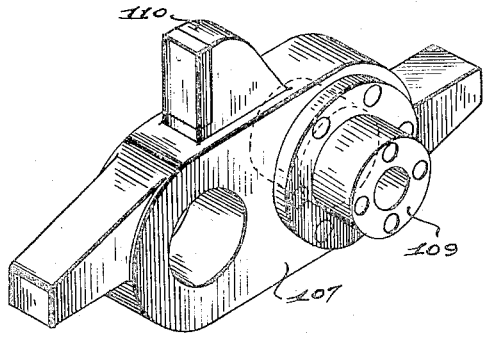

Figs. 62, 63, and 64 are views illustrating in detail, means for raising and lowering the entire machine. Fig. 62 is an elevational view of one corner of the base. Fig. 63 is a sectional elevational view with the wheel removed and Fig. 64 is a perspective view of the wheel bearing.

Figs. 65 to 70 inclusive, illustrate diagrammatically the successive positions occupied by the molds in a single cycle of operations. Fig. 65 shows the blank mold in its retracted position. Fig. 66 shows the blank mold in charging position. Fig. 67 shows the blank mold open in its retracted position and the secondary or intermediate mold about to enclose the blank or parison suspended from the neck mold. Fig. 68 shows the secondary mold closed about the parison. Fig. 69 shows the secondary mold lowered and the finishing mold enclosing the parison. Fig. 70 shows the finishing mold enclosing the finished article and occupying the article discharging position.

Fig. 71 is a pipe diagram.

Fig. 72 is a chart illustrating the relation between the various operations.

Fig. 73 is a detail sectional elevational view showing the stationary type of knife in charge severing position.

Fig. 74 is a horizontal sectional view of the mechanism for adjusting the cutting knife vertically.

Fig. 75 is a sectional elevational view taken along the line LXXV—LXXV of Fig. 74.

Fig. 76 is a vertical sectional view taken substantially along the line LXXVI—LXXVI of Fig. 74.

Fig. 77 is a sectional view taken substantially along the line LXXVII—LXXVII of Fig. 73.

Fig. 78 is a fragmentary elevational view showing the compression plate mechanism.

Fig. 79 is a sectional elevational view taken substantially along the line LXXIX—LXXIX of Fig. 78.

In more or less general terms the illustrated embodiment of my invention consists of a single suction type blank mold cooperating with two finishing molds to which blanks or parisons are transferred for final shaping at a transferring position common to both of the finishing molds. Finished articles are removed from the finishing molds at discharging positions individual thereto.

The blank mold is carried by a horizontal ram which is reciprocated to alternately place said mold in charging and blank transferring positions. While in the charging position the mold has sealing contact with the exposed surface of a supply body of molten glass and by means of suction gathers a measured quantity into the mold cavity. Upon reaching the blank transferring position the glass is subjected to the usual puff or compacting blow, the function of which is to increase the density of the glass and cause it to conform to the exact shape of the blank mold cavity. If preferred, however, the blank may be enclosed in a secondary or intermediate blank mold, the cavity of which is smaller than, but of the same general shape as the finishing mold cavity. In this mold the blank is expanded by the introduction of air under pressure through the neck mold. Thereafter the blank is suspended bare from the neck mold and one of the finishing molds closed about it. Air under pressure is then introduced through the neck mold to expand the blank to its final shape. The neck mold is then opened and the finishing mold moved to its article discharging position, where, after a secondary blowing or a cooling operation, it is opened and the finished article removed by any suitable means. This secondary blowing may be omitted if deemed advisable. The next succeeding cycle of operations involves use of the other finishing mold. In the meantime, as just indicated, additional air under pressure may be introduced into the previously blown article in order to cool and completely set the glass to insure against collapse of the article when it is removed from the mold.

For the greater part the above operations are effected by mechanisms including fluid piston motors, all of which are directly and regulably controlled by timer operated valves which, while illustrated and set forth in more or less detail herein, constitutes the subject matter of a separate application, Serial Number 689,490, filed September 14, 1933, in the names of Carl W. Schreiber and Leonard D. Soubier as joint inventors.

More specifically, the illustrated machine representing the preferred embodiment of my invention consists of the following units assembled as will be set forth in detail hereinafter:
 1. Base.
 2. Main frame.
 3. Blank mold or ram unit.
 4. Secondary blank or intermediate mold unit.
 5. Finishing mold units.
 6. Timer or control unit.
 7. Raising and lowering mechanism for ram.

Base

The base 101 (Figs. 1, 58, 59, 62, 63, and 64) comprises an elongated rectangular casting supported on wheels 102 which are arranged at the four corners and ride upon a pair of rails 103. Thus the entire machine may be moved toward and away from a furnace F containing a supply of molten glass from which mold charges are obtained periodically. Side and end walls 104 and 105 respectively, depend from the top 106 of the base. One of the wheels 102 is arranged adjacent each end of the horizontal side walls 104 and connected thereto in a manner allowing vertical adjustment of the base relative to the wheels. Thus the elevation of the molds relative to the supply body of glass may be adjusted at will. The construction involved in mounting each wheel may be as follows. A lever 107 (Figs. 63 and 64) is pivoted at one end to a horizontal stub shaft 108 on the side wall 104 and at its other end carries a stub shaft 109 on which the wheel 102 is journaled. An upstanding finger 110 on the upper side of the lever 107 is constantly engaged with an adjustable stop 111 which regulably controls the angular position of said lever 107. Thus the elevation of the base relative to the rails 103 may be varied. The adjustable stop 111 includes a recessed bar 112 carrying a roller 113 which constantly engages the finger 110 on the lever 107. The guide pin 114 at the forward end of the bar 112 is slidingly fitted in a horizontal guide 115. The opposite end of the bar 112 is threaded onto an adjusting rod 116, the adjacent end of which is journaled in a bearing 117 on the side wall 104. This adjusting rod 116 extends lengthwise of the adjacent side wall 104 and is operatively connected to the adjustable stop 111 associated with the wheel at the opposite end of the base. One of these adjusting shafts is arranged on each side of the base, said shafts being operatively connected together by a cross shaft 118. Driving connection between the cross shaft 118 and each of the longitudinal shafts 116 includes a vertical shaft 119, the lower end of which has worm and worm gear connection to the corresponding adjusting shaft 116. The upper end of the vertical shaft 119 carries a bevel gear 120 meshing with a bevel gear 121 on the adjacent end of the cross shaft 118. All of these gears are enclosed in suitable housings. An extension 122 on the upper end of each shaft 119 provides means whereby an adjusting crank or the like handle (not shown) may be employed in rotating the shafts. Rotation of these shafts moves the adjustable stops 111 lengthwise of the base and thereby angularly adjusts the wheel carrying lever 107, and correspondingly changes the elevation of the base relative to the wheels and rails.

As will be brought out hereinafter, various units of the machine are air cooled. For the greater part the cooling air is conducted to the several units by way of conduits provided in the various frame members which rise from the base 101, said base in turn having air passageways provided therein. By reference to Fig. 58 it will be observed that an inlet opening 123 in one end wall of the base communicates with a substantially U-shaped horizontal passageway 124 the arms of which extend alongside of the longitudinal side walls 104 toward the opposite end of the base. Vertical openings 125 provide communication between said passageway 124 and the four tubular corner posts 126 of the main frame. A pair of vertical openings 127 in proximity to the forward end of the base 101 provide communication between said air passageway 124 and conduits provided in the finishing mold unit as will be brought out hereinafter. The manner in which the air is directly applied to the parts to be cooled will be specifically set out presently.

Main frame

The main frame (Figs. 1, 2, 23, and 31) which directly supports various mold units of the machine, as will be brought out presently, consists of four vertical corner posts 126 rising from sleeve-like holders 128 attached to said base. These posts 126, which are of tubular form, have their upper ends sealed by cap plates 129 and three of them have their lower open ends in communication with the air passageways 124 in the base, while the fourth is connected to a source of vacuum. Thus air chambers are provided in the posts from which suitable conduits may lead to molds and other elements to be cooled. A pair of inclined brace bars 130 connect the rear end of the base 101 and the adjacent pair of corner posts. Split collars 131 on said pair of corner posts provide attaching means for said bars. A pair of inclined tie rods 132 (Fig. 1) secure the front and rear pairs of posts together. A pair of horizontal girders 133 extending lengthwise of the machine connect the corner posts 126 and as will be apparent presently, support the blank or parison forming unit in a fashion to permit vertical adjustment of its operating position. These girders are connected together as will be set forth hereinafter.

Blank or parison forming unit

The blank forming unit 134 (Figs. 1, 4, 5, and 50 to 55 inclusive) includes a horizontally disposed ram or mold carrier supporting a blank mold at one end and mounted between said girders 133 on tracks for horizontal reciprocation for the purpose of placing the mold in charging and blank transferring positions in alternation. This ram is made up of upper and lower sections pivoted together and capable of relative vertical movement at one end of the path of reciprocation in order that the blank mold which is mounted on one section, may be brought into contact with a supply body of molten glass. Relative movement between the two sections of the ram as provided for herein may also actuate vacuum control valves in such fashion that they are opened simultaneously with or slightly in advance of contact between the blank mold and glass. At the other end of the path of movement of the ram, the body blank mold is opened leaving a bare blank or parison suspended from a neck mold. (The body blank and neck molds together constitute what is commonly termed a blank or parison mold.) Afterward, the blank is enclosed either in a secondary blank mold or finishing mold, or both, in succession and in the order named. This secondary blank mold frequently is termed an "intermediate" mold for the reason that it has a cavity smaller than, but of the same general shape as the finishing mold, yet somewhat larger than the body blank mold cavity.

The specific construction of the illustrated form of the blank forming unit is substantially as follows. Upper and lower horizontal sections 135 and 136 respectively, and the blank mold 137 comprise the major elements of the ram. A pair of opposed rollers 138 or wheels at each end of the upper ram section 135 (Figs. 4, 6, 60) run in tracks 139 provided on the adjacent vertical walls of said girders. These tracks are arranged in pairs on each girder, each pair being longitudinally aligned and having downwardly turned forward ends 140 which are closed and provide means whereby, with a predetermined degree of forward movement of the ram, the two sections move apart substantially vertically as will be apparent presently. Four links 141 (Figs. 2 and 4) pivotally connect the upper and lower ram sections at points adjacent and in advance of the rollers 138. Rollers 142 on the pivot pins to which the lower ends of the links are connected, also run in said tracks 139. Sufficient forward movement of the ram relative to the girders permits the rollers 142 to move almost vertically downward in the forward ends 140 of the tracks 139. Thus the ram sections are moved apart to place the mold 137 in charging contact with the supply body of molten glass in the furnace F. Reciprocation of the ram at regular time intervals is effected by a horizontal piston motor 143 which is mounted upon the girders 133 and generally referred to hereinafter as a ram motor.

Specifically, the construction of the ram motor (Figs. 3, 4, 6, 7, and 60) includes a horizontal cylinder 144 having pairs of opposed arms 145 resting upon and secured to the girders. A piston 146 is connected through a piston rod 147 to a lug rising from the front end of the upper section 135 of the ram. Valves 148 are built into the cylinder heads 149 to regulate the flow of air under pressure to and from the motor. Each valve (Figs. 6, 7, and 8) consists of a cylindrical housing 150, the axis of which is disposed tangent to the periphery of the cylinder head. An arcuate inlet port 151 in one end wall of the valve housing 150 is connected to an air supply pipe 152 and an inlet port 153 connects the housing and adjacent end of the motor cylinder. An exhaust port 154 connects the interior of the valve housing 150 and an exhaust pipe 155 which extends lengthwise over the motor cylinder to the opposite end thereof where it is connected to the other valve housing. This air supply pipe is directly connected to the main supply line (Fig. 71) in which air under high pressure is constantly maintained. Another exhaust port 156 in said valve housing opens into a chamber 157 constituting part of a cushioning device 158 which functions to reduce the shock incident to stopping of the piston movement at each end of its stroke. This chamber 157 extends a short distance along the cylinder and communicates with the interior thereof through a series of comparatively small apertures 159.

Within the valve housing 150 is arranged a rotary valve member 160 shaped so that in one position the exhaust ports 154 and 156 are inoperative and allow inflow of air under pressure to the motor cylinder through the inlet ports 151 and 153 while in its other extreme position the inlet ports 151 and 153 are closed and air is exhausted through the cushioning device 158 including the apertures 159. A stub shaft 161 at one end of the valve member 160 extends through the end wall of the housing 150 opposite said inlet port 151 and carries a lever 162 or arm.

Valve reversing mechanism 163 (Figs. 3, 6, and 71) is operatively connected to the valves 148 through the levers 162. This mechanism includes a small piston motor 164 mounted on the upper side of the cylinder of the ram reciprocating motor. Piston rods 165 extending from opposite faces of the piston 166 and through the ends of the motor cylinder, are connected to the valve levers 162 by means of rods 168. Air supply pipes 169 are connected to opposite ends of the motor 164 and lead to valves 169ª and 169ᵇ of a timer 559 or timing mechanism (Figs. 51 to 57 inclusive, and 71) at the rear end of the machine as will be apparent presently.

Retraction of the ram 100 lifts the lower section 136 bringing it to an elevation at which all of the rollers 138 and 142 ride in the same horizontal plane on the level portions of the tracks 139. Initial movement of the lower section is greatly facilitated through the use of counterbalancing mechanism 170 which may include a piston motor 171 (Figs. 6, 60, 61, and 71) arranged between the two sections of the ram and mounted upon the lower side of the upper section. This motor includes a horizontal cylinder 172, a piston 173 therein, and a piston rod 174 attached to said piston and extending through the opposite ends of the cylinder. Links 175 at the ends of the piston rod 174 are connected to bell crank levers 176 pivoted to and depending from the hinge pins 177, said hinge pins connecting the links 141 to the upper ram section. A coil spring 178 encircles the piston rod 174 outside of the cylinder and is confined between one end of the latter and a collar 179. Air under pressure is constantly supplied to the motor through a pipe 180 from the main line 423. Forward movement of the ram under influence of the motor 143 and lowering of the lower ram section 136 compresses the spring 178 between the cylinder and collar and moves the piston 173 to the outer end of the cylinder 172, such movement of the piston building up pressure in the cylinder which pressure assists the spring in performing its function. The total resistance represented by the compressed spring and pressure built up by moving the piston 173 rearwardly in opposition to the pressure of air in the supply line 180, is sufficient to act as a counterbalance for the weight of the lower ram section. Thus, immediately upon reversing the ram reciprocating motor 143 for retracting the ram and prior to actual movement of the piston 146 of said motor, the spring 178 expands and together with said air pressure initially moves the lower ram section 136. Such expansion of the spring 178 is followed immediately by a reverse operation of the ram reciprocating motor 143.

At the forward end of the lower ram section 136, there is removably mounted a blank mold holder 181 from which the blank or parison mold is suspended. This holder (Figs. 2, 4, 6, 13, and 17) includes a vertical hinge pin 182 upon which the neck and body blank molds 183 and 184, respectively, constituting the blank mold 137, are pivoted. The neck mold sections are mounted in holders 185 (Figs. 13 and 14) connected through arms 186 (Fig. 6) to said hinge pin 182. These arms in turn are connected through links 187 to a fluid operated piston motor 188 which is suitably mounted upon the lower ram section 136. This motor 188 includes a horizontal cylinder 189, a piston 189ª therein, and a piston rod 190 extending forwardly therefrom and connected to said links 187. A coil spring 191 encircles the piston rod 190 between the forward end of the motor 188 and a collar 192 at the outer end of said rod. This spring normally exerts a pressure yieldingly holding the neck mold closed. Air under pressure is supplied to one end of the neck mold operating motor 188 through a pipe 193. Flow of air under pressure through this pipe is regulated by a timer controlled valve 193ª as will be described hereinafter. The sections of the body blank mold 184 are supported on blank mold arms 194 which are pivoted to the vertical hinge pin 182, said arms being in turn connected by links 195 to a horizontal slide 196 mounted in slideways 197 provided on the lower side of the lower ram section 136. A body blank mold opening and closing motor 198 (Figs. 6, 61, and 71) carried by the lower ram section 136, includes a horizontal cylinder 199, a piston 200 therein, a piston rod 201 which connects said piston and the slide 196. Fluid under pressure is supplied to the opposite ends of the motor 198 in alternation through pipes 202 which lead to a valve 202ª which forms part of the timer 559. At each end of the cylinder 199 there is provided an air cushioning device 203 similar in construction and operation to the cushioning devices 158 heretofore referred to in connection with the ram reciprocating motor. These cushioning devices are of well known construction familiar to those acquainted with this art and are considered not to require detailed description. At the outer end of the cylinder 199 an adjustable stop 204 is provided to permit regulation within certain limits of the stroke of the piston 200 and consequently the extent of opening of the body blank mold 184.

An adapter 205 (Figs. 4 and 13 to 22 inclusive) is arranged in a vertical opening 206 at the forward end of the blank mold holder 181, said opening and, therefore, the adapter therein, being in axial alignment with the blank mold 137. This adapter (Fig. 17) has a vertical central opening 207 therein through which a plunger or plungers constituting part of a plunger unit 208 project into the blank mold. The plunger unit (Figs. 13 and 14) includes a vertical piston motor 209 which is operated by both air and vacuum. The specific construction involved may be substantially as follows. The upper part of the holder 181 (Figs. 4, 13, and 14) has a vacuum chamber 211 therein connected to a vacuum pipe 212 (Figs. 5, 9, and 71) which in turn has communication with a source of supply of vacuum (not shown) by way of pipes 213 and one of the hollow corner posts 126. The forward vertical wall 214 of this vacuum chamber 211 is provided with horizontal ports 215 which normally are closed by valves 216. These ports 215 open into body blank mold and neck mold vacuum chambers 217 and 218 respectively, which extend vertically downward and thence in the form of horizontal passageways 219 and 220, partially around the circular opening 206 in which the adapter is arranged. The passageways 219 and 220 at the lower ends of the body blank and neck mold vacuum chambers 217 and 218 communicate with the usual vacuum grooves of the body blank and neck molds through conduits provided in the adapter 205. The body blank mold vacuum chamber 217 (Figs. 14, 16, and 17) opens through a port 221 into a conduit 222 in said adapter and leads downwardly to an annular chamber 223 provided in the lower part of the adapter. A pair of vertical ports 224 register with vacuum grooves 225 in the neck mold holder 185, said grooves being aligned with the vacuum grooves (not shown) in the body blank mold 184 and functioning in the usual manner. The neck mold vacuum chamber 218 communicates through the horizontal extension 220 and a port 226 (Fig. 14) with a conduit 227 in the adapter, said conduit leading to an annular chamber 228 in said adapter. This chamber communicates with the neck mold cavity by way of an annular series of vertical ports 229 and the usual circular vacuum slots 230 in the neck mold itself.

Figure 1:
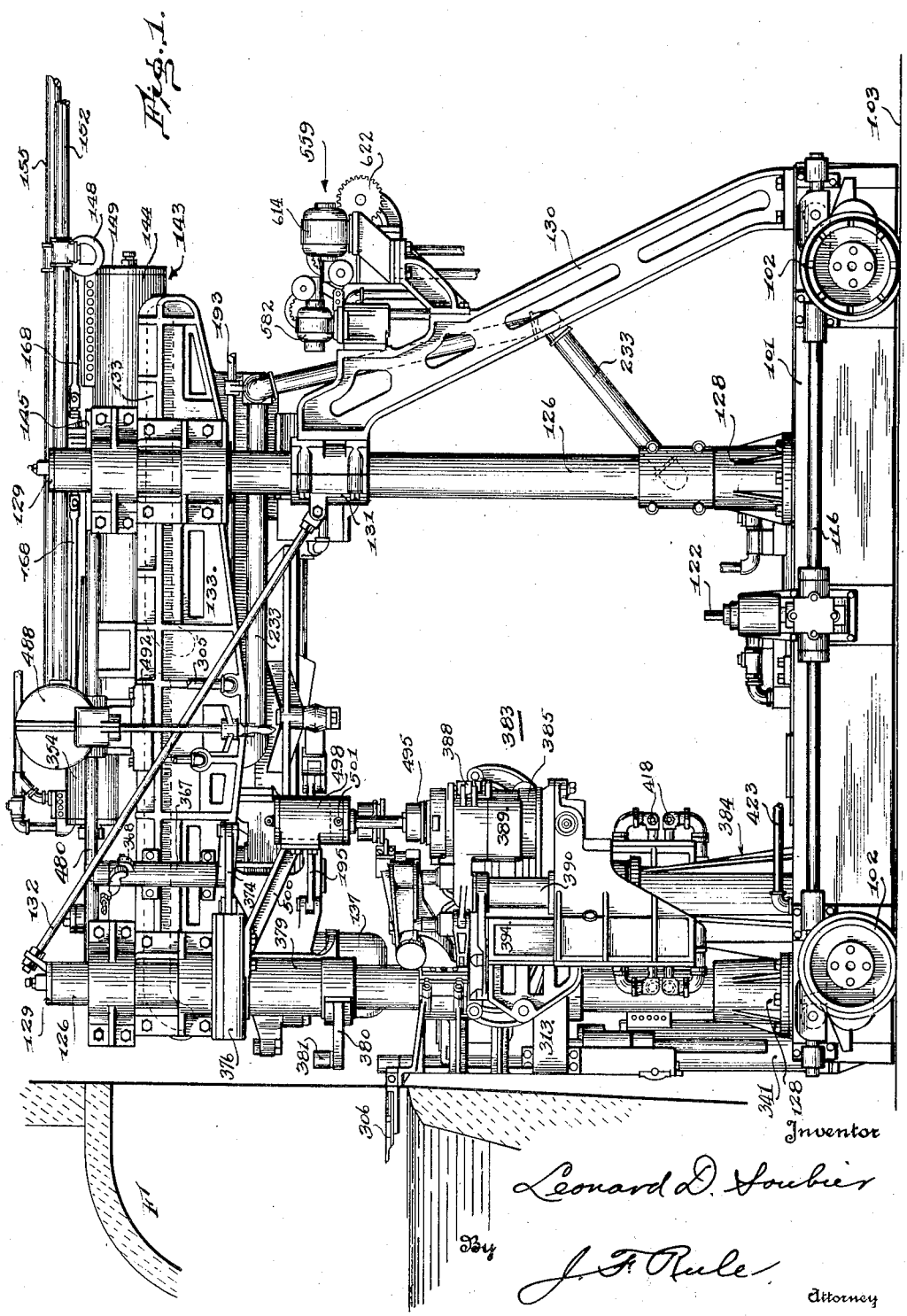
Fig. 1 is a side elevational view of a machine built in accordance with the present invention.

Cooling air is supplied to the holder and adapter 205 by way of a conduit 231 and annular chamber 232 arranged in said holder 181, said chamber encircling the vertical opening 206 in a plane below the vacuum chamber extension 219 and 220. Cooling air is supplied to this conduit 231 by means of a supply pipe 233 which in turn leads to any suitable source of supply (not shown). This pipe includes several sections pivoted together as shown in Figs. 1 and 4. Vertical openings 234 (Fig. 14) in the lower walls of the annular chamber 232 register with openings 235 in the hollow neck mold holders 185 thereby admitting flow of cooling air into said holders. A series of vertical slots 236 (Fig. 13) in the inner wall 236ª of the cooling air chamber 232 permits application of air to the adapter 205. A vertical port 237 in the upper wall of the front end of the cooling air chamber 232 together with a conduit 238 in the adapter 205 provides communication between said chamber 232 and a cooling chamber 239 extending about the cylinder 240 of the piston motor 209 which controls movement of the plungers. This chamber 239 which is formed by enclosing the cylinder 240 in a casing 242 or jacket somewhat larger than said cylinder, has an outlet 243 or exhaust port through which the cooling air discharges to the atmosphere.

The plunger unit 208 including the motor 209 is removably mounted upon the adapter 205 and may be removed or replaced as a unit. A piston 244 is arranged in the cylinder 240 and carries a piston rod 245. Downward movement of the piston in the cylinder is limited by a flanged collar 246 at the lower end of the cylinder. This piston rod 245 is yieldingly connected to the piston 244 permitting limited axial movement relative to the latter. A plunger holder 247 is separably connected to the lower end of the rod 245 thereto, and includes a sleeve 248 which has a radial flange 249 at its lower end normally seating upon a shoulder 250 and thereby closing the bottom end of the opening 207 or chamber. A coil spring 251 encircling said sleeve exerts a downward pressure thereon and yieldingly holds said flange 249 against the shoulder 250 at the lower end of the adapter 205. The plunger 252 is removably secured to said holder.

The piston motor 209 as stated heretofore, is operated by air under pressure and vacuum, vacuum being employed to lift the plunger carrying piston 244 and air under pressure to lower the piston 244 and thereby project the plunger or plungers into the blank mold 136. A conduit 253 in the blank mold holder 181 (Fig. 17) communicates at its forward end with a passageway 254 extending upwardly through the wall of the motor cylinder 240, said passageway opening into the upper end of the cylinder through a port 255. This conduit 253 is connected to air and vacuum supply pipes 256 and 257 respectively (Figs. 5, 10, 11, 12, 60, and 61). The supply of air under pressure and vacuum through these pipes and the conduit 253 to the motor is automatically controlled by valves 290 and 291 (Figs. 11 and 12) as will be described presently. Air under pressure in the form of a short puff is supplied to the neck mold at regular time intervals for compacting the glass in the blank mold and expanding the blanks in the finishing molds. The construction in this respect consists of a conduit 258 in the blank mold holder 181 leading to a semi-circular chamber 259 in the adapter 205 (Figs. 13, 14, 17, and 20) and ports 260 establishing communication between said chamber 259 and the chamber 207 through which the plungers 252 are projected. A pipe 303 conducts air under pressure to the conduit 258 in the holder.

The application of vacuum to the body blank and neck molds is regulated and controlled by the valves 216 referred to heretofore, opening of which may well be effected by relative movement between the sections 135 and 136 of the ram as it approaches its forward or projected position. The valves are individual to the body blank and neck molds and may be operated either together or one at a time. Operation of these valves 216 independently of each other provides for continued application of vacuum to the neck mold cavity even though it has been shut off from the body blank mold. This may be desirable and in fact necessary where the finish or neck of the articles being produced is rather heavy and requires a somewhat prolonged period of intimate contact with the neck mold in order to chill and sufficiently set the glass. Each valve 216 (Figs. 13 and 18) is fixed to the front end of a horizontal stem 262 which is slidingly supported in guides 263. A coil spring 264 encircling the stem between one of the guides 263 and a collar 265 secured to the stem, yieldingly holds the corresponding valve closed. The construction for accomplishing such operation of the valves 216 and in addition closing them upon retraction of the ram is substantially as follows. At the forward end of the lower ram section 136 a pair of push rods 267 (Figs. 18 and 19) arranged for end to end engagement with the valve stems 262, are slidingly mounted in horizontal bearings 268 which may form an integral part of said lower ram section 136. Each push rod 267 extends rearwardly beyond its bearing 268 and carries a peripherally grooved head 269. An adjustable screw 270 is threaded into the outer end of this grooved head and provides means for varying the overall length of the push rod. A collar 271 on each push rod 267 limits forward movement thereof in its bearing 268. A pair of arms 272 mounted on the lower side of the upper ram section 135 and having a portion 273 projecting forwardly beyond the front end thereof, engage the screws 270 on the corresponding push rods when the two ram sections have separated a predetermined distance during projection of the ram. By adjusting the screws 270 and thereby lengthening or shortening the distance between the outer end of the screw and the bearing for the corresponding push rod 267, the valves 216, within certain limits, may be opened at any time during projection of the ram. As a result, vacuum may be applied to the blank mold slightly in advance of, simultaneously with, or after contact of the mold with the surface of the supply body of glass.

Ordinarily the application of vacuum to the blank mold is continued during at least a portion of the retractive movement of the ram and frequently during the entire period of retraction and possibly for a short time thereafter. this is accomplished in the present machine by locking the valves 216 open and automatically releasing them simultaneously with or shortly after completion of the retractive movement. The construction involved consists of pivoted latches 274 or detents individual to the valve push rods 267, said latches mounted on horizontal hinge pins 275 (Figs. 4, 19, and 61) and operated by springs 276 to engage them with the grooved heads 269. Each latch consists of an arm 277 overlying the corresponding grooved head 269 and a depending arm 278 which is engaged on its inner face by said coil spring 276. This spring moves the latch about its pivot and thereby presses the arm 277 downwardly against the groove head 269. Normally, while the corresponding valve 216 is closed, this arm 277 engages an enlarged portion 281 of said grooved head 269 while at other times it projects into the groove 282 and thereby holds the valve open.

Closing of the valves 216 upon termination of the retractive movement of the ram is obtained by rocking the latches 274 in a direction to disengage the arms 277 from the grooved heads 269 whereby the valve springs 264 are permitted to expand. Rocking of the latches is obtained by means of plunger operating motors 283 or trip devices individual to the latches and mounted in the girders 133. Each trip device 283 (Figs. 61 and 71) is fluid operated and includes a horizontal cylinder 284, a plunger rod 286 in said cylinder, and a piston 287 fixed to the inner end of said plunger rod. An air pressure supply pipe 288 is connected to each of the trip devices, both of which pipes 288 extend rearwardly to control valves 288ª operated by timing mechanism as will be brought out hereinafter.

Operation of the plunger reciprocating motor 209 (Figs. 13 and 14) is controlled by air and vacuum valves 290 and 291 respectively, as stated heretofore. These valves, the construction of which is shown in Figs. 11 and 12, are arranged one above the other (Figs. 10 and 60) in position to be operated by a valve actuator 292 consisting of a horizontal cylinder 293 mounted in one of the girders 133 and connected to a source of supply of air under pressure by way of a pipe 294, said pipe leading to a timer controlled valve 294ª (Figs. 52, 53, and 71). A piston 295 within the cylinder 293 carries a rod 296 at the outer end of which is mounted a disk 298. A coil spring 297 encircling the rod 296 yieldingly holds the piston 295 in its innermost position. The disk 298 is of sufficient diameter to engage the outer ends of the valve stems 299 of both the air and vacuum valves 290 and 291. One valve stem, in this instance the stem of the air pressure control valve 290, is slightly longer than the other valve stem so that with inward movement of the disk 298, the valves 290 and 291 will be operated in succession. As will be noted in Fig. 11, the valve controlling the supply of air to the plunger motor 209 is normally opened under influence of a spring 300. A coil spring 301 (Fig. 12) together with vacuum at one side of the vacuum valve 291 normally holds the valve closed.

Application of air under pressure through the conduit 258 and ports 260 (Figs. 5, 17, and 20) to the initial blow opening which is formed by projection of the plunger 252 into the glass, is controlled by a valve 302 (Figs. 60, 61, and 71) in the air pressure supply pipe 303, a valve actuator 304 mounted in one of the girders 133 in position to open the valve 302 when the ram is completely retracted. Both the valve and actuator may well be constructed in accordance with the disclosures in Figs. 12 and 61, the former showing a suitable valve construction and the latter disclosing the valve actuator. Air is supplied to the actuator by way of a pipe 305 (Fig. 1) which leads to a valve 305ª (Figs. 52, 53, and 71) constituting part of a timing mechanism. Flow of air through pipe 305 to the actuator and through the pipe 303 to the blank mold is controlled by valves which are alternately opened and closed by suitable timing mechanism as will appear hereinafter.

Charge severing mechanism

Separation of mold charges of molten glass in the blank mold from the supply body may be effected either by movement of the mold over a stationary knife or by moving a knife across the lower end of the mold during the retractive movement of the latter. In accordance with the present invention the use of the stationary knife involves substantially the following construction. The knife 306 (Figs. 1, 2, 3, 32, 73) which has a substantially V-shaped cutting edge 307 is mounted upon a holder 308 which in turn is secured by screws 309 to a horizontal bracket 310 at the upper end of a pair of guide rods 311. These guide rods (Figs. 73 and 74) extend vertically downward through openings 312 in a transverse frame member 313 which connects the two front posts 126. Vertical adjustment of the knife to compensate for variations in the length of the blank molds being used, is obtained by axial movement of the guide rods 311. The specific construction involved may well include racks 314 on the guide rods and bevel pinions 315 meshing with the racks and enclosed in a housing 316. A horizontal shaft 317 supports the pinions 315 and at one end is connected through a worm gear 318 and worm 319 to a hand wheel 320. Rotation of the hand wheel imparts vertical movement to the guide rods 311 for the purpose stated. The knife is water cooled to keep it at the temperature best suited for satisfactory operation. By reference to Figs. 32, 73, 76, and 79, the construction permitting such water cooling of the knife will be understood. A chamber 321 in the knife is connected through conduits 322 and vertical ports 323 (Figs. 32 and 79) to a pair of chambers 324 in the bracket 310. One of these chambers 324 is connected to a longitudinal passageway 325 through one of the rods 311 while the other chamber communicates with a passageway 326 extending longitudinally through the other rod 311. The lower ends of these passageways 325 and 326 are connected to pipes 327, one of which provides for the inflow of water to the knife chamber 321 while the other provides for discharge of water from said chamber.

Upon completion of the retractive movement of the ram the gathered mold charge or charges of glass are subjected to a compression blow or, if found advantageous, placed in a "secondary blank mold" 328 (Figs. 31, 32, and 33) for expansion preparatory to final shaping in the finishing mold. The secondary blank mold is formed with a cavity of considerably less capacity than the finishing mold but of substantially the same general contour so that the blank or parison when expanded in said secondary blank mold takes on the form of a thick walled article closely resembling in shape that of the finished article. Air under pressure for expanding the blanks in the secondary blank mold is supplied through the conduit 303 and valve 302, the latter operated by the plunger motor 304. Flow of air to the pipe 305 for the secondary blow is regulated by a valve 305ᵇ (Figs. 53 and 71). This operation contributes materially to the production of an article in which the glass is uniformly distributed throughout the side walls and shoulder portions. The construction involved in the secondary blank mold and operating mechanism therefor, is substantially as follows: The secondary blank mold 328 comprises two half sections 329 having a closed article bottom forming end 330 and an open upper end intended to register with the opening in the neck mold. These sections are removably mounted upon mold arms 331 which are pivoted to a vertical hinge pin 332. This hinge pin is mounted upon a slide block 333 fixed to the upper end of a pair of rods 334 which extend vertically downward through guides 335. These guides may be integrally formed with a housing 336 which encloses gears constituting part of mechanism for vertically adjusting the secondary blank mold relative to its lifting motor 339. This housing 336 (Figs. 2, 26, 31, 33, and 40) is carried by a slide 337 which is mounted for vertical movement in slideways 338 formed in the end frame member 313. A casting including the vertical guides 335, gear housing 336, and slide 337, normally rests upon the upper end of a vertical piston motor 339 which is employed to move the secondary blank mold vertically. The rods 334 also extend through guides 340 on the upper part of the motor cylinder 341. A piston 342 in the cylinder 341 is connected to a tubular piston rod 343 which extends vertically upward through said cylinder and engages the lower side of said gear housing 336. An adjusting screw 344 (Figs. 26, 33, and 40) is axially aligned with said tubular piston rod 343 and has one end extending into the latter. The other end of the screw is secured to the slide block 333 which carries the hinge pin 332. The lower end of the adjusting screw 344 has threaded thereon a worm gear 345 which in turn meshes with the worm 346 carried by a short shaft 347 which is adapted to be rotated by a removable hand crank 348. The worm gear 345 is fixed between the horizontal top and bottom walls 349 of the gear housing 336, which construction, together with the threaded connection of the gear to the adjusting screw 344, prevents downward movement of the secondary blank mold except as may be permitted by movement of the piston 342. Air supply pipes 350 leading from any suitable source of air under pressure (not shown) are connected to the upper and lower ends of the cylinder 341. Through these pipes which lead to a valve 350ᵃ (Figs. 53 and 71) forming part of a timer mechanism, air is supplied to the opposite ends of the cylinder in alternation, thereby raising and lowering the piston 342 and, therefore, the secondary blank mold. Cushioning devices 351 (Figs. 31 and 40) similar in construction and operation to the cushioning devices employed on the ram reciprocating motor, reduce the speed of travel of the piston 342 as it approaches the ends of the cylinder 341. These cushioning devices 351 are connected to the supply pipes 350 which in turn are directly connected to timing mechanism which, as will be brought out hereinafter, determines the time intervals between and duration of the periods of application of air to the opposite ends of the cylinder.

Accurate alignment of the secondary blank mold and neck mold is necessary in order to prevent offset necks and like defects in the finished articles of glassware. Such alignment is insured by the provision of a centering pin 352 on the upper end of the hinge pin 332 which is adapted to enter a vertical opening 353 provided in the outer end of the ram head 181 when the secondary blank mold is in its uppermost position, said centering pin and opening being spaced corresponding distances from the axes of the neck and secondary blank molds.

The secondary blank mold 328 or "intermediate" mold is alternately opened and closed by mechanism including a horizontal piston motor 354 (Figs. 1, 3, 4, 6, 9, 34, 35, and 71). This motor is carried by and disposed between a pair of parallel horizontal rods 355 which extend lengthwise of the machine and are supported at their front ends in cross members 356 suitably secured to the forward portion of the longitudinal girders 133. The other ends of these rods extend through arms 365 which are carried by the motor and rest upon the girders 133. The piston 357 in the motor cylinder 358 is connected to a piston rod 359 which at its forward end is secured by a bolt 360 to a cross head 361. Air under pressure is supplied to the opposite ends of the motor in alternation through pipes 354ᵃ which lead to a valve 354ᵇ Figs. 53 and 71) constituting part of a timing mechanism 559. Sleeves 362 (Figs. 34 and 35) at the opposite ends of the cross-head slidingly connect the latter to the rods 355. A pair of horizontal levers 363 individual to the sections of the secondary blank mold and pivoted to opposite ends of the cross head 361 are mounted upon the upper end of a pair of vertical hinge pins 364. A collar 366 keyed to the hinge pin 364 just above the upper end of the vertical bearing 367 carries a pair of diametrically opposed radial arms 368, one of which projects into the recess 369 in said lever 363 and is disposed between set screws 370. Adjustment of these set screws 370 determines the angular relation between the lever 363 and a lever 371 which is keyed to the lower end of said hinge pin. A radial finger 372 at the upper end of the bearing 367 carries a set screw 373 adapted for engagement with the outwardly extending arm 368 (Fig. 34). Thus swinging of the lever 371 in the direction to open the secondary blank mold is adjustably limited. The lever 371 is pivoted at its outer end to a link 374 and through this link is connected to a rack bar 375, the latter slidingly supported in a housing 376 and meshing with a sector gear 377. This sector gear is fixed to a collar 378 encircling one of the corner posts 126 and keyed to a semicircular connector 379, the latter extending partially about one of said corner posts 126 and downwardly a short distance below said sector gear. At the lower end of this connector 379 (Figs. 32, 33, 35, and 37) there is secured a horizontal arm 380 which carries at its outer end a roller 381, said roller adapted for movement into and out of a channel 382 (Fig. 32) or way provided in the corresponding secondary blank mold arm when the secondary blank mold is to be opened or closed. Oscillation of the arms 380 imparts corresponding movement to the two sections of the secondary blank mold.

After the secondary blank mold has been closed about a blank, air under pressure is introduced through the neck mold into an initial blow opening formed by the plunger in the blank in order to expand the blank to the shape of the secondary blank mold cavity. Upon completion of this operation the secondary blank mold is opened and lowered away from the neck mold in order that the blank which is still suspended bare from the neck mold, may be enclosed in a finishing mold for final shaping. The finishing molds, of which there are two, are spaced apart horizontally, being arranged one on each side of the longitudinal center line of the machine. These molds are brought one at a time to a position directly beneath that occupied by the secondary blank mold when the latter is closed about the blank or blanks and then raised into engagement with the neck mold. While the finishing molds are in such position and enclosing the blank or parison, additional air under pressure is introduced into the blank through the neck mold to thereby completely expand the blank to the shape of the articles of glassware being produced. Thereafter the finishing molds with the completely expanded articles therein, are moved to a discharge position where, prior to opening of the molds for removal of the articles therefrom, additional air may be directed into the finished articles for the purpose of cooling them to a degree where setting of the glass is sufficient to prevent its collapse when removed from the molds. The construction of the two finishing mold units is identical and, therefore, the following detailed description will be directed to one of the units.

Each finishing mold unit includes a mold carrier 383 (Figs. 1, 2, 3, 39, 40, 41) mounted for oscillation about the axis of a pillar 384 rising vertically from the base 101. The finishing mold 385 is alternately placed in article discharging position and in a position directly beneath the neck mold, the carrier being subjected to vertical movement at one end of its path of oscillation for the purpose of bringing the finishing mold into engagement with said neck mold. The specific construction of this unit may be substantially as follows: The finishing mold 385 includes two sections pivoted to a vertical hinge pin 386 rising from a bottom plate holder 387 or shoe which in turn is suitably mounted upon the upper side of the carrier 383. The bottom plate holder or shoe may well be of conventional form such as shown in Patent No. 1,662,861, granted March 20, 1928, to John E. McLaughlin. The two sections of the mold are connected by links 388 to a pair of hollow arms 389. Vertical adjustment of the point of connection between the arms 389 and the finishing mold sections, is provided for in order that said arms may apply closing pressure at the proper point which point may vary with changes in the mold height and/or temperature and/or where the meeting faces of the mold sections for one reason or another fail to contact with each other throughout their length. For this purpose substantially the following construction is resorted to. The arms 389 (Figs. 1, 39, and 40) are mounted upon the upper ends of a pair of vertical sleeves 390 about the axes of which said arms move during the opening and closing movements of the mold sections. The inner ends of the arms are formed with downwardly facing openings, the walls 391 of which are secured to flanges 392 at the upper ends of the sleeves 390. A bracket 393 (Figs. 40, 48) holds the sleeves 390 in spaced relation to each other, said bracket secured to and extending horizontally from the upper end of a motor carrier 394 which is adjustably mounted in vertical slideways 395 (Figs. 45 and 46). The lower ends of the sleeves 390 are slidingly fitted in vertical openings 396 in the upper wall of the mold carrier 383, said openings communicating with an air chamber 397 which in turn is connected to the interior of the corresponding pillar 384. Such sliding connection between the sleeves 390 and the carrier 383, permits vertical adjustment of the arms 389 relative to the mold sections for the purpose stated heretofore. The links 388 referred to heretofore as connecting the arms 389 and finishing mold sections have one end pivoted to the outer ends of said arms and the other end to a vertical connector pin 388ª between apertured ears 388ᵇ spaced vertically above and below said links. Cooling air is constantly supplied to the interior of the pillar through the lower end thereof and by way of said chamber 397 and sleeves 390 to the hollow arms 389. The inner vertical walls of these arms are provided with slot-like exhaust ports 398 through which the air flows for application to the surface of the finishing mold sections. Valves 399 at the inner ends of the hollow arms 389 regulate the volume of cooling air delivered to the latter.

Adjustment of the arms 389 as referred to heretofore is effected by moving the motor carrier 394 and with it the arms 389 and sleeves 390, vertically with respect to the mold carrier 383. This is accomplished by a construction (Figs. 45, 46, and 47) substantially as follows: A horizontal bracket 400 on the inner wall of the motor carrier 394 has threaded therethrough a worm screw 401 which extends vertically upward through and is suitably journaled in a bearing 402. This vertical bearing 402 is integrally formed with and at the outer end of a horizontal bearing 403, the latter provided in one wall of the mold carrier 383. A bevel gear 404 fixed to the upper end of the worm screw 401 above the vertical bearing 402 meshes with a pinion 405 on the inner end of an adjusting shaft 406 which is journaled in the bearing 403. The outer end of this shaft 406 is provided with an angular recess 407 designed to receive an adjusting tool of suitable form. The motor carrier 394 and parts supported thereby are adjusted vertically by rotating this shaft 406 in the proper direction.

The opening and closing mechanism for the finishing mold may consist of a vertical piston motor 408 (Figs. 40, 45, and 46) disposed in the lower end of the motor carrier 394 and connected by means of a piston 409 and piston rod 410 to a bell crank lever 411, the latter pivoted between brackets 412 to a horizontal hinge pin 413 and connected at its upper end through a link 414 to a slide block 415. This slide block is mounted in a horizontal slideway 416 at the upper end of the motor carrier 394 and connected to the mold arms 389 by links 417. Operation of the motor oscillates the bell crank lever 411 and thereby alternately opens and closes the mold. Operation of the motor 408 at regular time intervals is obtained by the application of air under pressure to the opposite ends of the cylinder in alternation. Branch pipes 418 communicate with the opposite ends of the motor 408 and lead to a two-way valve 419 (Figs. 39, 41, 42, and 43). This valve 419 is connected by means of a pipe 420 to the upper end of a telescopic supply pipe 421 (Fig. 39) which extends downwardly through the pillar 384 to an air conduit 422 formed in the base 101 and leads to a main supply pipe 423 for air under pressure. The control valve 419 is operated by a stop during upward movement of the finishing mold carrier to the blank transferring position to effect closing of the mold about a blank or blanks suspended from the neck mold. The position of the valve is reversed for the purpose of opening the finishing mold at the article discharging position by a device under the direct control of a timing mechanism as will be brought out hereinafter. Such reversal of the valve 419 to open the mold, therefore, is not effected by movement of the finishing mold carriage as in the case of operating the valve to close said mold.

The construction of the valve 419 (Figs. 42 and 43) and operating mechanism therefor is substantially as follows. A housing 424 enclosing the rotary valve body 425 has an inlet port 426 in its upper side, an exhaust port 427 opening to the atmosphere in its lower side, and a pair of diametrically opposed outlet ports 428 connected to the pair of branch pipes 418. A pair of opposed conduits 429 in and extending transverse to the length of the valve body 425 are positioned at regular time intervals to permit the flow of air under pressure to the opposite ends of the motor 408 in alternation. While one of the conduits 429 is in position to establish communication between the supply pipe 420 and one of the branch pipes 418, the other or exhaust conduit 429 connects the other branch pipe 418 to the exhaust port 427. One end of the valve body 425 is formed with a stub shaft 430 extending through one end of the housing and carrying at its outer end an operating lever 431. This lever is adapted for swinging movement through an angle of 90° in reversing the valve and is held in its two extreme positions against accidental movement by a spring detent 432 (Figs. 39 and 42). A trip device (Fig. 39) which swings the lever to its lowermost position upon completion of the mold lifting operation at the blank transferring station, consists of a plunger 433, mounted in a vertical guide 434 just above the valve 419 and a stationary stop 435 spaced some distance above said plunger. This stop is adjustable vertically for the purpose of changing the point in the upward path of movement of the mold at which the valve 419 is actuated and thereby advancing or retarding the time of closing the mold, said stop being held in any adjusted position by a set screw 435ª. At the time the mold carrier 383 substantially reaches its uppermost position, the stationary stop 435 is engaged by the plunger 433 and causes movement of the latter vertically downward in its guide 434. Thus the valve lever 431 is swung to its lowermost position and air supplied to the lower end of the piston motor 408, thereby closing the mold about the blank suspended from the neck mold. It is evident that as a result of the more or less remote positioning of the valve 419 relative to the motor 408, operation of said motor is not effected simultaneously with opening of the valve. In the time interval between opening of the valve and operation of the motor, which takes place during upward movement of the mold carrier, the latter will have moved upward a considerable distance. Because of these operating conditions vertical adjustment of the position of the stationary stop 435 may be utilized in changing the point at which the mold closes. For example, the valve may be opened at such a point that the mold carrier will have completed its upward movement before the mold starts to close. On the other hand, by adjusting the stop 435 downward, it is possible to start closing the mold at such a point that it will be almost completely closed at the time the carrier reaches its uppermost position. Reversal of the position of the lever 431 for the purpose of opening the finishing mold is effected at a predetermined time following movement of the mold to the discharging position, such movement of the mold placing the valve lever (Figs. 2, 39, 42, and 43) over an air operated plunger 437. This plunger is mounted in a vertical cylinder 438 secured to the pillar 384 and is projected upwardly by air under pressure supplied to said cylinder through a pipe 439. Flow of air through this pipe is controlled by one of two valves 439ª (Figs. 53 and 71) forming part of a timer or timing mechanism 559 as will be pointed out hereinafter.

Accurate alignment of the finishing molds and neck mold in order to prevent the formation of bottles and the like, having offset necks, is obtained by providing an upstanding tapered centering pin 440 at the upper end of the mold carrier 383 (Figs. 29, 30, 31) and an opening 441 in the lower end of the neck mold hinge pin. Upward movement of the finishing mold for cooperation with the neck mold projects the centering pin into the opening 441 and because of the relation between the pin opening and axes of the neck and finishing mold cavities, insures accurate alignment of said cavites. Moreover, this combined centering and connecting pin functions to prevent relative movement between the neck and finishing molds such as might result from vibration of the machine as a whole.

Each finishing mold carrier, as brought out briefly heretofore, is mounted for oscillation about the axis of its supporting pillar 384. The pillar construction (Figs. 1, 39, 41, 44, and 48) and connection between the mold carrier and said pillar, in addition to providing for oscillation of the mold carrier, is such that the entire carrier may be adjusted vertically to insure accurate relative positioning of the adjacent ends of the neck and finishing molds. It will be understood in this connection that if extremely and perhaps abnormally short or long finishing molds are used, it may be necessary to adjust the mold carrier vertically in order that the molds will properly cooperate with the neck mold. Moreover, original setting up of the machine will in all probability involve vertical adjustment of the carrier. Ordinary variations in mold height are compensated for merely by adjusting the ram carrier vertically on the corner posts to raise or lower the neck mold a distance representing the difference in length of the molds being removed and those substituted. The specific construction involved may be substantially as follows: The pillar 384 which supports one of the finishing mold carriers 383 (Figs. 39 and 44) consists of a vertical cylinder 442 having an attaching flange 443 at its lower end bolted to the base 101 and a rack bar housing 444. A sleeve 445 within the cylinder 442 extends through the opposite ends of the latter and at its upper end is suitably connected to a cap 446, the latter being telescoped over the upper end of said sleeve and resting upon the top bearing surface of an adjusting device 447. This adjusting device (Figs. 39 and 48) consists of a sleeve 448 threaded into the upper end of the cylinder 442 and provided with a radial flange 449 at its upper end. This flange overlies the upper end of the cylinder 442 and is formed with serrations or notches which facilitate operation of the adjusting device. A lock plate 451 slidingly mounted upon the cylinder 442 by means of bolts 452 serves to releasably secure the adjusting device against accidental movement. A key 453 (Fig. 39) at the lower end of the sleeve 445 provides splined connection between said sleeve and an intermediate sleeve 454 which is disposed between the inner sleeve 445 and the cylinder 442. The inner sleeve is movable vertically within the cylinder 442 and said intermediate sleeve 454 during adjustment of the mold carrier. A ring gear 455 at the lower end of the intermediate sleeve runs in mesh with a rack bar 456 which is mounted for horizontal reciprocation in the housing 444 referred to heretofore. The rack bar is reciprocated by a horizontal piston motor 457 (Figs. 44 and 50) which is supported in an opening 458 provided in the base 101, said motor including a piston rod 459 connected at its outer end to the corresponding rack bar 456.

Air under pressure is supplied to the opposite ends of each motor 457 in alternation and exhausted therefrom through a pipe 460 which is suitably connected to one of a pair of valves 460ª (Figs. 52, 53, and 71) forming a part of a timer mechanism to be described hereinafter, said pipe being connected to chambers 461 which form part of cushioning devices 462 operating to decelerate the speed of travel of the finishing mold carriers as they approach the ends of their paths of oscillation. A series of comparatively small exhaust ports 463 (Fig. 50) in the wall of the motor cylinder provide constant communication between the interior of said cylinder and the chambers 461. A pipe 464 provides connection between said chamber 461 and an inlet port 465 in the cylinder head 466. A check valve 467 in the pipe 464 permits inflow of air under pressure to the motor cylinder and closes automatically when flow of air to the motor is discontinued.

Raising of the finishing mold carrier 383 for the purpose of placing the finishing mold in position for cooperation with the neck mold is obtained by an elevating apparatus 468 (Figs. 40, 44, and 71) common to both of the finishing mold carriers and disposed substantially between the pillars 384. This apparatus comprises a vertical piston motor 469 fixed to the base 101 and including a piston 470, a piston rod 471 extending upwardly from said piston, and a disk 472 adjustably connected to the upper end of the piston rod. This disk has depending from its center an attaching screw 473 threaded into a recess 474 in the upper end of said rod. A lock nut 475 is threaded on the attaching screw 473. The disk 472 is rotated to change the elevation whenever the mold carriers 383 are raised or lowered, such adjustment being necessary in order to insure proper engagement between said disk and mold carriers. The disk 472 is adapted to enter an undercut way 476 (Figs. 39 and 40) provided on the lower side of the mold carrier preparatory to lifting the carrier and mold to the blank transferring position.

The motor 469 is operated by supplying air under pressure to its opposite ends in alternation and at regular time intervals as determined by timing mechanism to be set forth hereinafter. Supply pipes 477 for air under pressure, are connected to the opposite ends of the motor 469, these pipes leading to a valve 477ª forming part of the timer 559. Cushioning devices 478 at the opposite ends of the motor function as do the cushioning devices described heretofore in connection with the motors which swing the finishing mold carriers. Check valves 479 in the supply pipes 477 permit uninterrupted supply of air to the motor and force the exhaust air to flow through the cushioning devices 478. These supply pipes also function as exhaust pipes because of the construction of the control valves associated with and forming part of the timing mechanism referred to above.

A change in the height of the blank mold, as stated heretofore, requires adjustment of the entire ram carriage including the girders 133 on the supporting posts 126. Such adjustment is necessary because the level of the glass in the supply body is constant and the extent of up and down movement of the ram at the outer end of its projecting stroke never changes. The construction whereby the entire ram or blank mold unit (Figs. 1, 2, 3, 60, and 61) may be adjusted up and down on the posts 126 may be substantially as follows.

A pair of shafts 480 extending lengthwise of the ram unit and at opposite sides thereof, have their ends journaled in bearings 481 forming part of gear boxes 482 which in turn are fixed to the opposite ends of the girders 133. Gears 483 arranged within the gear box 482 and fixed to the shafts 480, mesh with rack bars 484 provided on the inner sides of the posts 126. Rotation of the shafts is obtained by mechanism including gears 485 keyed to the shafts 480 meshing with worms 486 on a transverse shaft 487. These gears and worms are enclosed in housings 488 which also have bearings 489 in which the intermediate portions of the shafts 480 are journaled. At one end of the transverse shaft 487 a bevel gear 490 is keyed, said gear meshing with a pinion 491 at the upper end of an adjusting shaft 492. This shaft 492 is journaled in bearings 493 and at its lower end carries a crank 494 or handle, by means of which it may be rotated. Rotation of this handle 494 operates through the several shafts and gears to move the ram unit vertically on the posts 126.

Blowing heads

Figure 2:
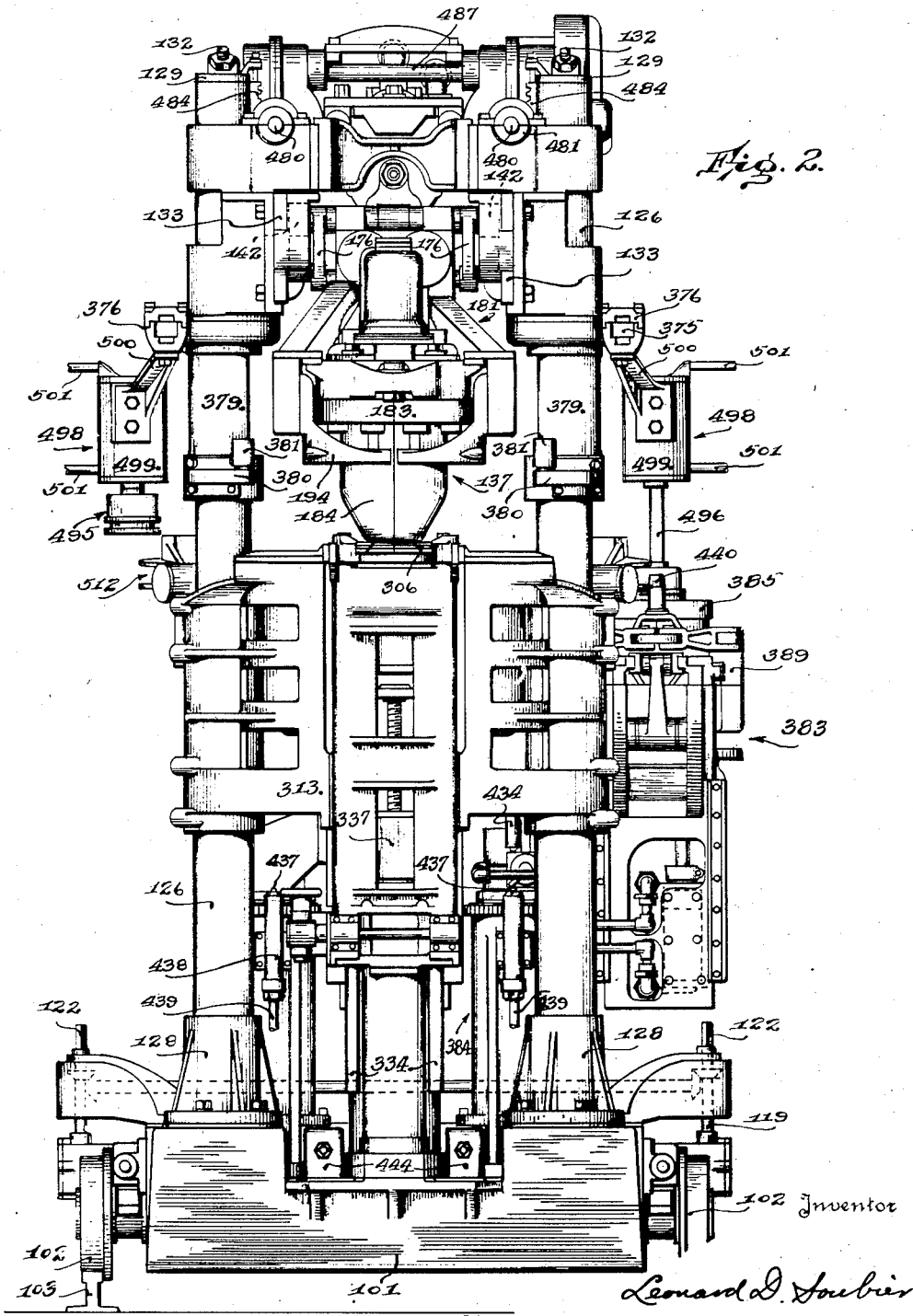
Fig. 2 is a front elevational view.

The blanks or parisons after being enclosed in the finishing molds at the blank transferring position are expanded by the introduction of air through the neck mold and into the initial blow opening or openings. Later, while the finishing mold occupies the article discharging position and prior to opening of the mold, cooling air is directed into the finished article for the purpose of setting the glass sufficiently to prevent its collapse when the mold is removed from contact with the article. In accomplishing this result blow heads individual to the finishing molds are employed. Each blow head (Figs. 1, 2, 3, and 49) may well consist of two cups 495 telescoped one within the other and secured to the lower end of a hollow piston rod 496 depending from a piston 497 of an air motor 498, said motor including a cylinder 499 mounted at the outer end of an arm 500 which in turn is attached to the lower side of the rack bar housing (Fig. 2). Air under pressure is supplied to the opposite ends of the cylinder 499 in alternation through pipes 501 which are connected to the valves 501ª of a timer mechanism as will be apparent hereinafter. Cooling air flows to the hollow piston rod 496 by way of a supply pipe 502 which telescopes into said hollow rod. The air then passes through a valve port 503 to a chamber 504 provided between the two cups 495 and thence by way of ports 505 to the interior of the inner cup. A valve 506 normally closed by a spring 507, is opened upon seating of the blow head on the finishing mold as a result of relative vertical movement between the inner and outer cups, such movement causing the inner cup to unseat the valve against pressure of the spring 507. Relative movement between the two cups is limited by screws 508 carried by the outer cup and projecting into vertical channels 509 in the outer surface of the inner cup. A coil spring 510 disposed between radial flanges 511 on said spring yieldingly holds the cups separated normally, yet permitting upward movement of the inner cup as indicated above.

Blank mold coolers

Cooling air is applied to the blank mold cavities while the mold is open at the blank transferring position. For this purpose blowers 512 or nozzles (Figs. 38 and 39) individual to the sections of the blank mold 137 are mounted upon the two corner posts 126 at the front end of the machine. Each blower is attached to the corresponding corner posts by means of a split collar 513, one section 514 of which assumes the form of a chamber communicating through ports 515 with the interior of the corresponding post 126. The blower includes an elongated hollow body provided with upwardly

Swinging knife and compression plate

While the gathered mold charges may be severed from the supply body of molten glass by means of a stationary knife over which the mold moves during retraction thereof and the blank into which the gathered mold is transformed, may be expanded in a secondary blank mold preparatory to final expansion in the finishing mold as brought out heretofore, the mold charge may instead be severed by a swinging knife and compressed in the blank mold by closing the receiving end of the blank mold with a baffle plate and applying air under pressure to the gathered glass through the neck mold. This feature is illustrated in Figs. 4, 23, 24, and 27 to 30 inclusive, and the specific construction may be as follows. The knife 517 which is air cooled, is attached to the outer end of a knife holder 518 or arm, said arm secured to the upper end of a vertical rock shaft 519. This rock shaft is journaled in a vertical bearing formed in the cross frame member 313 at the front end of the machine. A spur gear 520 secured to the shaft 519 just below the cross frame member 313 meshes with a sector gear 521 which in turn is journaled upon a vertical hinge pin 522 and connected through an arm 523 and link 524 to the piston rod 525 of an air motor 526. This motor 526 which is mounted upon one of the corner posts 126 at the front end of the machine, is connected at its opposite ends to air pressure supply pipes 527 through which air is introduced into the opposite ends of the motor in alternation.

The cutting stroke of the knife 517 may be regulably controlled by means including an adjustable stop 528 which is mounted on an arm 529 carried by one of the corner posts 126 and disposed in the path of travel of a finger 530 provided at the outer end of the piston rod 525. The stop 528 is threaded on a horizontal adjusting screw 531 through rotation of which the spaced relation between said stop and finger 530 may be varied.

For the purpose of insuring proper engagement between the cut-off knife 517 and the mold and exerting a regulable degree of pressure of the knife against the mold, the rock shaft 519 is extended downwardly below the cross frame member 313 and journaled in a bearing 532, said shaft carrying a collar 533 and having a coil expansion spring 534 encircling it between said collar and the bearing. This coil spring works against said collar 533, which incidentally is adjustable lengthwise of the shaft, and thereby yieldingly holds the knife in its uppermost position, said uppermost position being determined by the setting of the collar 533.

The knife 517 and holder 518 therefor, are cooled artificially by the application of cooling air thereto under low pressure. The air is supplied through a conduit 535 (Fig. 23) which is connected to the lower end of a conduit 536 extending lengthwise through the rock shaft 519, said conduit communicating at its upper end with a chamber 537 in the knife holder. At the forward end of this chamber 537 (Fig. 24) exhaust ports 538 or slots provide for discharge of the cooling air in such a manner that it impinges against the lower surface of the knife 517 in proximity to its cutting edge. The application of air under pressure to the knife swinging motor may be controlled by a valve 526$^a$ (Figs. 28, 29, and 30) constructed exactly as is the valve 419 (Fig. 42) regulating the supply of air to the motor for opening and closing the finishing molds. This valve 526$^a$ includes an operating lever 526$^b$ which is oscillated by an arm 526$^c$ fixed to the cooling air supply pipe 233. The valve is attached to the lower side of one of the girders 133. Forward movement of the ram and with it the air supply pipe 233 and arm 526$^c$, actuates the valve lever 526$^b$ in a fashion to so set the valve that the motor 526 is caused to move the knife 517 to one side of the path of travel of the blank mold. After completion of the mold charging operation and substantially at the time the mold reaches its maximum elevation the arm 526$^c$ again engages the valve lever 526$^b$ reversing the position of the valve and causing the motor 526 to operate and quickly swing the knife across the lower end of the mold thereby severing the gathered glass from the supply body. Air under pressure is supplied to the valve through a pipe 526$^d$ and to the opposite ends of the motor 526 through pipes 526$^e$.

With respect to the compression plate or baffle plate referred to above, it will be observed in Figs. 25, 26, 27, 78, and 79, that the construction is substantially as follows. The baffle plate 539 is in the form of a disk (Fig. 79) carried by and yieldingly connected to a holder 540 which is removably held in and supported by an arm 541 extending horizontally from the hinge pin 352, which pin is adapted to support the secondary blank mold when the latter is employed in place of the baffle plate. Lock screws 542 secure the holder 540 in the arm 541. Yielding connection between the plate 539 and the holder 540 is obtained by means of a pair of cylinders 543 and 544 telescoped one within the other and held assembled by means of a pin 545. A coil spring 546 which encircles the pin and is disposed with the telescoped sleeves or cylinders, exerts a pressure against the end walls of the cylinders tending to separate them. Thus when the baffle plate is brought into operative position it yieldingly engages the adjacent end of the blank mold 137. A lateral extension 547 on the arm 541 is provided with a horizontal slot 548 in which a relatively long vertical roller 549 extends at times, said roller being carried by one of the arms 380 of the mechanism for opening and closing the secondary blank mold. This baffle plate is moved up and down by the mechanism which is also employed in vertically reciprocating the secondary blank mold. Adjustment of the elevation of the operating position of the plate is also obtained by the adjusting means for the secondary blank mold.

Another form of mechanism for opening the valves 216 which regulate the application of vacuum to the blank mold, may consist of a motor controlled rocker arm 550 (Fig. 50—A) associated with each of the valves 216 and constantly engaging the outer end of the corresponding valve stem 262. The rocker arm is pivoted to a horizontal hinge pin 551 on the lower ram section 136 and has its upper end pivoted to the piston rod 552 of a piston motor 553. This motor includes a horizontal cylinder 554 and a piston 555 therein, connected to the piston rod 552. Air under pressure is supplied to one end of the motor through a pipe 556 which may lead to a valve (not shown) controlled by timing mechanism. A coil spring 557 confined between the outer end of the piston rod 552 and a stop 558, yieldingly holds the piston and rocker arm in position to allow closing of the corresponding valve 216. As will be brought out hereinafter, because of the timer control of the motors 553, the valves 216 operated thereby may be opened at any time without regard to the relative positions of the upper and lower ram sections 135 and 136.

*Timer*

The valves referred to heretofore in connection with control and regulation of the application of air under pressure to pipes leading to the various air motors, constitute part of a timer 559 which is arranged at the rear end of the machine and supported upon the inclined braces 130. These valves are separated into two batteries, one battery (the upper) controlling the blank forming and expanding operations, while the other (the lower) controls movement of the finishing mold and plunger or plungers. Because the blank forming unit is associated with two finishing molds, it is obvious that a complete cycle of operations of the machine involves two charge gathering and blank forming operations and expansion of blanks in both finishing molds. Therefore, the battery of valves involved in the charge gathering and blank forming operations are actuated in a two to one ratio with respect to the other or lower battery of valves.

Rotary type valves are employed in connection with the timer 559. Both long and short valves are used, the long valves in connection with the piston motors in which the pistons are moved in both directions under air pressure and a single valve is employed, while the short valves are used where the pistons are moved in one direction only under air pressure and in the opposite direction by a spring or its equivalent. Each battery of valves (Figs. 53 and 54) is mounted in an elongated housing secured at its ends to the inclined braces 130 (Fig. 51). The battery of vertical valves 560 (Fig. 54) regulating and controlling the application of air under pressure to motors involved in the blank forming and expanding operations is arranged in a plane slightly higher than the battery of horizontal valves 561 which regulates the flow of air to the motors associated with the finishing molds and plunger mechanism. The valve housing 562 for the upper battery of valves is provided with a longitudinal series of vertical openings 563 in which the valves are rotatively mounted. A chamber 564 or header extending along one side of the housing is connected to a main supply pipe 565. Ports 566 individual to the valves are provided in the inner wall of this chamber to establish communication between the openings 563 and chamber. An exhaust chamber 567 extends along the opposite side of the housing and communicates with the valve openings 563 through ports 568 individual to the latter and disposed diametrically opposite the other ports 566. Ports 569 communicate directly with pipes which as brought out heretofore lead to various motors. Each valve consists of a cylindrical body 570, extending through the opposite ends of one of the openings 563. Adjacent each end and within the opening the body 570 is provided with a transverse passageway 571. A pair of diagonal passageways 572 open at one end into the transverse passageways 571 and at the other end through the periphery of the valve midway the length thereof and at diametrically opposite points. Thus, when the valve is in one position air under pressure may flow into one pipe from the supply chamber 564 and to the exhaust chamber 567 from the other pipe. Rotation of the valve 180° reverses the position of the passageways and ports as is obvious. It is, therefore, evident that intermittent rotation of the valves as just indicated, will effect reciprocation of the motor pistons.

A stub shaft 573 at one end of each valve (Figs. 54 and 56) extends through a cover plate 574 and has keyed thereto above the plate a pinion 575 running in mesh with a gear 576, the latter having fixed thereto a four pointed star wheel 577 or the like which is rotated intermittently as will be apparent presently. The two to one ratio of the pinion and gear provides for movement of the valve through an angle of 180° with each 90° movement of the gear 576.

By means of automatic trip mechanism the valves just referred to are actuated at regular time intervals and in a predetermined order. Moreover, this mechanism is such that the sequence of actuation of the valves may be varied to meet the requirements of the particular article being manufactured as well as the production speed desired. For example, in the manufacture of a bottle of a given size and shape, the time interval between projection and retraction of the ram, and, therefore, the blank mold, may be one-half second, this representing the time required for gathering a mold charge of glass. Another size of article may require a longer or shorter period of time to insure complete filling of the blank mold with glass. Accordingly, the trip mechanism is readily adjustable to provide for these changes. Other operations likewise require relative adjustment from time to time. Certain operations which may, and in fact, do occupy fixed relation to each other, are grouped together and have their time of occurrence changed as a unit relative to other groups to the degree made necessary by the difference in size or shape of the articles of glassware being manufactured. For example, as in the present case, there is a definite fixed relation between the blank mold opening, vacuum shut off, secondary blank mold lifting, opening, and closing, and the expansion puff in the secondary blank mold. The particular timed relation between these operations just enumerated may also apply in the manufacture of a comparatively wide range of sizes and shapes. However, in changing from one size to another it may be necessary, for example, to change the setting of all of the above operations corresponding degrees with respect to certain other or all of the remaining operations. The illustrated form of timer provides for such adjustment. The specific construction involved may be as follows. A continuously driven shaft 578 (Figs. 54, 55, and 56) disposed horizontally above and extending lengthwise of the housing for the upper battery of valves, is journaled at its ends in bearings 579 on the inclined braces 130 and carries a plurality of drums 580 on which fingers 581 are adjustably mounted for engagement with the star wheels 577 in a predetermined variable order. A motor 582 operating through gears 583 drives the shaft 578.

Each drum 580 (Fig. 55) consists of a sleeve 584 or collar surrounding a portion of the shaft 578 and carrying one or more fingers 581, the number thereof depending upon the number of valves to be regulated and controlled by the particular drum. Separable and adjustable connection between each finger 581 and the corresponding drum is provided by forming an undercut circumferential channel 585 or groove in the periphery of the drum and adjustably anchoring one end of the finger therein. One form of the finger 581 may consist of a bolt, the head 586 of which fits into the undercut groove. The rod 586ª of the bolt extends radially outward for engagement with the star wheel. A nut 587 is threaded upon the bolt to frictionally hold it in any adjusted position about the circumference of the drum. In Fig. 55 the finger is shown attached to the drum by a bolt 588, said finger in this instance including a substantially L-shaped member 589. This latter form of finger, as will be apparent presently, is employed where two adjacent drums alternately operate the same valve. Each of the drums is freely rotatable on the shaft 578 and only at regular time intervals rotates therewith. Roller clutches 590 (Figs. 54, 55, and 56) individual to the drums provide means for automatically making and breaking driving connection between the drums and shaft. Each clutch 590 includes substantially the following construction. One end of the drum is telescoped over a portion of and keyed to a collar 591 which is provided at one end with an annular series of teeth 592. This collar is free to rotate on the shaft. A sleeve 593 or collar (Fig. 55) is keyed or otherwise secured to the shaft and has a diametrically enlarged portion 593ª extending about and in radial spaced relation to the toothed end of the collar 591. Rollers 594 individual to the teeth 592 are arranged between the latter and said enlarged end 593ª of the sleeve or collar 593. In one position these rollers effect driving connection between the toothed collar 591 and the outer collar 593 while in the other extreme position such driving connection is broken. A roller shifter 595 (Figs. 54, 55, and 56) includes a collar 596 disposed between the adjacent ends of the drum and the outer sleeve 593 of the corresponding clutch 590. Fingers 597 extend longitudinally from one end of the collar 596 into the spaces between the rollers 594. A coil spring 598 is anchored at one end to the collar 596 of the shifter and at its other end, to the adjacent end wall of the drum 580, said spring tending to move the shifter in the direction necessary to throw the clutch 590 into operation. A radial finger 599 on the collar 596 is adapted for engagement with a pivoted stop 600 which is moved out of engagement with said finger 599 at regular time intervals. The pivoted stops 600 are individual to the drums 580, each including an upwardly directed arm 601 pivoted at its lower end to a horizontal hinge pin 602 disposed parallel to the axis of the shaft 578. A pin 603 (Fig. 54) projecting into a notch 604 near the lower end of the stop, limits swinging movement thereof. This pin constantly engages a spring pressed plunger 605, the function of which is to yieldingly hold the pivoted stop in its uppermost position. A spring pressed plunger 606 at the upper end of the stop directly engages the radial finger 599 associated with the corresponding clutch 590. An arm 607 extends laterally from the stop near its lower end and carries a roller 608 which is normally positioned in the path of travel of an arm 609 constituting part of trip mechanism 610. This trip mechanism (Figs. 38, 54, and 57) effects such operation of the series of clutches that the valves will be opened and closed in the required order. Moreover, this mechanism may be adjusted with ease to change the timed relation between operation of the drum as may be required by differences in the size and shape of articles of glassware being manufactured. The specific construction is substantially as follows. A horizontal shaft 611 disposed parallel with and in a plane slightly below the drum carrying shaft 578, is journaled in bearings 612 and at one end has driving connection through gears 613 to an electric motor 614. This motor imparts continuous rotary movement to the shaft. Individual to each of the drums and mounted upon the shaft 611, is a disk 615, which is keyed to the shaft 611 for rotation therewith. The arm 609, referred to heretofore, is supported on the shaft and held in engagement with the disk either by a retaining collar 616 or one of the bearings 612. The angular position of this arm 609 may be adjusted with respect to the other arms to thereby change the timed relation between operation of the several drums, by moving it about the shaft 611 relative to the corresponding disk 615. The arm is releasably held in any adjusted position by means of a spring pressed detent 617 which is carried by the arm and adapted for engagement with any of an annular series of apertures 618 provided near the periphery of said disk. This detent (Fig. 57) is manually releasable, as is apparent.

The lower battery of valves 561 which controls operation of the motors associated with the finishing molds and plungers are operated by fingers on a pair of drums arranged side by side on the shaft. The two drums 619 (Figs. 52, 53, and 54) are mounted upon a horizontal shaft 620 which is journaled in bearings 621 and driven continuously by the motor 614, driving connection being established through reduction gearing 622 whereby the speed of rotation of these two drums is one-half that of the group of drums carried by the upper shaft 578. The fingers 623 on these lower drums 619 are anchored in circumferential grooves 624 in the manner set forth above in connection with the upper drums. The fingers may be of the same construction as that set forth heretofore, including simply a bolt and a lock nut holding the bolt in any adjusted position.

In considering the following description of the machine operation it will be understood that a complete cycle of operations consists of two mold charging and blank forming operations on the part of the blank mold unit and expansion of blanks or parison in both finishing molds. It is also to be understood that these operations, which are controlled by the timer 559, require that the drums on the upper shaft 578 of the timer make two complete revolutions during the period of time required for a single revolution of the lower drum 619. For present purposes it will be considered that the upper shaft 578 makes a complete revolution in four seconds; that the lower shaft 611 carrying the five trip arms 609 completes a revolution in ten seconds; and that the lower drum 619, which is fixed to its shaft 620, makes a complete revolution in twenty seconds, the latter due to the two to one ratio of the gears between the shafts 611 and 620.

In order to start operation of the machine, valves (not shown) are opened admitting flow of air under pressure from the main supply line 423 (Fig. 71) to the timing mechanism and points adjacent the various motors and/or automatically controlled valves associated with the several parts of the machine. Another valve (not shown) is opened to permit the application of vacuum through a pipe 625 to one of the corner posts 126 and thence by way of a pipe 626 to automatically controlled valves 216 from and by the periodic opening of which the vacuum is applied at regular time intervals to the blank mold. The motors 582 and 614 are then started, it being understood that previously the fingers on the several drums and the trip arms of the timing mechanism have been relatively adjusted to effect a predetermined order of opening and closing of the various valves as may be required in the fabrication of a bottle or jar of a given size and shape. The sequence of operation of the valves is as follows. The valve 169ª (Figs. 53 and 71) is first opened, this being effected by the trip mechanism 610 rocking the pivoted stop 600 at the right end of the shaft 611, shown in Fig. 53. The drum 627 which is caused to rotate by such swinging of the stop and consequent throwing in of the corresponding clutch, carries two radial fingers 581 spaced apart circumferentially of the drum approximately 90°. In time, this spacing of the fingers may, for example, represent one second, which is the time required for completing projection of the ram and effecting sealing contact between the blank mold and glass. Opening of the valve 169ª permits flow of air through one of the pipes 169 so that the piston 166 of the reversing valve 163 is moved to the right as in Fig. 71. This in turn opens the valve 148 at the right end of the ram cylinder 144, admitting air under pressure thereto. By this means the ram is projected. Substantially at the point of termination of the ram projecting movement the lower section 136 thereof moves downwardly in almost vertical direction independently of the upper section. This relative movement brings the lower end of the blank mold into sealing engagement with the supply body of glass and opens the vacuum valves 216 as previously explained for the purpose of exhausting air from both the body blank and neck molds. Thus the blank mold gathers its mold charge or charges of glass. At the time the blank mold is brought into contact with the glass or at least prior to breaking such contact, the valve 169ª is closed by means of the finger 581 which is carried by the drum 627 and is spaced approximately 90° from the valve opening finger as brought out above.

Upon completion of the mold charging operation the ram is retracted for the purpose of placing the mold at the blank transferring position. Such retraction is obtained by opening the valve 169ᵇ (Figs. 53 and 71), this being effected by rotation of the drum 628 and fingers 581 thereon. At this point it may be stated that the drum 627 is held against further movement after it has completed one revolution by means of the corresponding stop 600 which engages the finger 599. Rotation of the drum 628 (Fig. 53) is obtained by outward swinging of the stop 600 under influence of one of the trip arms on the shaft 611 and resultant throwing in of the corresponding clutch. Opening of the valve 169ᵇ reverses the valve 163 and thereby causes operation of the motor 143 for the purpose of retracting the ram and blank mold thereon.

The gathered glass is separated from the supply body in the furnace by means of the stationary knife 306 over which the mold travels during its retractive movement toward the blank transferring station. The excess glass falls back into the main supply body and is reassimilated and reheated thereby.

As brought out heretofore, the vacuum control valves 216 are locked open by means of latches 274 during the entire period of retraction of the blank mold in order to insure such intimate contact between the glass and walls of the mold cavity whereby uniform chilling of the surface glass making up the blank is obtained. At any time following complete retraction of the ram the latches may be operated to allow closing of the valves 216 under pressure of the springs 264. For this purpose the valve 288ª (Fig. 53) is opened momentarily by rotation of the drum 629. This permits flow of air under pressure through the pipes 288 to the plunger operating motor 283 (Fig. 61) which rocks the latches 274 about their pivots as indicated above. Continued rotation of the drum 629 opens the valve 202ª permitting flow of air to one end of the motor 198 (Fig. 71) which opens and closes the body blank mold. Opening of the valve under influence of the drum 629 operates the motor in a fashion to open the body blank mold leaving a bare blank suspended from the neck mold. Substantially simultaneously with such opening of the body blank mold, the secondary blank mold 328 is moved vertically upward preparatory to being closed about the blank in the position previously occupied by the body blank mold. This secondary blank mold elevating operation is obtained by opening of the valve 350ª (Figs. 53 and 71) under influence of fingers on the drum 629. Opening of this valve results in the application of air under pressure to the lower end of the motor 339 and consequent lifting of the secondary blank mold. At the time the secondary blank mold (Figs. 32, 33, and 40) is in its uppermost position, the notches or ways 382 occupy positions in the path of travel of the arms 380 of the mold closing mechanism. Immediately the valve 354ᵇ is positioned by the corresponding finger on the drum 629 to admit air under pressure to the motor 354 (Figs. 1, 3, and 61), said motor operating through links and rack and pinion mechanism to swing said arms 380 inwardly. While this secondary blank mold is closed about the body of the blank, a puff of air under pressure is introduced through the neck mold into an initial blow opening formed in the neck end of the mold charge by the plunger. At this point it may be explained that removal of the plunger from contact with the glass is effected at any time in advance of expanding the blank in the secondary blank mold, the particular time of retraction of the plunger being determined by the quantity of glass in the neck mold and the extent to which this glass must be chilled in order that it will be self supporting. A finger 623 on the lower drum 619 operates the valve 294ª as a result of which the disk projecting motor 292 or valve actuator operates to open the air and vacuum valves 290 and 291 in succession. This results in closing the air valve 290 which is normally open and opening of the vacuum valve 291 so that vacuum is applied to the upper end of the plunger motor. Thus the plunger is lifted out of engagement with the glass.

The puff of air for expanding the blank in the secondary blank mold is controlled by the valve 302 (Fig. 71) opening of which is effected by the plunger motor 304. A valve 305ᵇ (Figs. 53 and 71) forming part of the timer and functioning to regulate and control the supply of air to the motor 304 is opened by a finger on the drum 629. A second finger on this drum spaced circumferentially from the finger which opens the valve 305ᵇ, closes said valve at the proper time. The valve 354ᵇ is then positioned due to rotation of the drum 629, so that air under pressure is supplied to the motor 354 and the secondary blank mold opened. Immediately the valve 350ª is operated by the finger 589 carried by the drum 630 resulting in operation of the motor 339 in a fashion to lower the secondary blank mold. One of the finishing mold carriers 383 is moved to a position beneath and in register with the neck mold while the secondary blank mold is still closed about the blank or at the time it opens. This swinging movement of the finishing mold carrier is effected by operation of the valve 460ª, this being effected by engagement of one of the fingers 623 with the star wheel asociated with this particular valve. Opening of the valve permits flow of air under pressure to one end of the piston motor 457 which is connected through rack and pinion mechanism to one of the finishing mold carriers. Movement of the finishing mold to said position brings it into engagement with the elevating motor 468. Immediately upon completion of such engagement between the motor and mold carrier, the valve 477ª (Figs. 53 and 71) is opened by means of a finger on the drum 630 to admit flow of air to the lower end of said motor 468. Thus the finishing mold carrier and mechanism supported thereon will be moved upwardly to a position from which the finishing mold sections may be swung about their common pivot to enclose the blanks depending from the neck mold. Termination of the upward movement of the finishing mold carrier 383 operates valve tripping mechanism consisting of the vertical plunger 433 and stationary pin 435 (Fig. 39). This opens the valve 419 in a fashion to admit air under pressure to the lower end of one of the motors 408. While the finishing mold is closed about the blank, which incidentally has already been expanded to some degree in the secondary blank mold, the valve 305ª is again opened so that the plunger motor 304 opens the valve 302 and thereupon allows air under pressure to flow into the neck mold and thence into the blank or blanks. Thus the glass is expanded to the shape of the finishing mold cavity. (If preferred, the final expansion of the blank may be deferred until the mold is moved to the discharging position. The final blow would then be effected through the blowing head 498. Moreover, it is possible and may be preferable, to partly expand the blank at the transferring position beyond that effected in the secondary mold and finish the operation at the discharging position.) The valve 305ª is then closed and the application of air to the interior of the blank discontinued. The neck mold is then opened slightly to permit downward movement of the expanded blank or blanks with and in the finishing mold. Such opening of the neck mold is obtained by opening the valve 193ª (Figs. 53 and 71), this being effected by rotation of the drum 631 at the left end of the upper shaft 578. A finger 581 engages the star wheel 577 carried by the valve. Immediately, the motor 468 is operated to lower the finishing mold unit this being accomplished by partial rotation of the valve 477ª. During downward movement of the finishing mold unit the valve 202ª which controls opening and closing of the body blank mold, is operated by movement of the drum 631 to effect closing of the body blank mold preparatory to a second projection of the ram for the purpose of gathering another mold charge of glass. When the finishing mold unit has reached its lowermost position the valve 460ª is again operated to cause swinging movement thereof to its outermost or article discharging position. The blowing head is then moved vertically downward and caused to enclose the neck portion which projects above the upper end of the finishing mold. As brought out heretofore, telescopic movement of the two sleeve sections of the blowing head opens a valve and permits flow of air to the interior of the expanded article for cooling and setting the glass. Such lowering of the blowing head is obtained by opening the valve 501ª through which air flows to the blowing head motor 498. Fingers on the drum 619 alternately open and close the valve.

Expansion of the blank to its final form in the finishing mold having been completed, this mold may be opened for removal of the finished article. This is accomplished by opening the valve 439ª by means of a finger on the drum 619 whereby air under pressure flows to the motor cylinder 438 causing upward movement of the plunger 437 and consequent reversal of the position of the valve 419. Thereupon the air flows to the corresponding motor 408 causing its operation and resultant opening of the finishing mold. The finished article may be removed automatically or manually as may be desired.

As has been brought out heretofore, the entire machine may be adjusted vertically within certain limits to compensate for variations in the level of the supply body of the molten glass in the furnace. The ram carriage is adjustable vertically on the corner posts 126 to accommodate blank molds of different heights and likewise the finishing mold carriers are adjustable to compensate for differences in the height of the finishing mold. The elevating mechanisms for the secondary blank mold and finishing molds are also adjustable in order that a given stroke of the pistons associated therewith will always place these molds in proper position with respect to the neck mold.

In the event a swinging cut-off knife is employed in place of the stationary knife as indicated heretofore, operation of the knife may be regulated and controlled by the timer 559 in a manner which is obvious in view of the foregoing. This is also true with respect to the substitution of baffle plates or compression plates for the secondary blank mold. As brought out above, the baffle plate holder will be operated by the same mechanism employed in connection with the secondary blank mold, one of the swinging arms 380 being idle.

Modifications may be resorted to within the spirit and scope of my invention.

What I claim is:

1. In combination, a blank forming unit comprising a blank mold, means for delivering mold charges of molten glass to the mold and transforming them into blanks, a pair of finishing molds arranged in a plane below the blank mold, means for moving the finishing molds horizontally between a blank transfer station common to both molds and separate final blowing stations individual to the finishing molds, means for lifting the finishing molds individually at the transfer station to the plane of the blank mold and transferring blanks from the blank mold to the finishing molds in alternation at the transfer station, means for expanding the blanks alternately at the respective final blowing stations, and means for discharging the expanded blanks from the finishing molds.

2. In a glassware forming machine, a pair of finishing molds, means for oscillating the molds in a horizontal plane between a blank transfer station common to the molds and final blowing stations individual thereto, means for forming blanks and transferring them to the finishing molds at said transfer station, means for completely expanding the blanks at the blowing stations, and means for discharging the expanded blanks from the finishing molds.

3. In a machine for forming glass articles, the combination of a parison mold, a carrier therefor, a stationary support on which the carrier is mounted, means for moving the carrier back and forth on said support and thereby moving the parison mold back and forth between a charge receiving position and a transfer station, a finishing mold carriage, a finishing mold thereon, means for moving said carriage back and forth and thereby periodically moving the finishing mold to and from said transfer station, said stationary support including means to prevent movement of the parison mold carrier about said axis, and means for causing a transfer of the parison from the parison mold to the finishing mold at said station.

4. In a glassware forming machine, a pair of finishing molds, means for oscillating the molds in a horizontal plane between a blank transfer station common to the molds and final blowing stations individual thereto, means for raising the finishing molds one at a time at the blank transfer station, means for forming blanks and transferring them to the finishing molds at said transfer station, means for blowing the blanks at the blowing stations, and means for then opening the finishing molds.

5. In a glassware forming machine, a pair of finishing molds, means for oscillating the molds in a horizontal plane between a blank transfer station common to the molds and final blowing stations individual thereto, pneumatic means for raising the finishing molds one at a time at the blank transfer station, means for forming blanks and transferring them to the finishing molds while the latter occupy their raised position, means for expanding the blanks at the blowing station, and means for opening the finishing molds.

6. In a glassware forming machine, a finishing mold, means for oscillating the mold along a substantially horizontal path between blank transferring and blowing stations, automatic means for alternately raising and lowering the finishing mold at the transfer station, means for forming blanks and transferring them to the finishing mold at the transfer station while said mold occupies its uppermost position, means for expanding the blanks at the article finishing station, and means for opening the finishing mold.

7. In a glassware forming machine, a pair of finishing molds mounted for oscillation along substantially horizontal paths individual thereto between a blank transfer station common to the molds and article finishing stations individual thereto, means for oscillating the molds, means for raising the finishing molds one at a time at the blank transfer station, a blank forming unit including blank and neck molds, a ram supporting the blank and neck molds, means for reciprocating the ram to thereby alternately place the blank and neck molds at mold charging and blank transfer stations, means for expanding the blanks in the finishing mold, and means for then opening the finishing mold.

8. In a glassware forming machine, a finishing mold mounted for oscillation about a vertical axis between a blank transfer station and article finishing position, a single blank forming unit including a blank mold, said unit arranged to form blanks and place them in the finishing mold at the transfer station, a ram on which said unit is mounted, means for reciprocating the ram in an inclined direction in a plane radial to said axis and thereby reciprocating the blank mold between a charge gathering position and said transfer station, means for expanding blanks at the article finishing position, and means for then opening said finishing mold.

9. In a glassware forming machine, a pair of finishing molds mounted for oscillation about vertical axes individual thereto, means for moving the molds between a blank transferring position common thereto and article discharging positions individual thereto, means for forming blanks and suspending them at said transferring position, means for raising the finishing molds one at a time and closing them about the suspended blanks, means for expanding the blanks in the finishing molds, and means for opening the finishing molds at the discharging position.

10. In a glassware forming machine, a partible finishing mold mounted for back and forth movement between blank transferring and article discharging positions, a blank mold, means for moving the blank mold to alternately place it in said blank transferring position and over a supply body of molten glass at a charging position, means for moving the mold substantially vertically into and out of contact with the glass, means for delivering mold charges to the blank mold and transforming them into blanks, means for opening the blank mold and thereby suspending bare blanks at the transferring position, means for raising the finishing mold at the transferring position and closing it about the bare blanks, means for expanding the blanks, and means for opening the finshing mold at the article discharging position.

11. In a glassware forming machine, a partible blank mold mounted for reciprocation between horizontally spaced mold charging and blank transferring positions, means for delivering a mold charge of molten glass to the mold and transforming it into a blank, means for opening the blank mold and suspending a bare blank at the transferring position, a pair of partible finishing molds arranged in a plane below the blank mold and mounted for oscillation about separate vertical axes between said blank transferring position and separate article discharging positions individual thereto, means for raising the finishing molds one at a time at the transferring position and closing them about the suspended blank, means for expanding the blank in the finishing molds, and means for opening the finishing molds at the article discharging positions.

12. In a glassware forming machine, a pair of finishing molds mounted for oscillation about vertical axes individual thereto, means for moving the molds between a blank transferring position common thereto and article discharging positions individual thereto, means for forming blanks and suspending them at said transferring position, means for raising the finishing molds one at a time and closing them about the suspended blanks, means for expanding the blanks in the finishing molds at the transferring position, and means for opening the finishing molds at the discharging position.

13. In a glassware forming machine, a partible suction type blank mold, a blank mold holder, a ram supporting the holder and including upper and lower sections, horizontal slideways supporting the ram, means for reciprocating the ram in said slideways and thereby placing the blank mold in charge gathering and blank transferring positions in alternation, means for imparting up and down movement to at least one section of said ram and the mold relative to other section and the slideway at one end of the latter to thereby alternately make and break charge gathering contact between the blank mold and a supply body of molten glass, means for delivering glass to the molds and transforming it into a blank, a partible finishing mold, means for bringing said finishing mold to the blank transferring position at regular time intervals, means for transferring the blank from the blank mold to the finishing mold, means for expanding the blank to its final shape, and means for then opening the finishing mold.

14. In a glassware forming machine, the combination of a partible suction type blank mold, a holder therefor, a carrier for the mold and holder including a section connected at one end to the holder, a horizontal slide above and connected to said section, opposed horizontal slideways in which the slide is mounted, a fluid operated piston motor for reciprocating the slide in said slideways to move the carrier and thereby alternately placing the blank mold in charging and blank transferring positions, means for imparting vertical movement to the blank mold and said section relative to the slide after arrival at the charging position to thereby bring said mold into sealing contact with the supply body of molten glass, means for supplying vacuum to the mold to deliver a mold charge of molten glass thereto, means for transforming the charge of glass into a blank, and a finishing mold to which the blank is transferred at the transferring position for final shaping.

15. A glassware forming machine comprising a ram mounted for horizontal reciprocation, a partible blank mold at one end of the ram, means for reciprocating the ram to thereby alternately place the blank mold over a supply body of molten glass and in a blank transferring position, means for moving the mold substantially vertically downward into sealing contact with the glass, suction means for delivering a mold charge of glass to the mold, means for transforming the charge of glass into a blank, a pair of finishing mold carriers arranged in a plane below said ram and mounted for oscillation about separate vertical axes, partible finishing molds on said carriers, means for oscillating the carriers one at a time to thereby place them one at a time directly beneath the blank transferring position and at article discharging positions individual thereto, means for raising the finishing molds and closing them about blanks at the blank transferring position, means for expanding the blanks in the finishing molds, and means for opening the finishing molds at the article discharging positions.

16. A glassware forming machine comprising a partible suction blank mold, a ram carrying the mold and mounted for horizontal reciprocation, means for reciprocating the ram to thereby alternately place the blank mold over a supply body of molten glass and in a blank transferring position, means for lowering the blank mold substantially vertically into charge gathering contact with the glass, a partible secondary blank mold arranged to enclose a blank at the transferring position, mechanism for opening and closing the secondary blank mold, means for expending a blank in the secondary blank mold, a pair of finishing molds mounted for oscillation about separate vertical axes in a horizontal plane below the blank mold, means for moving the finishing molds one at a time, means for raising the finishing molds one at a time and closing them about blanks at the blank transferring position, means for expanding the blanks to the shape of the finishing mold cavities, and means for opening and closing the finishing molds.

17. A glassware forming machine comprising a pair of finishing mold carriers mounted for oscillation about separate vertical axes between a blank transferring position common to both carriers and article discharging positions individual thereto, partible finishing molds on the carriers, means for oscillating the carriers, means common to both carriers for moving them vertically upward at the blank transferring position, means for forming blanks and placing them in the finishing molds at said transferring position, and means for expanding the blanks to the shape of the finishing mold cavities.

18. A glassware forming machine comprising a pair of finishing mold carriers mounted for oscillation about separate vertical axes between a blank transferring position common to both carriers and article discharging positions individual thereto, partible finishing molds on the carriers, means for oscillating the carriers, means common to both carriers for moving them vertically upward at the blank transferring position, mechanism for forming blanks and suspending them bare at the transferring position, a partible secondary blank mold, means for closing the secondary blank mold about suspended blanks at the transferring position, means for expanding blanks in said secondary blank mold, means for then placing the blanks in the finishing molds at said transferring position, and means for further expanding the blanks in the finishing molds.

19. A glassware forming machine comprising a pair of finishing mold carriers mounted for oscillation about separate vertical axes between a blank transferring position common to both mold carriers and article discharging positions individual thereto, partible finishing molds on the carriers, means for oscillating the carriers, means common to both carriers for moving them vertically upward at the blank transferring position, means for forming blanks and suspending them bare at the transferring position, means for placing blanks in the finishing molds at said transferring position, means for expanding the blanks to the shape of the finishing mold cavities, said blank forming means including a ram mounted for movement along a horizontal path, a suction blank mold carried by the ram, means for reciprocating the ram, means for imparting substantially vertical movement to the mold at one end of its path of movement to bring it into sealing contact with a supply body of molten glass, and means for applying suction to the blank mold while in contact with the glass.

20. In a glassware forming machine, a main frame, a ram slidingly supported thereon for horizontal reciprocating movement and comprising upper and lower sections, a suction blank mold carried by the lower section, means for reciprocating the ram to alternately place the mold in charge gathering and blank transferring positions, means to effect downward movement of the lower section while in the charge gathering position to project the mold into a supply body of glass, means for applying suction to the mold to thereby gather a mold charge of glass, means for transforming the gathered glass into a blank, and means transforming the blank into a finished article of glassware.

21. In a glassware forming machine, a supporting frame including a pair of parallel girders, a ram arranged between and slidingly supported on the girders for horizontal reciprocating movement, said ram comprising upper and lower sections, a suction blank mold suspended from the lower section at said one end of the ram, a piston motor adapted to reciprocate the ram and thereby alternately place the mold in charging and blank transferring positions, means for moving the lower ram section substantially vertically downward to effect charging contact between the mold and a supply body of molten glass, means for applying suction to the mold to gather a charge of glass, means for transforming the charge of glass into a blank, and means for transforming the blank into a finished article of glassware.

22. In a glassware forming machine, a blank mold supporting ram mounted for horizontal reciprocation, said ram including upper and lower sections, a suction blank mold suspended from one end of the lower section, means for reciprocating the ram to thereby place the mold in charging and blank transferring positions in alternation, means for moving the lower section downwardly away from the upper section substantially at the time the mold reaches the charging position, a piston motor for reciprocating the ram, a piston motor for moving the lower ram section to its uppermost position preparatory to retraction of the ram to the blank transferring position, means for applying suction to the mold while it is in said charging position to thereby gather a mold charge of glass, means for transforming the mold charge into a blank, and means including a finishing mold for transforming the blank into a finished article of glassware.

23. In a glassware forming machine, a horizontal ram comprising upper and lower sections, links pivotally connecting the sections, a blank mold mounted on one end of the lower section, means for reciprocating the ram along a horizontal path between mold charging and blank transferring positions, means for moving the sections apart vertically substantially at the time the mold reaches the charging position to effect engagement between the mold and a supply body of molten glass, means for applying suction to the mold to deliver a charge of glass thereto, means for transforming the glass into a blank, and means including a finishing mold for transforming the blank into a finished article of glassware.

24. In a glassware forming machine, a horizontal ram comprising upper and lower sections, links pivotally connecting the sections, a blank mold mounted on one end of the lower section, a piston motor for reciprocating the ram, means for moving the ram sections apart vertically substantially at the time the mold reaches the charging position to thereby bring it into engagement with a supply body of molten glass, mechanism including a piston motor for bringing the ram sections together substantially at the time the ram starts its movement away from the charging position, means for delivering molten glass to the blank mold and forming the blank therefrom, and means for transforming the blank into a finished article of glassware.

25. In a glassware forming machine, a horizontal ram comprising upper and lower sections, links pivotally connecting the sections, a blank mold mounted on one end of the lower section, means for reciprocating the ram along a horizontal path between mold charging and blank transferring positions, means for moving the sections apart vertically substantially at the time the mold reaches the charging position to effect engagement between the mold and a supply body of molten glass, a vacuum passageway leading to the blank mold, a vacuum control valve in the passageway, means whereby a predetermined degree of relative movement between the ram sections operates the vacuum valve to effect delivery of a charge of glass to the blank mold, means for transforming the glass into a blank, and means for transforming the blank into a finished article of glassware.

26. In a glassware forming machine, a horizontal ram comprising upper and lower sections, links pivotally connecting the sections, a blank mold mounted on one end of the lower section, means for reciprocating the ram along a horizontal path between mold charging and blank transferring positions, means for moving the sections apart vertically substantially at the time the mold reaches the charging position to effect engagement between the mold and a supply body of molten glass, a vacuum passageway leading to the blank mold, a vacuum control valve in the passageway, means whereby a predetermined degree of relative movement between the ram sections operates the vacuum valve to effect delivery of a charge of glass to the blank mold, means for transforming the glass into a blank, means for transforming the blank into a finished article of glassware, and means for regulably controlling the point at which the vacuum valve is operated.

27. In a glassware forming machine, a horizontal ram comprising upper and lower sections, links pivotally connecting the sections, a blank mold mounted on one end of the lower section, means for reciprocating the ram along a horizontal path between mold charging and blank transferring positions, means for moving the sections apart vertically substantially at the time the mold reaches the charging position to effect engagement between the mold and a supply body of molten glass, said blank mold including cooperating body blank and neck molds, separate vacuum conduits leading to the body blank and neck molds, vacuum control valves individual to said conduits, actuating devices individual to the valves adapted to open them after a predetermined extent of separation of the two ram sections to thereby effect delivery of molten glass to the mold, means for transforming the glass into a blank, and means including a finishing mold for transforming the blank into a finished article of glassware.

28. In a glassware forming machine, a horizontal ram comprising upper and lower sections, links pivotally connecting the sections, a blank mold mounted on one end of the lower section, means for reciprocating the ram along a horizontal path between mold charging and blank transferring positions, means for moving the sections apart vertically substantially at the time the mold reaches the charging position to effect engagement between the mold and a supply body of molten glass, said blank mold including cooperating body blank and neck molds, separate vacuum conduits leading to the body blank and neck molds, vacuum control valves individual to said conduits, actuating devices individual to the valves adapted to open them after a predetermined extent of separation of the two ram sections to thereby effect delivery of molten glass to the mold, means for transforming the glass into a blank, means including a finishing mold for transforming the blank into a finished article of glassware, devices individual to the valves for holding them open during movement of the mold to the blank transferring position, and automatic means for then actuating said devices and closing said valves.

29. In a glassware forming machine, a horizontal ram comprising two superposed sections, a blank mold mounted at one end of the lower section, means for reciprocating the ram horizontally between mold charging and blank transferring positions, means for effecting relative vertical movement between said sections substantially at the time of arrival of the mold at the charging position to thereby bring the mold into contact with a supply body of molten glass, means for delivering a mold charge of glass to the mold, means for transforming the glass into a blank, a finishing mold mounted for oscillative movement about a vertical axis between said blank transferring position and article discharging position, means for moving the finishing mold vertically upward at the blank transferring position to enclose a bare blank, means for expanding the blank in the finishing mold at the transferring position, and means for opening and closing the finishing mold.

30. In a glassware forming machine, a horizontal ram comprising two superposed sections, a blank mold mounted at one end of the lower section, means for reciprocating the ram horizontally between mold charging and blank transferring positions, means for effecting relative vertical movement between said sections substantially at the time of arrival of the mold at the charging position to thereby bring the mold into contact with a supply body of molten glass, means for delivering a mold charge of glass to the mold, means for transforming the glass into a blank, a finishing mold mounted at each side of the path of travel of the ram for oscillation about vertical axes individual thereto to thereby place said molds one at a time at the blank transferring position and article discharging positions in alternation, an elevating device common to both molds for imparting vertical movement thereto at the transferring position, means for closing the molds about bare blanks at the transferring position, and means for expanding blanks in the finishing molds at the transferring position.

31. In a glassware forming machine, a horizontal ram comprising two superposed sections, a blank mold mounted at one end of the lower section, means for reciprocating the ram horizontally between mold charging and blank transferring positions, a motor operated device for effecting relative vertical movement between said sections substantially at the time of arrival of the mold at the charging position to thereby bring the mold into contact with a supply body of molten glass, means for delivering a mold charge of glass to the mold, means for transforming the glass into a blank, and means for transforming a blank into a finished article of glassware.

32. In a glassware forming machine, a horizontal ram comprising two superposed sections, links pivotally connecting the ram sections, a blank mold mounted at one end of the lower section, means for reciprocating the ram horizontally between mold charging and blank transferring positions, a motor operated device for effecting relative vertical movement between said sections substantially at the time of arrival of the mold at the charging position to thereby bring the mold into contact with a supply body of molten glass, means for delivering a mold charge of glass to the mold, means for transforming the glass into a blank, means for transforming a blank into a finished article of glassware, said motor operated device including a horizontal piston motor, and means connecting the motor and links whereby operation of the former in one direction moves the ram sections together.

33. In a glassware forming machine, a suction blank mold mounted for reciprocation between horizontally spaced mold charging and blank transferring positions, means for moving the mold vertically at the charging position to thereby effect contact between it and a supply body of molten glass, vacuum controlled means operated by vertical movement of the mold for effecting delivery of a mold charge thereto, means for transforming the mold charge into a blank, and means for transforming the blank into a finished article of glassware.

34. In a glassware forming machine, a suction blank mold mounted for reciprocation between horizontally spaced mold charging and blank transferring positions, means for moving the mold vertically at the charging position to thereby effect contact between the mold and a supply body of molten glass, means for applying suction to the mold to deliver a mold charge thereto, means for transforming the mold charge into a blank, a pair of partible finishing molds mounted for oscillation about vertical axes individual thereto between article discharging positions individual thereto and a point directly beneath the transferring position, means common to the finishing molds for imparting vertical movement thereto between said point and the transferring position, means for opening and closing the finishing molds, and means for expanding blanks in said finishing molds.

35. In a glassware forming machine, a suction blank mold mounted for reciprocation between horizontally spaced mold charging and blank transferring positions, means for moving the mold vertically at the charging position to effect contact between the mold and a supply body of molten glass, means for applying suction to the mold to deliver a mold charge thereto, means for transforming the mold charge into a blank, a pair of partible finishing molds mounted for oscillation about vertical axes individual thereto between separate article discharging positions and a point directly beneath the transferring position, means common to the finishing molds for imparting vertical movement thereto between said point and the transferring position, means for opening and closing the finishing molds, means for introducing air under pressure to the finishing molds to expand blanks at the blank transferring position, and means for introducing cooling air into the expanded blanks at the article discharging positions.

36. In a glassware forming machine, a suction blank mold mounted for reciprocation between horizontally spaced mold charging and blank transferring positions, means for moving the mold vertically at the charging position to thereby effect contact between the mold and a supply body of molten glass, means for applying suction to the mold to deliver a mold charge thereto, means for transforming the mold charge into a blank, a pair of partible finishing molds mounted for oscillation about vertical axes individual thereto between separate article discharging positions and a point directly beneath the transferring position, means common to the finishing molds for imparting vertical movement thereto between said point and the transferring position, means for opening and closing the finishing molds, means for expanding blanks in said finishing molds, said means for moving the finishing molds vertically including a vertical piston motor, means providing releasable connection between the motor and finishing molds one at a time, and means for operating said motor in timed relation with movements of the finishing molds.

37. In a glassware forming machine, a blank mold carrier mounted for horizontal reciprocation, said carrier including upper and lower sections movable toward and from each other, a blank mold mounted upon one end of the lower section, a fluid piston motor for reciprocating the ram and thereby placing the mold over a supply body of molten glass and at a blank transferring position in alternation, means for moving the sections apart at one end of the path of movement of the carrier to effect charging contact between the mold and glass, suction means for delivering a mold charge to the mold while the latter is in contact with the glass, means for bringing the carrier sections together immediately after the charging operation including a piston motor supported on the upper section of the carrier and links connecting the motor and lower sections of said carrier, means for transforming the mold charge into a blank, and means for transforming the blank into a finished article of glassware.

38. In a glassware forming machine, a suction blank mold, a blank mold carrier comprising separable horizontal sections, means for reciprocating the carrier to thereby alternately place the mold over a supply body of molten glass and at a blank transferring position, means for moving the mold and a section of the carrier in a plane substantially at right angles to the direction of reciprocation of the carrier and relative to the other section to effect charging contact between the mold and supply body of molten glass, auxiliary means cooperating with the carrier reciprocating means in initially moving the mold away from the glass, means for effecting delivery of a mold charge to the mold while it is in contact with the glass, means for transforming the mold charge into a blank, and a finishing mold in which the blank is expanded to the form of a finished article of glassware.

39. In a glassware forming machine, a suction blank mold, a blank mold carrier comprising separable sections, means for reciprocating the carrier to thereby alternately place the mold over a supply body of molten glass and at a blank transferring position, means for moving the mold and a section of the carrier in a plane substantially at right angles to the direction of reciprocation of the carrier to effect charging contact between the mold and supply body of molten glass, auxiliary means cooperating with the carrier reciprocating means in initially moving the mold away from the glass, means for effecting delivery of a mold charge to the mold while it is in contact with the glass, means for transforming the mold charge into a blank, a finishing mold in which the blank is expanded to the form of a finished article of glassware, said auxiliary means including a piston motor mounted on one section of the carrier, links connecting the motor to another section of the mold carrier, and a spring device cooperating with the motor in moving the mold.

40. In a glassware forming machine, a suction blank mold, a blank mold carrier, means for reciprocating the carrier to thereby alternately place the mold over a supply body of glass and at a blank transferring position, means for moving the mold and a section of the carrier in a plane substantially at right angles to the direction of reciprocation of the carrier to effect charging contact between the mold and supply body of molten glass, suction means for gathering a mold charge, means for transforming the mold charge into a blank, a finishing mold in which the blank is expanded to the form of a finished article of glassware, said carrier including upper and lower sections, links pivotally connecting said sections, auxiliary means cooperating with the carrier reciprocating means in initially moving the mold away from the glass, said auxiliary means including a piston motor mounted on the upper carrier section, and means connecting said motor and links.

41. In a glassware forming machine, a suction blank mold, a blank mold carrier, means for reciprocating the carrier to thereby alternately place the mold over a supply body of glass and at a blank transferring position, means for moving the mold and a section of the carrier in a plane substantially at right angles to the direction of reciprocation of the carrier to effect charging contact between the mold and supply body of molten glass, suction means for gathering a mold charge, means for transforming the mold charge into a blank, a finishing mold in which the blank is expanded to the form of a finished article of glassware, said carrier including upper and lower sections, links pivotally connecting said sections, auxiliary means cooperating with the carrier reciprocating means in initially moving the mold away from the glass, said auxiliary means including a piston motor mounted on the upper carrier section, means connecting said motor and links, and an expansible coil spring cooperating with the motor of said auxiliary means in moving the mold.

42. In a glassware forming machine, a ram supporting frame, a ram mounted upon the frame for sliding movement between horizontally spaced mold charging and blank transferring positions, a blank mold at one end of the ram, a swinging cut-off knife carried by said frame and adapted to be swung across the lower end of the blank mold during movement of the latter away from the mold charging position, an air operated piston motor for swinging the knife, a two-way valve for regulating the application of air under pressure to opposite ends of the motor, and means whereby relative movement between the ram and frame actuates the valve.

43. In a glassware forming machine, a ram supporting frame, a ram mounted upon the frame for sliding movement between horizontally spaced mold charging and blank transferring positions, a blank mold at one end of the ram, a swinging cut-off knife carried by said frame and adapted to be swung across the lower end of the blank mold during movement of the latter away from the mold charging position, an air operated piston motor for swinging the knife, a two-way valve carried by the ram and adapted to regulate the application of air under pressure to the opposite ends of the motor, and a trip device carried by the frame and disposed in the path of movement of the valve.

44. In a glassware forming machine, a ram supporting frame, a ram mounted for horizontal movement in said frame, a blank mold at one end of the ram, means for reciprocating the ram to thereby alternately place the mold in charging and blank transferring positions, said ram including superposed separable sections, means whereby complete projection of the ram to the charging position effects separation of the sections and contact between the mold and a supply body of molten glass, means for applying vacuum to the mold including control valves, a device actuated by separation of the sections to open the valves, pivoted latches for holding the valves open until the mold reaches the transferring position, automatic means for then operating the latches, and finishing molds arranged below said ram.

45. In a glassware forming machine, a ram supporting frame, a ram mounted for horizontal movement in said frame, a blank mold at one end of the ram, means for reciprocating the ram to thereby alternately place the mold in charging and blank transferring positions, said ram including superposed separable sections, means whereby complete projection of the ram to the charging position effects separation of the sections and contact between the mold and a supply body of molten glass, means for applying vacuum to the mold including control valves, a device actuated by separation of the sections to open the valves, pivoted latches for holding the valves open until the mold reaches the transferring position, automatic means for then operating the latches, finishing molds arranged below said ram, said automatic means for actuating the latches including air operated plungers for moving the latches, and timer mechanism for regulating the supply of air under pressure to actuate said plungers.

46. In a glassware forming machine, means for forming a blank and suspending it at a transfer position, a partible secondary blank mold arranged in a plane below said transferring position, means for moving said mold vertically upward while open, mold opening and closing means with which said mold is brought into operative engagement by upward movement thereof, means for expanding the blank in the secondary blank mold, and a finishing mold in which said blank is further expanded.

47. In a glassware forming machine, means for forming a blank and suspending it at a transfer position, a partible secondary blank mold arranged in a plane below said transferring position, means for moving said mold vertically upward while open, mold opening and closing means with which said mold is brought into operative engagement by upward movement thereof, means for expanding the blank in the secondary blank mold, a finishing mold in which said blank is further expanded, said blank forming means including cooperating partible body blank and neck molds, a neck mold holder, said holder having a downwardly opening recess, and a centering pin carried by the secondary blank mold and adapted for projection into the recess to thereby accurately align the secondary blank and neck molds.

48. In a glassware forming machine, means for forming a blank and suspending it at a transfer position, a partible secondary blank mold arranged in a plane below said transferring position, means for moving said mold vertically upward while open, mold opening and closing means with which said mold is brought into operative engagement by upward movement thereof, means for expanding the blank in the secondary blank mold, a finishing mold in which said blank is further expanded, said means for moving the secondary blank mold vertically including a vertical piston motor, a piston rod extending from the upper end of the motor, a slide carrying said mold, and means adjustably connecting the slide and piston rod whereby the uppermost position of said mold may be varied without changing the stroke of the piston rod.

49. In a glassware forming machine, a blank forming unit including a horizontal ram consisting of upper and lower sections, means for reciprocating the ram horizontally, means whereby the upper section is caused to travel in a horizontal plane throughout its reciprocating movement and the lower section to move therewith during a major part of its reciprocating movement and substantially vertically downward at one end of the path of movement of said ram, and a blank mold mounted upon said lower section.

50. In a glassware forming machine, a horizontal ram, a blank mold at one end thereof, means for reciprocating the ram horizontally to thereby alternately place the mold in charging and blank transferring positions, said ram comprising upper and lower sections, rollers mounted upon the adjacent side margins of said sections, links pivotally connecting said sections, horizontal slideways common to the two sections in which all of the rollers are guided, said slideways having corresponding ends curved downwardly and closing whereby a predetermined degree of movement of the ram in one direction results in downward movement of the lower section and brings the mold into charging contact with a supply body of molten glass, means for delivering a mold charge of glass to the mold and transforming it into a blank, and a finishing mold in which the blank is expanded to its final shape.

51. In a glassware forming machine, a blank forming unit including a horizontal ram consisting of upper and lower sections, means for reciprocating the ram horizontally, means whereby one section is caused to travel in a horizontal plane throughout its reciprocating movement and the other section to move therewith during a major part of its reciprocating movement and substantially vertically at one end of the path of movement of the ram, and a blank mold mounted upon said other section and brought into charging position by said vertical movement of the other section.

52. In a glassware forming machine, a blank forming unit including a horizontal ram consisting of upper and lower sections, means for reciprocating the ram horizontally, means whereby one section is caused to travel in a horizontal plane throughout its reciprocating movement and the other section to move therewith during a major part of its reciprocating movement and substantially vertically at one end of the path of movement of the ram, a blank mold mounted upon said other section and brought into charging position by said vertical movement of the other section, and auxiliary means cooperating with said ram reciprocating means in effecting initial movement of the mold away from the charging position.

53. In a glassware forming machine, a blank mold unit including a partible body blank mold, a partible neck mold, a vertical hinge pin upon which said molds are pivoted, said hinge pin having a downwardly opening recess in its lower end, a finishing mold unit including a mold carrier, a partible finishing mold thereon, an upwardly projecting centering pin adapted to enter said recess and thereby accurately align the neck and finishing molds, and means for imparting vertical movement to the finishing mold unit.

LEONARD D. SOUBIER.